(12) United States Patent
Kawarai et al.

(10) Patent No.: US 7,016,366 B2
(45) Date of Patent: Mar. 21, 2006

(54) PACKET SWITCH THAT CONVERTS VARIABLE LENGTH PACKETS TO FIXED LENGTH PACKETS AND USES FEWER QOS CATEGORIES IN THE INPUT QUEUES THAT IN THE OUTOUT QUEUES

(75) Inventors: Kenichi Kawarai, Kawasaki (JP);
Hiroshi Tomonaga, Kawasaki (JP);
Naoki Matsuoka, Kawasaki (JP);
Tsuguo Kato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 996 days.

(21) Appl. No.: 09/813,226

(22) Filed: Mar. 20, 2001

(65) Prior Publication Data
US 2001/0033581 A1    Oct. 25, 2001

(30) Foreign Application Priority Data
Mar. 22, 2000 (JP) .............................. 2000-080383
Apr. 25, 2000 (JP) .............................. 2000-124667

(51) Int. Cl.
*H04L 12/28* (2006.01)

(52) U.S. Cl. ...................................... 370/413; 370/389

(58) Field of Classification Search ............ 370/351–3, 370/389, 395.1, 393, 395.4, 395.42, 395.43, 370/395.7, 395.71, 412–418, 465–476
See application file for complete search history.

(56) References Cited

U.S. PATENT DOCUMENTS

| | | | |
|---|---|---|---|
| 5,555,265 A | | 9/1996 | Kakuma et al. |
| 5,696,764 A | | 12/1997 | Soumiya et al. |
| 5,790,522 A | * | 8/1998 | Fichou et al. ................ 370/236 |
| 5,809,024 A | * | 9/1998 | Ferguson et al. ...... 370/395.53 |
| 6,044,061 A | * | 3/2000 | Aybay et al. ................ 370/230 |
| 6,052,368 A | * | 4/2000 | Aybay ......................... 370/357 |
| 6,072,772 A | * | 6/2000 | Charny et al. ............... 370/229 |
| 6,160,812 A | * | 12/2000 | Bauman et al. ............. 370/416 |
| 6,836,479 B1 | * | 12/2004 | Sakamoto et al. .......... 370/389 |
| 2001/0007562 A1 | * | 7/2001 | Matsuoka et al. .......... 370/415 |

(Continued)

FOREIGN PATENT DOCUMENTS

JP    7-240752    9/1995

(Continued)

OTHER PUBLICATIONS

McKweown, "Fast Switched Backplane for a Gigabit Switched Router" Business Communications Review, vol. 27, No. 12 Dec. 1997, XP002267386, pp. 1-30.

(Continued)

*Primary Examiner*—David Vincent
(74) *Attorney, Agent, or Firm*—Katten Muchin Rosenman LLP

(57) ABSTRACT

To achieve QoS control, drop control and multicast control of a variable-length packet at high speed in small scale hardware, a packet divider divides a variable-length packet into fixed-length packets, and an input buffer section stores the divided fixed-length packets into queues by output lines and by QoS classes. A large number of QoS classes are mapped into only two kinds of classes including a guaranteed bandwidth class for which an assigned bandwidth is guaranteed and a best effort class for which a surplus bandwidth is allocated, thereby to achieve scheduling at the input side by an inter-line scheduler. An output buffer section assembles a variable-length packet from fixed-length packets that have been obtained by switching at a switch section in an output buffer section. A QoS control is performed based on a packet length.

13 Claims, 64 Drawing Sheets

U.S. PATENT DOCUMENTS

2005/0078673 A1 * 4/2005 Sakamoto et al. .......... 370/389

FOREIGN PATENT DOCUMENTS

| JP | 10-65709 | 3/1998 |
|---|---|---|
| JP | 11-41241 | 2/1999 |
| JP | 11-55278 | 2/1999 |
| WO | WO 95/03657 | 2/1995 |

OTHER PUBLICATIONS

Minkenberg, et al., "A Robust Switch Architecture for Bursty Traffic" Broadband Communications, Feb. 2000 pp. 207-214, XP010376461, ISBN: 0-7803-5977-1.

Schoenen, et al., "Distributed Cell Scheduling Algorithms for Virtual-Output-Queud Switches" 1999 IEEE Global Telecommunications Conference, Dec. 1999 vol. 2, pp. 1211-1215, XP001016905, ISBN: 0-7803-5797-3.

McKweown, et al., "The Tiny Tera: A Packet Switch Core" IEEE Micro, Jan. 1997, pp. 1-13, XP002235664, ISSN: 0272-1732.

Marsan, et al., "Scheduling in Input-Queud Cell-Based Packet Swithces" 1999 Global Telecommunications Conference IEEE Global Telecommunications Conference, vol. 2, Dec. 1999, pp. 1227-1235, XP001016908, ISBN: 0-7803-5797-3.

* cited by examiner

US 7,016,366 B2

PACKET SWITCH THAT CONVERTS VARIABLE LENGTH PACKETS TO FIXED LENGTH PACKETS AND USES FEWER QOS CATEGORIES IN THE INPUT QUEUES THAT IN THE OUTOUT QUEUES

BACKGROUND OF THE INVENTION

The present invention relates to a packet switch for carrying out routing of a variable-length packet (or a frame) like an IP (Internet Protocol) packet, particularly, a large-capacity packet switch for achieving complex controls such as QoS (Quality of Service) control, drop control and multicast control of a variable-length packet, and to a scheduling device, a drop control circuit, a multicast control circuit, and a QoS control device that can be used for the large-capacity packet switch.

In recent years, along with a rapid distribution of Internet services, there has been an increasing demand for communication traffic. Particularly, it has been desired to realize large-capacity routers and switches of high speed having a Tbps (terabit/sec) class or above.

Conventionally, in a router device for processing variable-length packets like IP packets, there has been employed hardware for executing the packet forwarding processing in order to increase the processing speed. However, both software and hardware at only a low speed have been able to execute complex processing like QoS control, drop control and multicast control. Further, in ATM (Asynchronous Transfer Mode) switching, the QoS control, drop control and multicast control have basically been carried out for each fixed-length packet.

The software-based processing of a router device can be implemented by complex processing. However, with the increase in line speed, it has become difficult to achieve software processing at a speed equivalent to the line speed, which makes it difficult to achieve higher-speed and larger-capacity processing.

In the case of an ATM switching system, this system does not have a function of carrying out the QoS control, drop control and multicast control for each variable-length packet like the IP packet as the QoS control, drop control and multicast control are carried out for each fixed-length packet. There has been an attempt to carry out QoS control and drop control at a variable-length packet level by utilizing the variable-length packet identification of AAL5 in the ATM called GFR (Guaranteed Frame Rate). However, this system also uses a fixed-length packet unit called a cell for the packet switching and transfer. As it is necessary to realize all the nodes constituting a network by the ATM switching system, it is not possible to apply this system as a packet switch for carrying out the switching and transfer processing in IP packet unit.

Regarding the QoS control, WFQ (Weighted Fair Queuing) has been mainly known as a fair method of allocating bandwidth among variable-length packets of best effort class where bandwidth is not prescribed in advance.

The WFQ is based on GPS (Generalized Processor Sharing) for allocating a surplus area in proportion to the weight set to a queued connection. The GPS is a system of bandwidth allocation for distributing the read data volume so that the following equation (1) is always established for optional active connections (i) and (j) that use queues.

$$S(i, \tau, t)/S(j, \tau, t) \geq \Phi(i)/\Phi(j) \quad (1)$$

Where $\Phi(N)$ represents a weight of a connection N, and S (N, $\tau$, t) represents a volume of data served for the connection N during a period [$\tau$, t]. In the equation (1), the left side member becomes equal to the right side member when data of the connections (i) and (j) are both queued. It is assumed, for example, that weights have been allocated to connections #0, #1, #2 and #3 at the ratio of 0.1: 0.2: 0.4: 0.3, respectively. When only the connection #3 is non-active (that is, the packets are not queued) and all other connections are active, the reading bandwidth is allocated to the connections #0 to #2 excluding the connection #3 at the ratio of 0.1: 0.2: 0.4 respectively.

The GPS means bandwidth allocation basically in an infinitesimal unit. However, as the allocation is in a variable-length packet (a frame) unit in reality, the WFQ expands the GPS to a fair bandwidth allocation of a frame level.

According to WFQ, when a frame has arrived, an expected finish time F (i, k) when a packet of a k-th order in a flow i has arrived at a time t (i, k) and the frame length is L (i, k), is calculated based on the equation (2). Then, the data is read out sequentially starting from the smallest F.

$$F(i, k) = \max \{F(i, k-1), t(i, k)\} + L(i, k)/r(i) \quad (2)$$

Where $r(i) = \Phi(i)/\Sigma\Phi \times R$. $\Sigma\Phi$ represents a total weight of queued connections, and R represents a rate of an output link.

In this case, r (i) changes each time when a packet has been read from a queue. Therefore, it is necessary to calculate F (i, k) repeatedly for all the connections. Further, it is necessary to hold the expected finish time F (i, k) for all the queued packets. Therefore, there has been a problem of an increase in the scale of hardware. To solve this problem, there has been proposed a system where, in place of real time, virtual time (a time counter of which notch changes according to the number of queued connections) is defined by equation (3), F (i, k) is re-defined by equation (4), the virtual time is re-calculated each time when $\Sigma\Phi$ and R have changed, and F (i, k) is calculated only once when a packet has arrived.

$$Vt = V(\tau) + (R/\Sigma\Phi)(t-\tau) \quad (3)$$

$$F(i, k) = \max \{F(i, k-1), Vt(i, k)\} + L(i, k)/\Phi(i) \quad (4)$$

The use of virtual time can decrease the calculation volume. However, this has had a problem that it is difficult to control priorities of packets of the guaranteed bandwidth class for which a transfer rate has been prescribed and which need to be processed in real time.

Regarding the drop control, RED (Random Early Detection) has been known as an adaptive dropping system (Internet Society RFC 2309). In order to avoid a synchronization of a congested state, once congestion has occurred, this system carries out a random drop in a probability according to the state of congestion before buffers overflow. Based on this system, it is possible to drop the transmission rate at an early stage in a protocol that has a congestion control function like TCP (Transmission Control Protocol). It is also possible to obtain a stable throughput as the operations of all terminals are not synchronized.

However, as RED requires a random execution of dropping, the algorithm is complex and is implemented by software. Therefore, this system has not been designed for high-speed processing. Further, as the dropping is basically carried out when a frame (a variable-length packet) has arrived, the drop cannot be posted to a terminal until after all the data stored in the buffers have been swept out.

Regarding the multicast control, a buffer address management system has so far been realized for only the packet-by-packet operation of fixed-length packets. There has not yet been realized a control which takes into account a variable-length packet that consists of a plurality of continuous fixed-length packets.

It is, therefore, an object of the present invention to provide a large-capacity packet switch for executing complex controls such as QoS control, drop control and multicast control of variable-length packets by small-scale hardware with high-speed processing, and a scheduling device, a drop control circuit, a multicast control circuit, and a QoS control device that can be used for this large-capacity packet switch.

SUMMARY OF THE INVENTION

According to the present invention, there is provided a packet switch comprising: a packet divider for dividing variable-length packets from a plurality of input lines into fixed-length packets; a plurality of input buffer sections is provided corresponding to the plurality of input lines, each input buffer section having queues provided for each of mutually different priorities of a smaller number than that of QoS classes that can be designated, and for each of a plurality of output lines, for registering fixed-length packets from corresponding input lines to corresponding queues according to the output line and the QoS class; a scheduler for reading the fixed-length packets registered in the queues of the input buffer sections according to the priority given to each queue so that two or more fixed-length packets of the same output line are not read out within a unit time; a switch for routing each fixed-length packet read out by the scheduler to a designated one output line out of the plurality of output lines; and a plurality of output buffer sections provided corresponding to the plurality of output lines, for carrying out an assembling of a variable-length packet from the fixed-length packet output from the switch and for controlling the priority based on the QoS class.

According to the present invention, there is also provided a scheduling device comprising: queues provided in a number equal to the number of QoS classes that can be designated, for registering variable-length packets according to the QoS class; a section for adding a first value to a corresponding token when a variable-length packet has reached the front of one of the queues; a section for subtracting a second value from each of tokens of active QoS classes each time when a unit time has passed; and a section for starting the reading of a variable-length packet of which corresponding token is a minimum or 0 among the active QoS classes when a packet can be sent to the output line.

According to the present invention, there is also provided a scheduling device comprising: queues provided in a number equal to the number of QoS classes that can be designated, for registering variable-length packets according to the QoS class; a first counter for counting for each QoS class the number of fixed-length packets of variable-length packets of the bandwidth guaranteed class and variable-length packets of the minimum bandwidth guaranteed class that have been input within a designated bandwidth; a second counter for counting for each QoS class the number of fixed-length packets of variable-length packets of the best effort class and variable-length packets of the minimum bandwidth guaranteed class that have been input in excess of the designated bandwidth; a priority control section for determining and posting a QoS class of a packet to be output with priority based on a constant packet length, from out of QoS classes that have count values other than 0 for the first counter and QoS classes that have count values other than 0 for the second counter; and a variable-length packet managing section for counting the posts from the priority control section for each QoS class, reading out a variable-length packet of the QoS class of which count value has reached a value corresponding to the packet length of the variable-length packet at the front of a corresponding queue, and sending the read variable-length packet to the output line.

According to the present invention, there is also provided a drop control circuit comprising: a calculation circuit for multiplying a difference between a volume of packets stored in a buffer and a threshold value thereof to a packet length of a variable-length packet existing at the front of the buffer, and outputting a result of the multiplication; a counter; an adder circuit for adding a calculation result of the calculation circuit to the counter; and a control circuit for dropping at once a variable-length packet that exists at the front of the buffer when a counter value has exceeded a predetermined value, and subtracting from the counter a value obtained by multiplying the packet length by the predetermined value.

According to the present invention, there is provided a drop control circuit comprising:

a calculation circuit for outputting a difference between a volume of packets stored in a buffer and a threshold value thereof; a counter; an adder circuit for adding a calculation result of the calculation circuit to the counter; and a control circuit for dropping a fixed-length packet that exists at the front of the buffer when a counter value has exceeded a predetermined value, and subtracting the predetermined value from the counter.

According to the present invention, there is also provided a multicast control circuit comprising: a multicast queue for registering an address of a variable-length packet to be multicast-controlled that are stored in a buffer; a plurality of output buffer queues provided corresponding to a plurality of output lines; an address management table for managing the address of a variable-length packet stored in the buffer; and a control section for storing as many records as there are output destinations into the address management table, each record including the address of the variable-length packet, and for registering the addresses of the records in the output buffer queues corresponding to the output destinations, when the address of the variable-length packet to be multicast-controlled has been registered in the multicast queue.

According to the present invention, there is also provided a packet switch for switching a variable-length packet having a QoS class, the packet switch comprising: a section for mapping a plurality of QoS classes into simple priority classes; and a section for controlling the reading of the variable-length packets based on the simple priority classes.

According to the present invention, there is also provided a packet switch for converting an IP packet having a QoS class into fixed-length packets, for switching the packet on the basis of fixed-length packets, the packet switch comprising: a section for mapping priority classes of IP packets into simple priority classes of a smaller number than the number of QoS classes that are allocated to the IP packets; and a section for controlling the reading of the fixed-length packets based on the simple priority classes.

According to the present invention, there is also provided a packet switch for converting an IP packet having a QoS class into fixed-length packets, for switching the packet on the basis of fixed-length packets, the packet switch comprising: a section for mapping priority classes of IP packets into simple priority classes of a smaller number than the number of QoS classes that are allocated to the IP packets; a section for controlling the reading of the fixed-length packets to the switch based on the simple priority classes; and a section for controlling the reading of the fixed-length packets after the switching based on the QoS class allocated to the IP packet.

According to the present invention, there is also provided a QoS control device comprising: a first selector for selecting one QoS class for reading a packet from at least one QoS class that belongs to a high-priority group; a second selector for selecting one QoS class for reading a packet from at least one QoS class that belongs to a low-priority group; and a third selector for selecting one of the high-priority group and the low-priority group, thereby to select a packet of a QoS class selected by the first or second selector.

DETAILED DESCRIPTION

Figure 1:
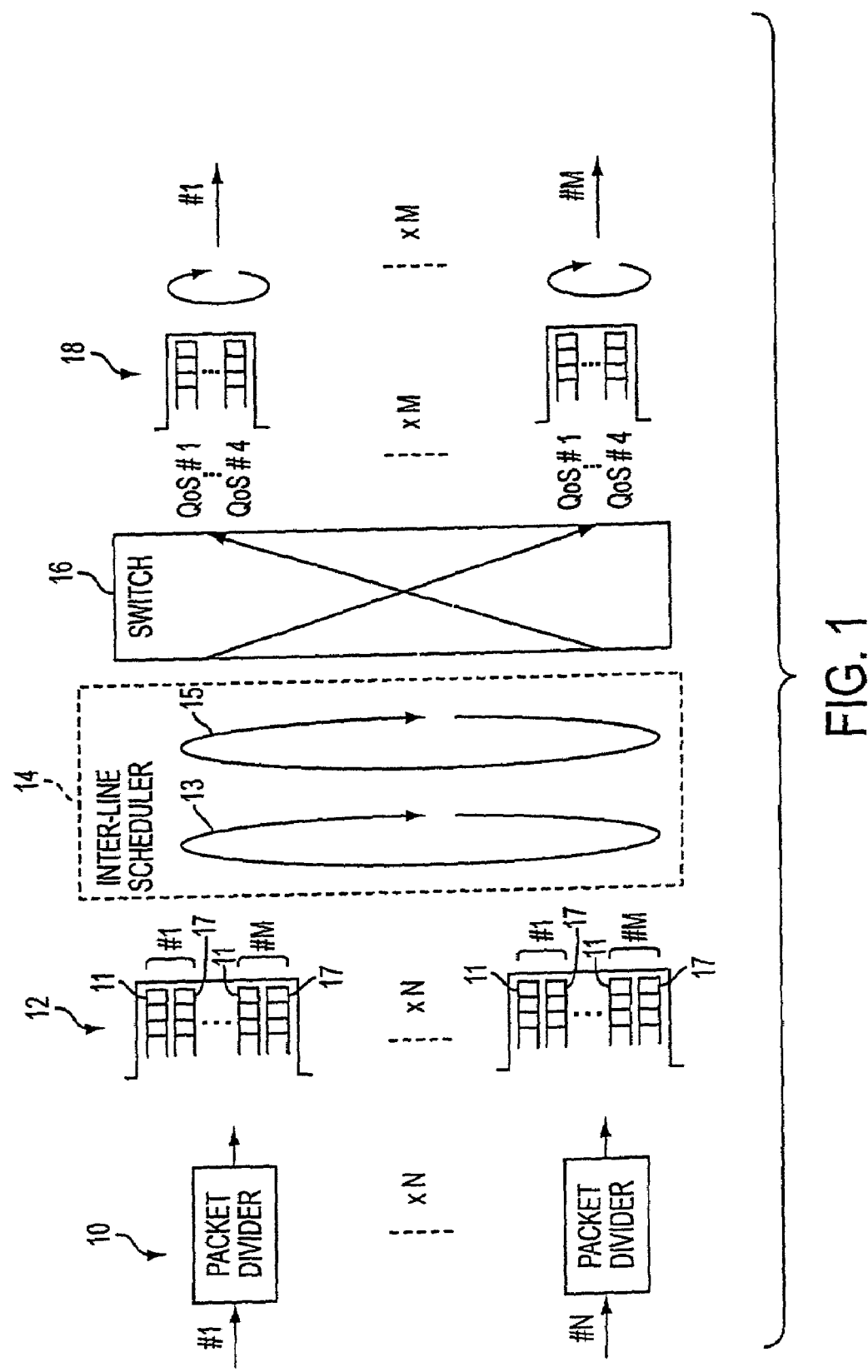
FIG. 1 is a diagram showing the concept of a large-capacity packet switch according to an embodiment of the present invention.

FIG. 1 shows a concept of a packet switch according to an embodiment of the present invention. A variable-length packet that has been input from an input line is divided into fixed-length packets by a packet divider 10, and the divided fixed-length packets are buffered into input buffer sections 12. A plurality of input buffer sections 12 are provided corresponding to each of N input lines. Each input buffer is logically divided by M output lines (#1 ... #M). Each logical division is further divided by QoS classes (for example a guaranteed bandwidth class 11, and a best effort class 17). A packet that has been input to the input buffer section 12 from each input line is buffered correspondingly to an output line and QoS class. In this case, the QoS classes are degeneratively mapped into any one of the two classes, the guaranteed bandwidth class and the best effort class. For the guaranteed bandwidth class, input traffic can be estimated in advance based on a contract or a call reception control. For the best effort class, input traffic cannot be estimated in advance because there is no contract and no call reception control.

An inter-line scheduler 14 adjusts the timing of transferring each packet buffered in the input buffer section 12 to a switch section 16. The inter-line scheduler 14 first conducts contention control for packets of the guaranteed bandwidth class among the packets that have been buffered with respect to each of output lines. In other words, the inter-line scheduler 14 selects an output line for each packet so that the same output line is selected only once (reference 13 in FIG. 1). For the output lines that have not been selected first, the inter-line scheduler 14 conducts a similar contention control for packets of the best effort class so that the same output line is selected only once (reference 15 in FIG. 1). The above inter-line scheduling operation is executed within a unit time, for example, within a time required for transferring data corresponding to one fixed-length packet in one output line. Thus, packets output from the input buffers are selected based on the contention control for each logic output buffer and for each QoS class among the input lines, and the selected packets are transferred to the switch section 16. Each packet transferred is switched to each output buffer section 18 based on destination information given to the packet by the switch section 16.

Each packet that has been input to the output buffer section 18 is buffered with respect to each actual QoS class (usually 3 classes or above). The output buffer section 18 carries out QoS control for each QoS class within each output line (that is, a control of reading order according to a set rate and a priority), and outputs each packet to each output line.

The QoS classes in the input buffer section 12 are made to degenerate into the two classes of the guaranteed bandwidth class and the best effort class. Based on this degeneration, the number of queues for which contention control should be performed (the number of input lines×the number of output lines×the number of QoS classes (three or more)) can be decreased to the number of input lines×the number of output lines×2.

In general, for QoS control, it is necessary to carry out a complex reading order control such as a reading-out rate as well as a priority control. However, the scheduling processing is simplified by first making the QoS classes degenerate into the guaranteed bandwidth class and the best effort class, and then by scheduling the guaranteed bandwidth class and scheduling the best effort class after that.

Further, when the internal operation speed of the switch is set faster than the arrival speed of the input buffers and when the QoS control for each QoS class is carried out in the output buffer 18 after switching, QoS control points for the entire packet switch can be concentrated in the output buffer section. As the output buffer section carries out QoS control for each output line, a smaller volume of hardware is required as compared to when the input buffer section carries out all the QoS control of a packet switch.

It is possible to achieve substantially 100% throughput for the input buffer-type switch having a logic queue for each output line that is employed in the packet switch shown in FIG. 1. Therefore, for classes where traffic can be estimated in advance, the packet drop rate and delay time at the input buffer side can be made substantially smaller than the packet drop rate and delay time caused by the QoS control at the output buffer side. When the operation speed inside the switch is increased, the packet drop rate and delay time can be made much smaller. Accordingly, there is no practical problem when a plurality of QoS classes at the input side are mapped into two classes.

Figure 2:
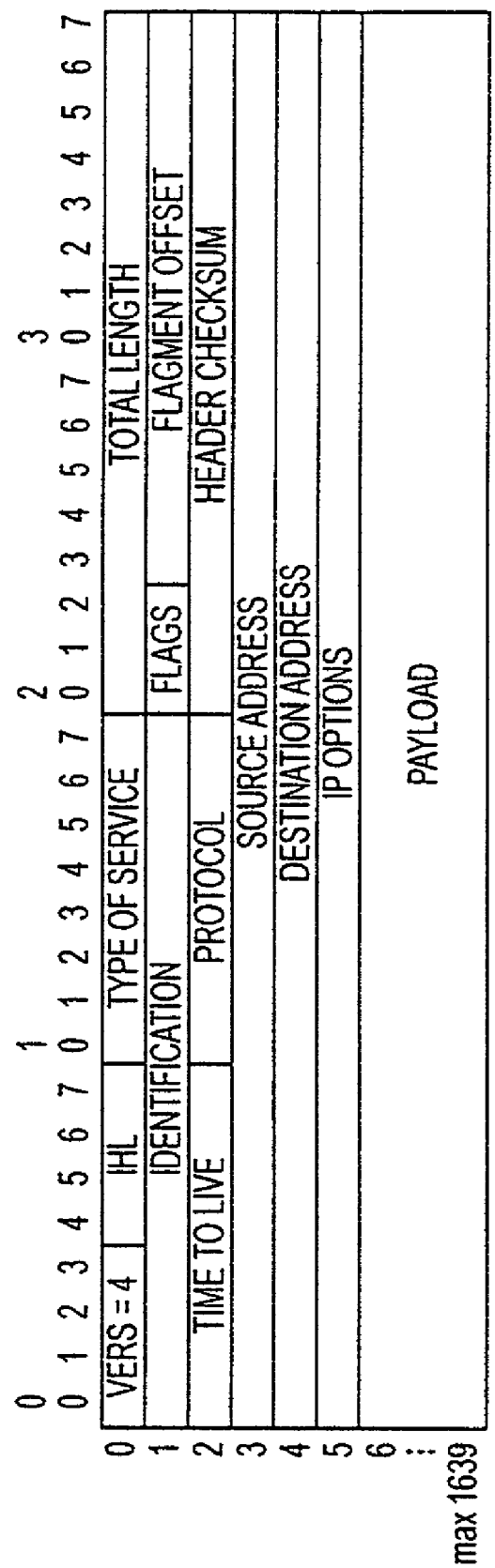
FIG. 2 is a diagram showing a frame format of IPv4 as one example of a variable-length packet.
Figure 3:
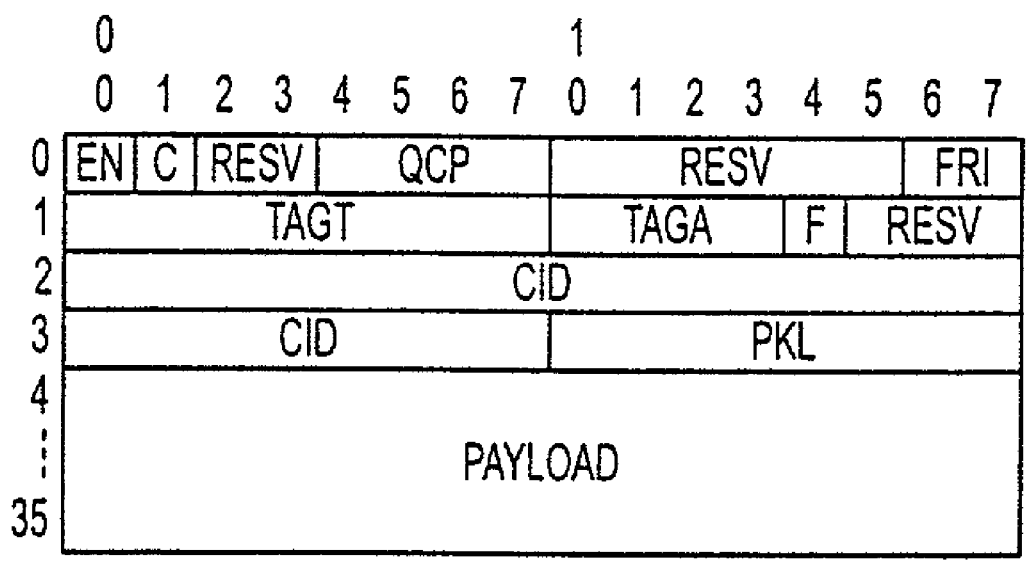
FIG. 3 is a diagram showing one example of a format of a fixed-length packet.

FIG. 2 and FIG. 3 show one example of a variable-length packet format and one example of a format of a fixed-length packet for dividing a variable-length packet into a plurality of fixed-length packets according to the present invention respectively. Table 1 and Table 2 explain each field in FIG. 2 and FIG. 3 respectively. In the present example, IPv4 format (Internet Society RFC791) is used as a variable-length packet. Any other format may also be used if the packet includes an information element such as a destination address or the like that can identify the flow or connection of the packet, and a QoS class value. The QoS class value may be obtained by converting contents of a table that has been preset to the flow and connection information, instead of a QoS class value described in the packet (the QoS is derived from the flow or connection information). Similarly, as the fixed-length packet is a local packet inside a device, the fixed-length packet may have any format so long as the format includes necessary information elements.

TABLE 1

| Vers | Version number |
|---|---|
| IHL | Header length |
| Type of Service | Priority |
| Total Length | IPv4 payload length |
| Identification | Fragment ID |
| Flags | Flags |
| Fragment Offset | Fragment offset |
| Time to Live | Maximum Hops |
| Protocol | Protocol |
| Header Checksum | Header checksum |
| Source Address | Transmitter address |
| Destination Address | Destination address |
| Payload | Payload |

TABLE 2

| EN | Empty cell identifier (0: empty cell, 1: valid cell) |
|---|---|
| C | Multicast identifier |
| QCP | Quality of Service: quality of service identifier |
| CID | Connection identifier |
| PKL | Payload length |
| F | Tagging flag (0: high-priority class, 1: low-priority class) |
| FRI | Frame type (00: middle, 01: header, 10: end, 11: header & end) |

Figure 4:
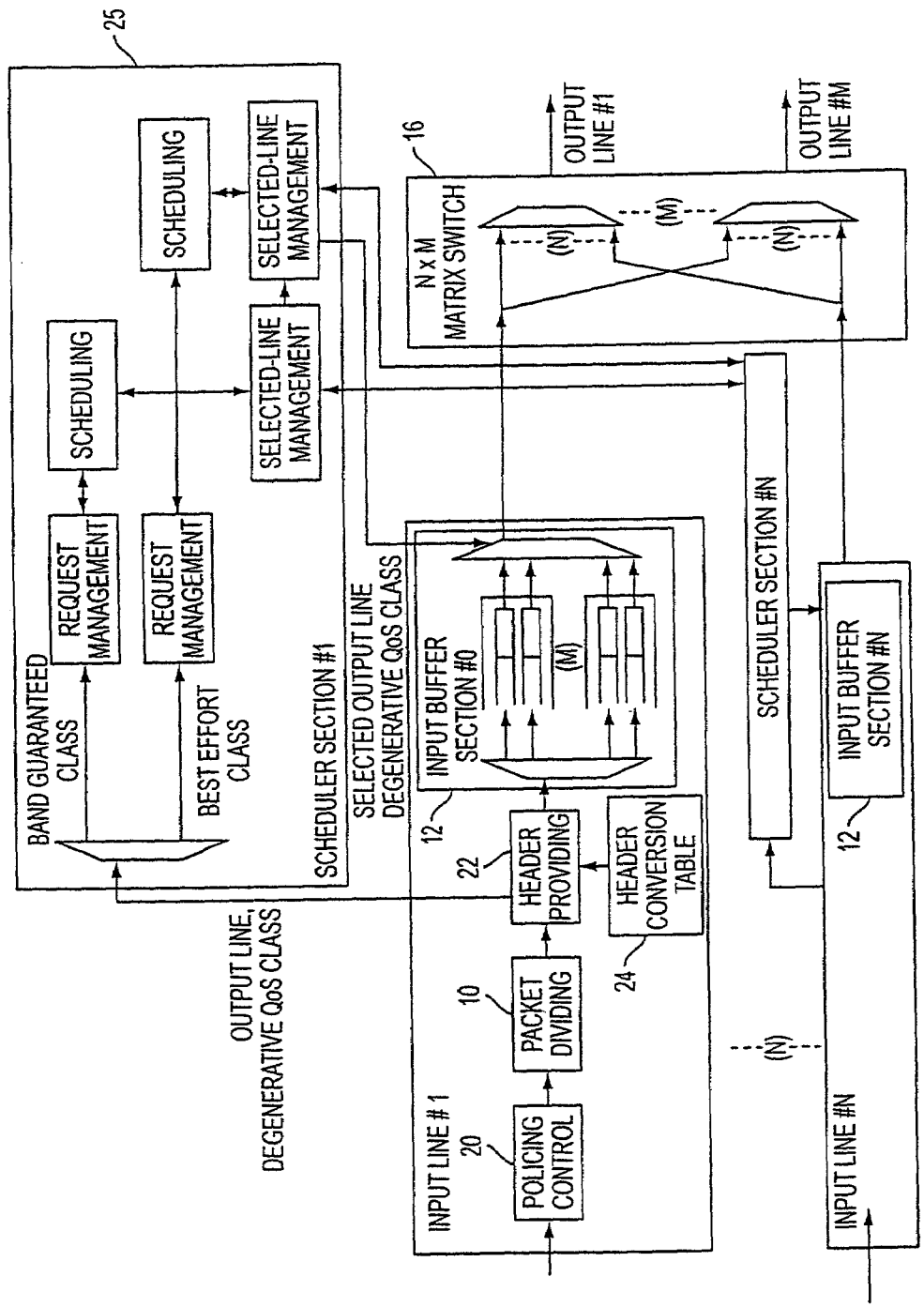
FIG. 4 is a diagram showing a detailed structure for realizing a scheduling at the input side of a switch section 16.

FIG. 4 shows a detailed structure for realizing a scheduling at the input side of the switch section 16 shown in FIG. 1. In the scheduler structure of the input buffer section shown in FIG. 4, a policing control section 20 tags the frames of above a preset rate that have been input. The tagging information is given to each frame (variable-length packet). A bit is added to a separate line or to an internal header that is added in the variable-length packet format shown in FIG. 2, and the frame added with this information is transferred to a later stage. A packet divider 10 divides the input variable-length packet into segments of a constant length. A header providing section 22 provides various kinds of header information to the segments based on information of a header conversion table 24, and assembles the fixed-length packet shown in FIG. 3.

Regarding the QoS class, a value from 0 to 3 is given to a QCP bit by referring to a table of QoS classes (for example, four classes) that have been set in advance by connection or by flow. At the same time, the QoS class is further mapped into two classes of the guaranteed bandwidth class and the best effort class. The QoS classes that have been obtained by mapping QoS classes into these two classes will be called degenerative QoS classes. An input buffer section 12 and a scheduler section 25 carry out a queuing of each packet and a scheduling of a packet reading respectively based on the degenerative QoS classes and output line number information.

For all the packets to be input to a matrix switch section at a later stage, the scheduler section 25 efficiently carries out the scheduling of packet reading, avoiding a simultaneous transfer of packets that have the same output line. For carrying out contention control, the scheduler section 25 first schedules packets of the guaranteed bandwidth class according to the degenerative QoS classes, and then schedules packets of the best effort class for input lines and output lines that have not been selected by the scheduling of packets of the guaranteed bandwidth class.

Figure 5:
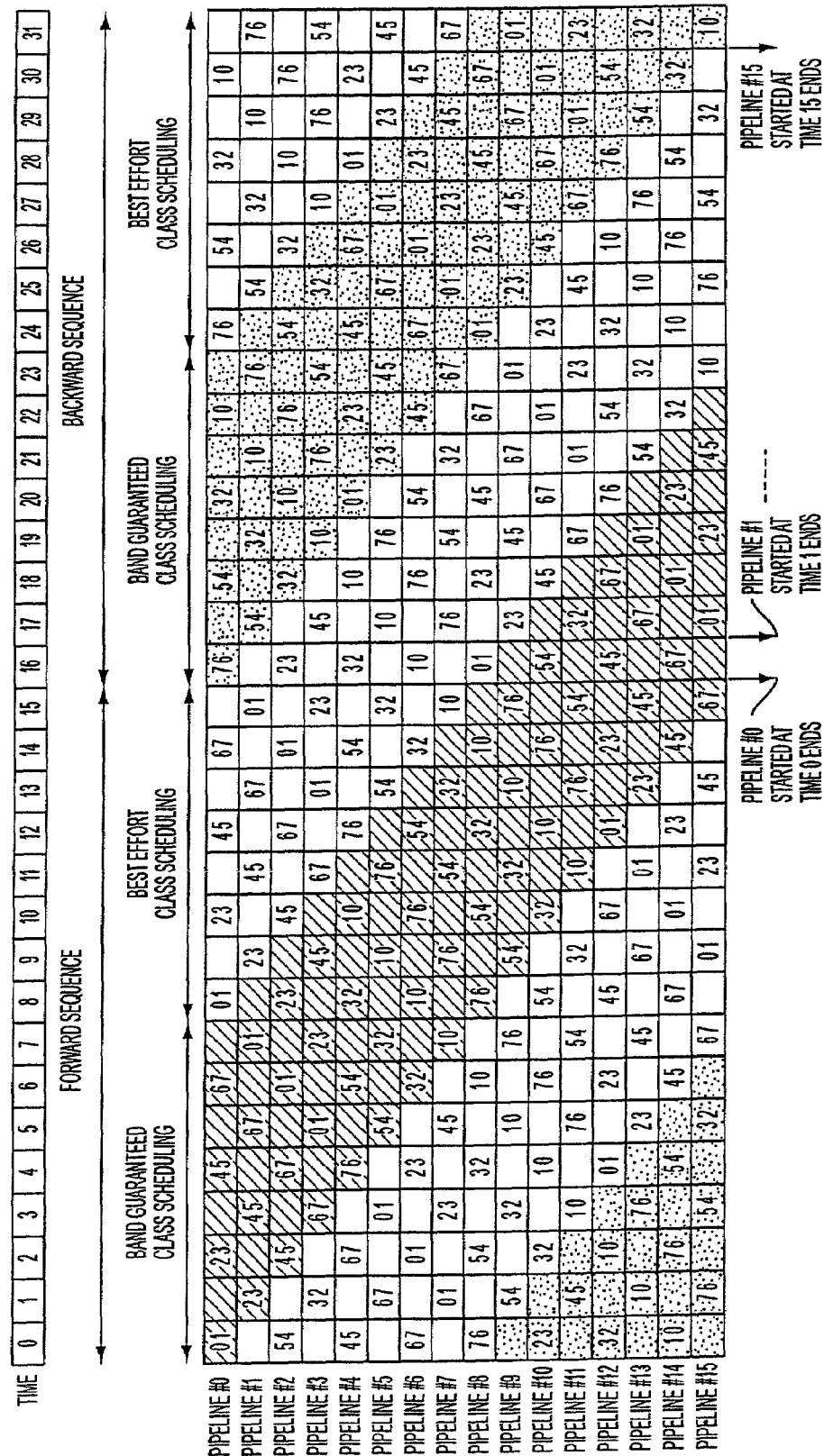
FIG. 5 is a diagram showing one example of a scheduling by pipeline processing.

FIG. 5 shows a sequence of pipelines for the guaranteed bandwidth class and the best effort class scheduled for eight pipelines by taking into account the forward and backward sequences of the scheduler.

In the example shown in FIG. 5, the sequence in the pipelines is changed so that the same patterns of pipeline processing appear by the same number for the forward sequence and backward sequence during one period. Thus, the input lines are handled fairly. Further, the contention of the processing of the same input lines during the same period is avoided, thereby decreasing the volume of the same processing by hardware.

For the scheduling algorithm, other algorithms may also be used when the guaranteed bandwidth class has a higher priority than the priority of the best effort class.

A packet that has been scheduled by the above scheduling processing is read out from the input buffer, and is then switched by a matrix switch based on output line information. It is possible to improve the drop and delay characteristics of the input buffer section and to restrict the deterioration in the quality of the switch as a total due to the contention in the input buffer section, by increasing the switching speed of the matrix switch to a value larger than the total sum of data rates of the lines (that is, by increasing the internal speed).

Fixed-length packets that have been switched are once queued in the output buffer section (reference 18 in FIG. 1). The fixed-length packets may be QoS controlled after they have been reconverted to a variable-length packet, or may be first QoS controlled and thereafter a variable-length packet is assembled.

Based on the above-described series of processing, a simple QoS control is carried out for only the two degenerative classes at the input buffer side, and QoS control of three or more classes is carried out at the output buffer side. As a result, three or more QoS classes can be controlled.

According to the above method, an input variable-length packet is once divided into fixed-length packets. It is also possible to select variable-length packets without destroying the continuity of the variable-length packets in the scheduler section and to carry out a switching processing in the state of the variable-length packets.

Figure 6:
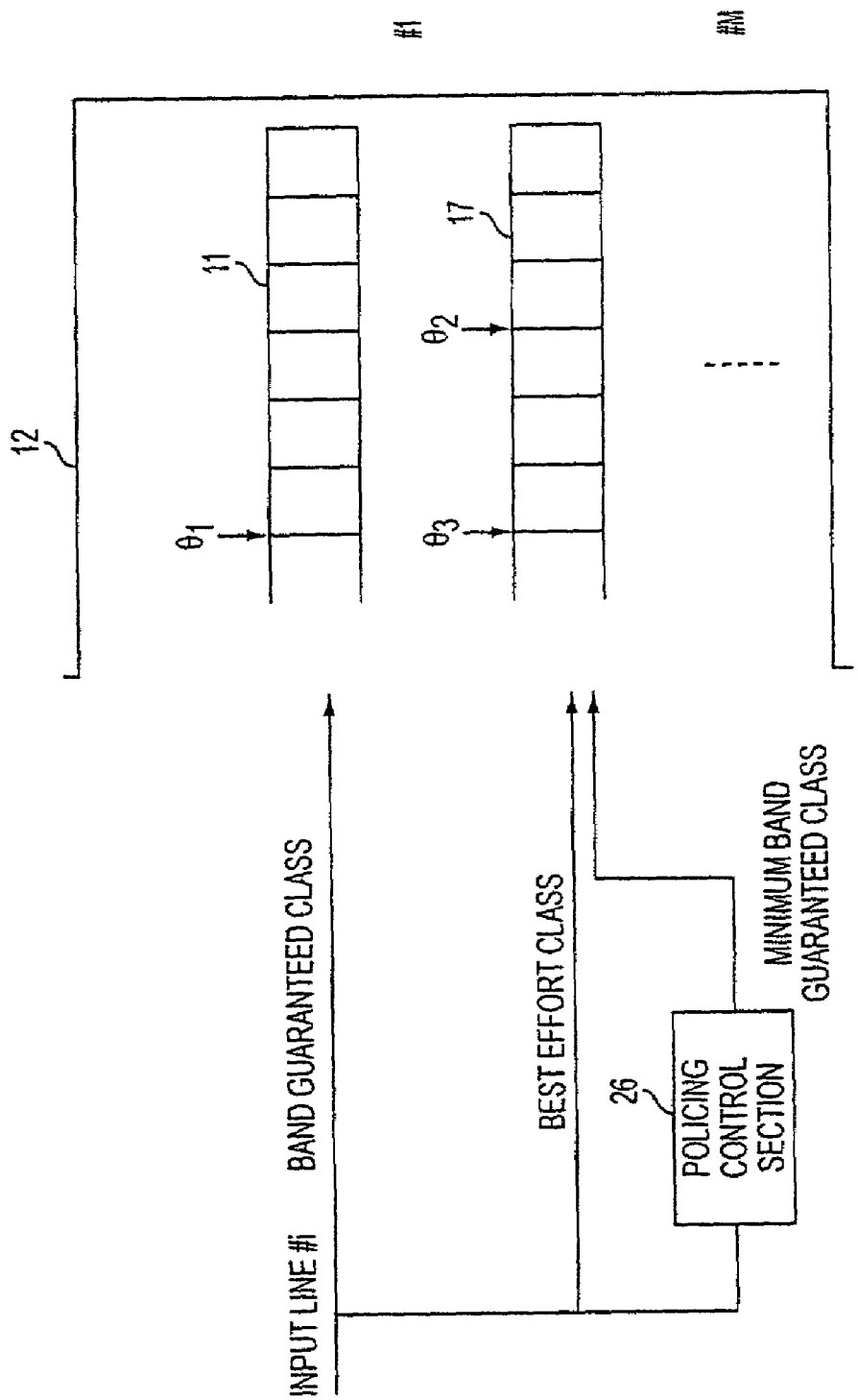
FIG. 6 is a diagram showing one example of a scheduling of a packet of a minimum bandwidth guaranteed class at the input side.

FIG. 6 shows one example of a method of accommodating in the input buffer section 12 a minimum bandwidth guaranteed class that includes both a minimum guaranteed fraction that requires a bandwidth guarantee and a best effort fraction that does not require a bandwidth guarantee but the traffic of which cannot be estimated, within one QoS class. In accommodating the minimum bandwidth guaranteed class, the packet of the minimum bandwidth guaranteed class is also buffered in a queue 17 of the best effort class. However, a policing control section 26 at a pre-stage of the queue tags a packet of the minimum bandwidth guaranteed class that is input in excess of the minimum guaranteed rate. A threshold value $\theta_2$ of a useable queue for the packet having the tagging and the packet of the best effort class is set lower than a drop threshold value $\theta_3$ for the packet having no tagging.

With this arrangement, classes having the minimum bandwidth guaranteed class can be mapped into the two classes. The drop threshold value $\theta_3$ for the packet that is input within the minimum guaranteed rate of the minimum bandwidth guaranteed class may be set equal to a drop threshold value $\theta_1$ for the packet of the bandwidth guaranteed class.

Thus, it is possible to guarantee the same quality as that of the bandwidth guaranteed class. Packets that are input in excess of the minimum guaranteed rate of the minimum bandwidth guaranteed class are mapped into the best effort class.

Figure 7:
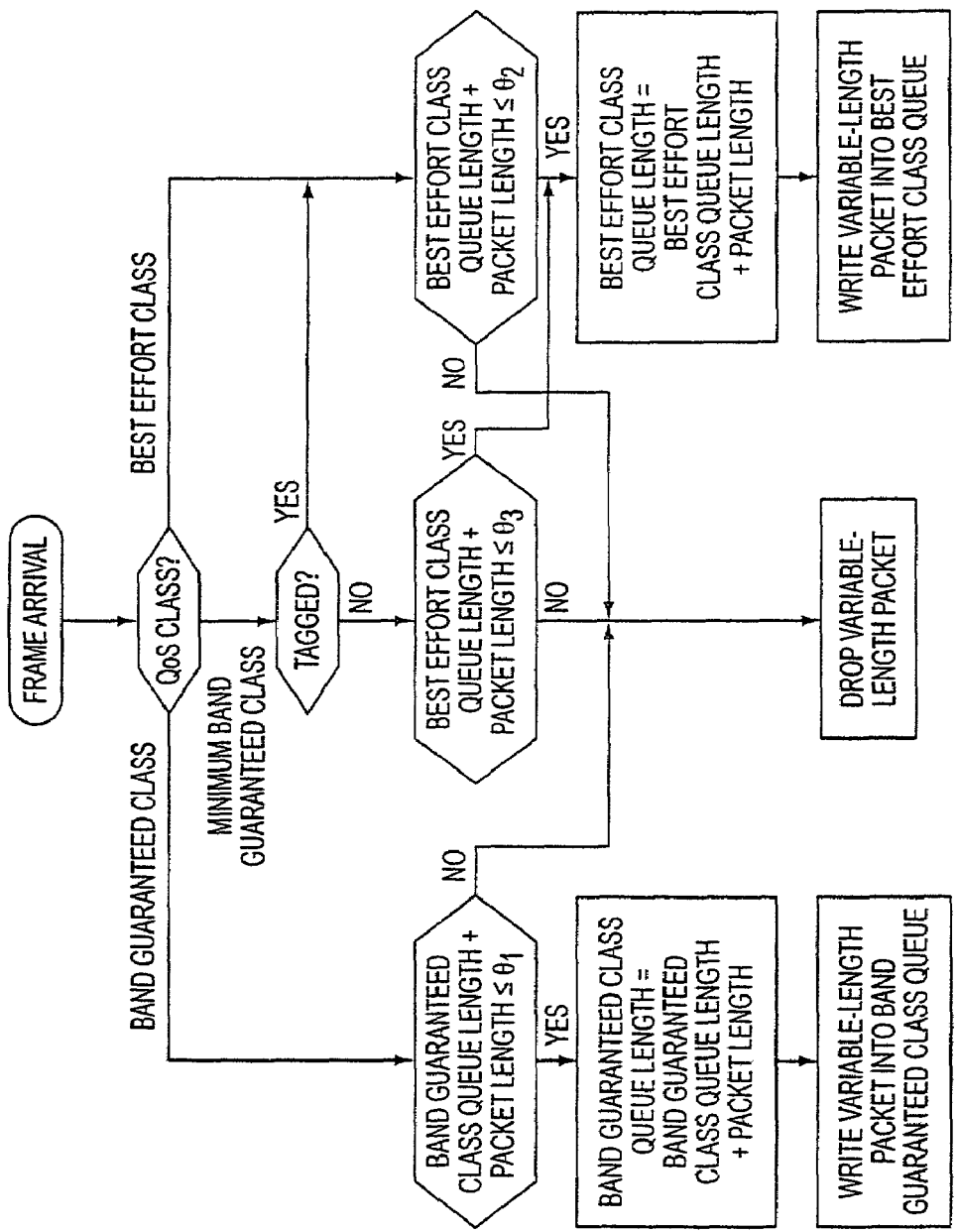
FIG. 7 is a flowchart of the scheduling processing shown in FIG. 6.

FIG. 7 shows a flowchart. When the arrived packet in the input buffer section is of the minimum bandwidth guaranteed class, this packet is queued as the best effort class. By carrying out the drop control based on the tagging information as shown in FIG. 7, it becomes possible to maintain the quality of the bandwidth guaranteed class without increasing the number of classes to be handled.

Figure 8:
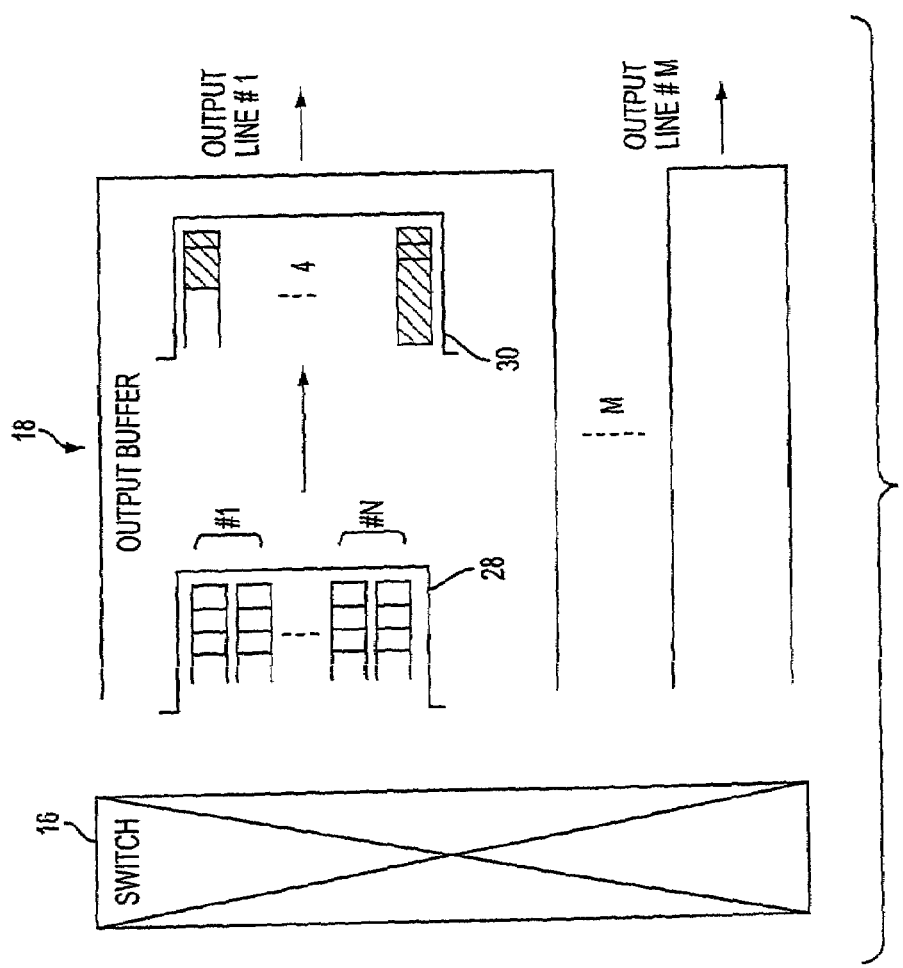
FIG. 8 is a diagram showing a first example of a structure of an output buffer section 18.
Figure 9:
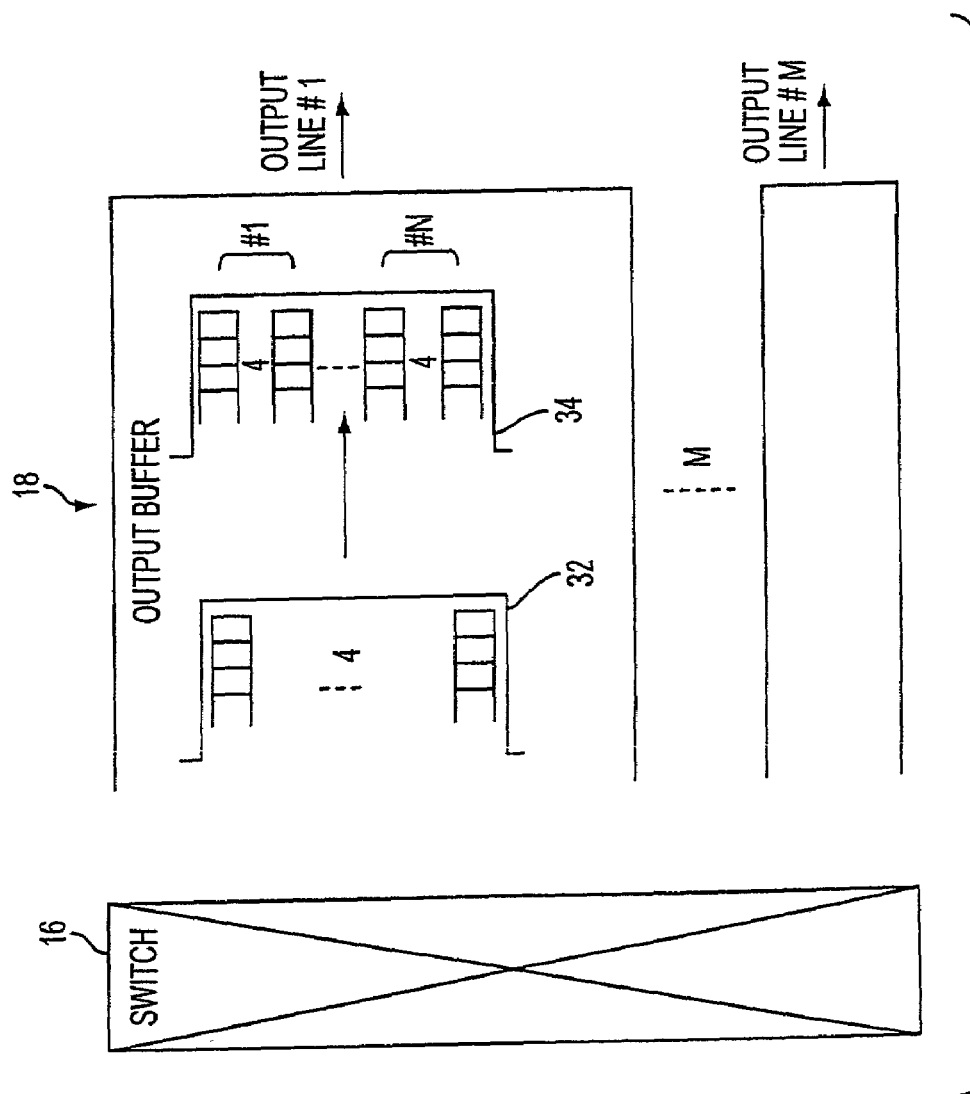
FIG. 9 is a diagram showing a second example of a structure of the output buffer section 18.

FIG. 8 and FIG. 9 show two examples of the structure of the output buffer section 18. Packets from a plurality of input lines arrive in a mixed state in the output buffer section 18. This mixed state is called a packet interleave or simply an interleave. Therefore, in the output buffer section 18, it is necessary to assemble the plurality of interleaved fixed-length packets to convert them back to an original variable-length packet and then to transfer the packets to the output line. Further, in order to guarantee the QoS classes, it is necessary to transfer the packets at pre-set rates and in priorities set in advance.

In the example shown in FIG. 8, fixed-length packets that have arrived in the interleaved state in the output buffer section are once buffered in a variable-length packet assembling buffer 28, and thereafter the packets are converted back to an original variable-length packet. The packets that have arrived in the interleaved state include packets from a plurality of input lines. Further, when the packets have been QoS controlled at the input line side, packets from a plurality of classes exist even in the same input line. In the above example, the number of QoS classes becomes two. Therefore, queues are prepared by the number of input lines (N)×the number of QoS classes (for example, two) at the input line side. Then, the packets that have arrived in the interleaved state are once buffered, and an original variable-length packet is assembled.

After the assembling of the variable-length packet has been finished, the packets are transferred to a variable-length-based QoS control section 30 according to QoS classes (for example, four classes). The variable-length-based QoS control section 30 then controls the QoS classes by taking the packet lengths into consideration. The packets are transferred from the output line at pre-set rates and in priorities set in advance.

In the example shown in FIG. 9, fixed-length packets that have arrived in the interleaved state in the output buffer section are buffered directly in a fixed-length-based QoS control section 32. The packets are transferred to a variable-length packet assembling section at a later stage according to pre-set rates and priorities set in advance. In this case, the QoS control is easy as the packet length is fixed.

The packets arrive in an interleaved state by input lines and by QoS classes at the output side, in a variable-length packet assembling buffer 34 at a later stage. Therefore, queues are prepared by the number of input lines (N)×the number of QoS classes (for example, four) at the input line side. Then, the fixed-length packets that have arrived in the interleaved state are once buffered, and an original variable-length packet is assembled. Variable-fixed packets are transferred to the output line in the order of packets assembled.

Figure 10:
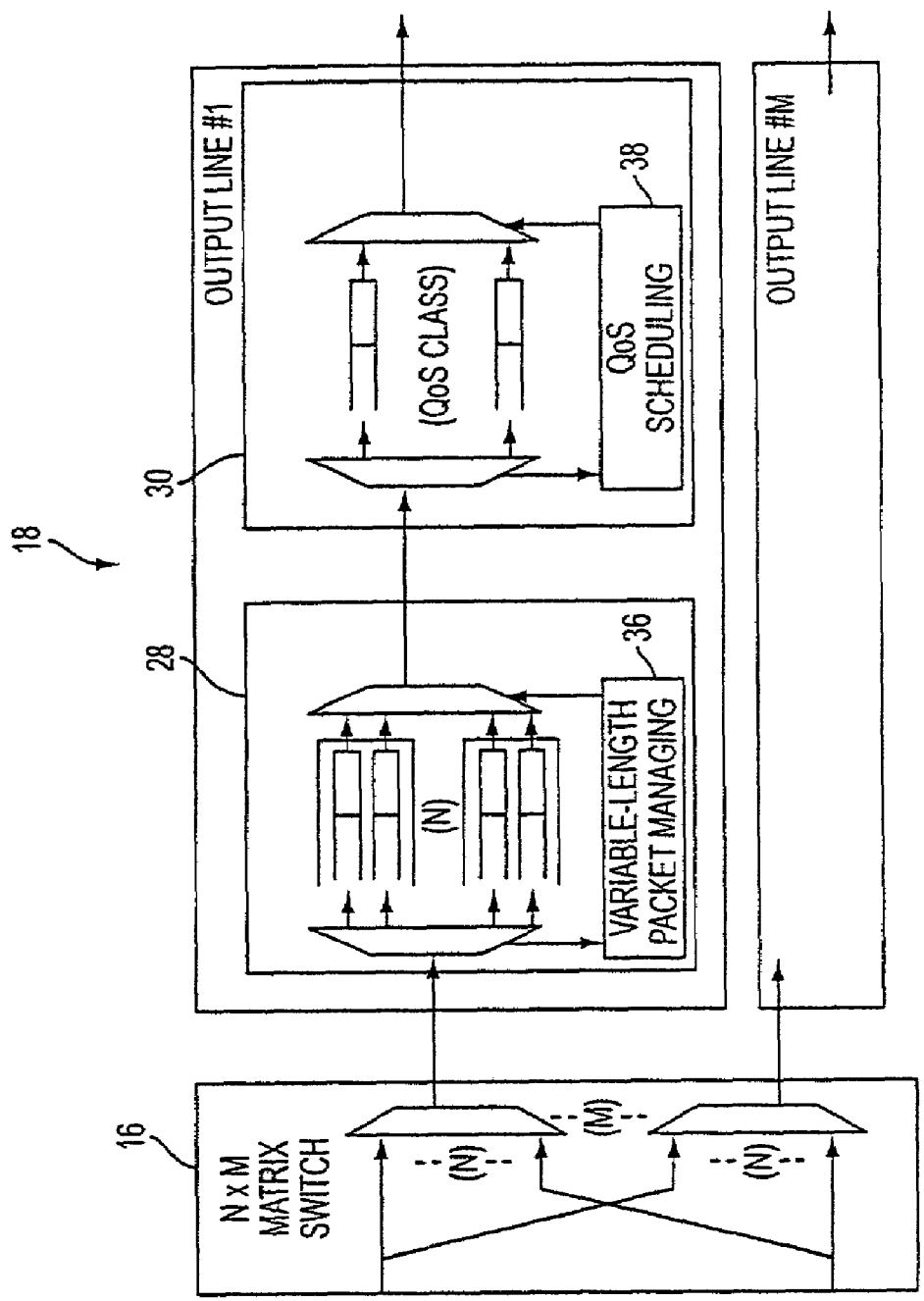
FIG. 10 is a diagram showing an example of a detailed structure of the example of FIG. 8.

FIG. 10 shows details of FIG. 8. The packets arrive in the variable-length packet assembling buffer 28 in the interleaved state with different input lines and different degenerative QoS classes. Therefore, the packets are queued by input lines and by degenerative QoS classes in the variable-length packet assembling buffer 28. A variable-length packet managing section 36 monitors packets for one variable-length packet based on the header and tail information of variable-length packets provided to each packet. After one variable-length packet has been assembled, the variable-length packet managing section 36 issues a variable-length packet transmission notice for each variable-length packet for successive transfer of notices to a later stage. In this case, instead of transferring the information inside the packet, only the address and address chain information written in the buffer may be copied. A QoS control section 30 at a later stage has buffers prepared by the number of QoS classes, and has the arrived packets queued for each of QoS classes (for example, four classes). A QoS scheduling section 38 monitors QoS classes and frame lengths of packets written in the queues, carries out a contention control of packets reading order according to the packet lengths, pre-set rates, weights and priorities. Then, the QoS scheduling section 38 instructs the transfer of the packets of readable QoS classes to the output line.

Figure 11:
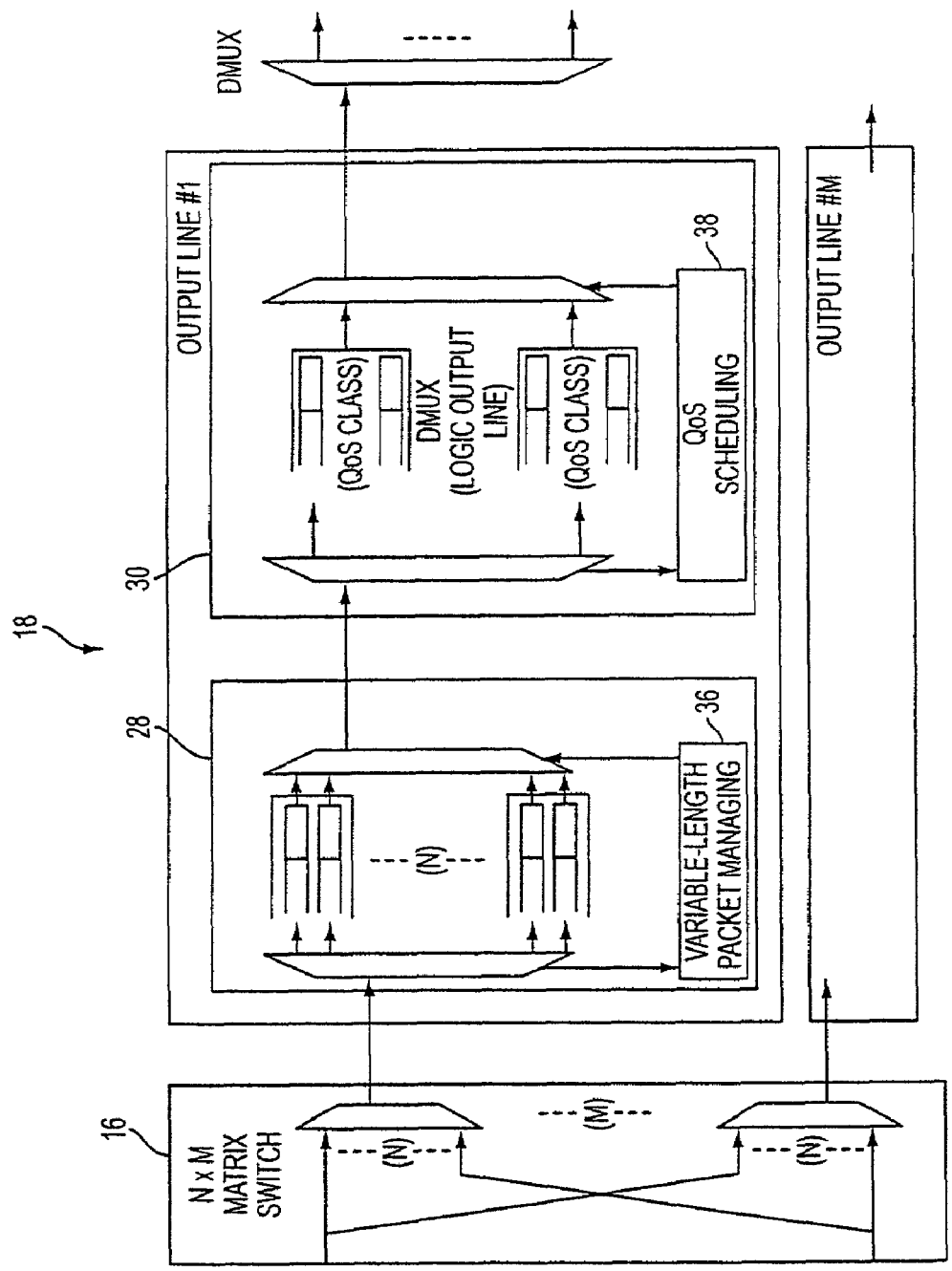
FIG. 11 is a diagram showing a case where an output line is further divided into a plurality of low-speed lines in the structure of FIG. 8 and FIG. 10.

FIG. 11 shows a case where the output line is further DMUXed or divided into a plurality of low-speed lines. The processing of a variable-length packet assembling buffer 28 is the same as that explained above. However, a QoS control section 30 holds queues for the QoS classes by the number of logic output lines (DMUX). A QoS scheduling section 38 controls the reading of packets from the QoS class queue in each DMUX so that the reading does not exceed the bandwidth of the DMUX. By allocating a time slot to each DMUX, the QoS scheduling section 38 executes a QoS scheduling for each QoS class within the DMUX queue corresponding to the time slot.

Figure 12:
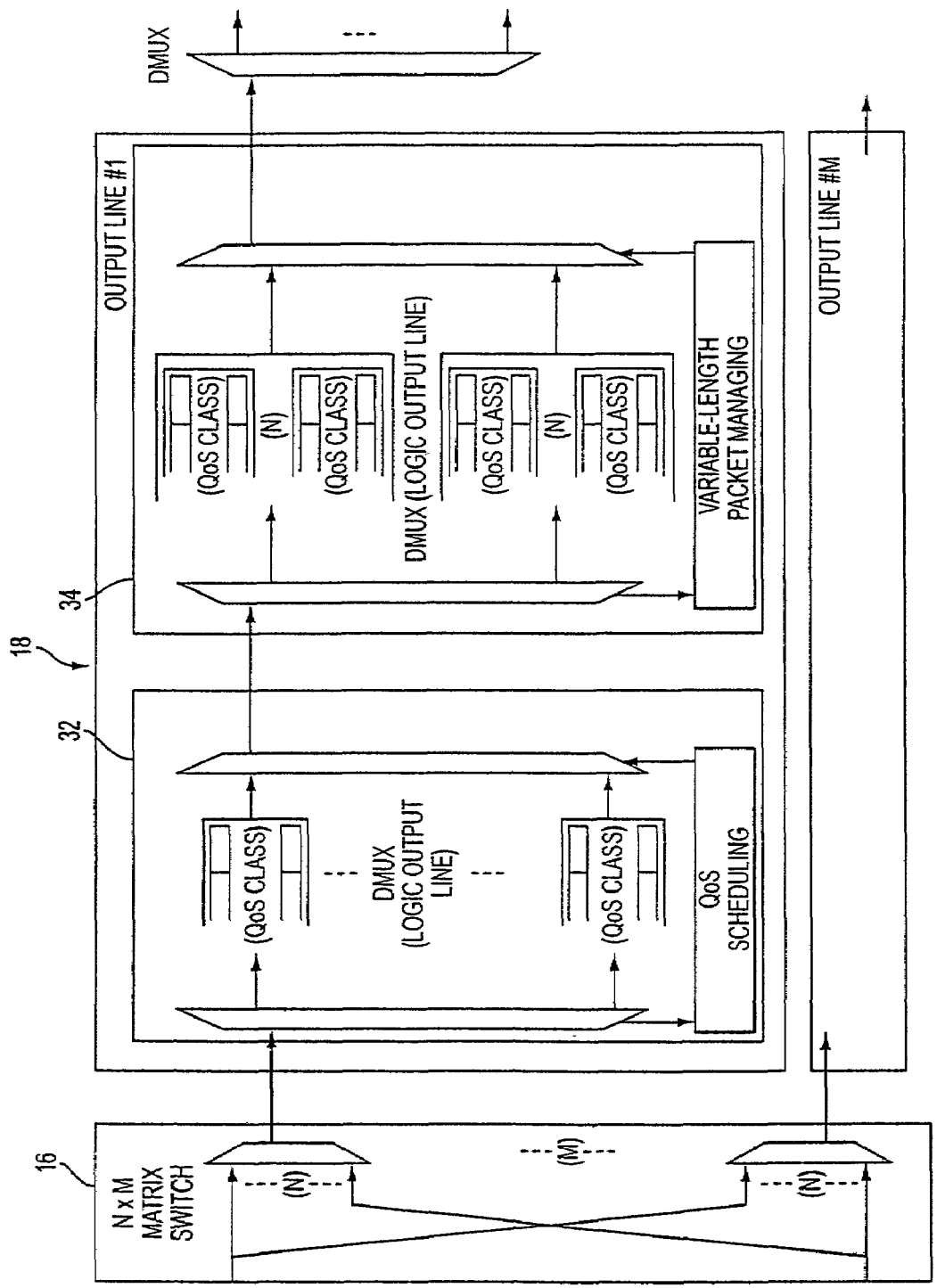
FIG. 12 is a diagram showing a case where an output line is further divided into a plurality of low-speed lines in the structure of FIG. 9.

FIG. 12 shows a case where the output line in FIG. 9 is DMUXed or divided into a plurality of low-speed lines in a similar manner to that in FIG. 11, and the logical layout positions of the QoS control section and the variable-length packet assembling buffer are reversed. Accordingly, a QoS control section 32 has packets queued by QoS classes and by DMUXs. The QoS control section 32 controls the reading of packets in the form of fixed-length packets from each QoS class in each DMUX and executes a QoS scheduling so that the reading does not exceed the bandwidth of the DMUX. A variable-length packet assembling section 34 has packets queued by input lines, by QoS classes and by DMUXs. Each time when one variable-length packet has been assembled, the variable-length packet assembling section 34 outputs the variable-length packet to the output line, and repeats this continuously.

Figure 13:
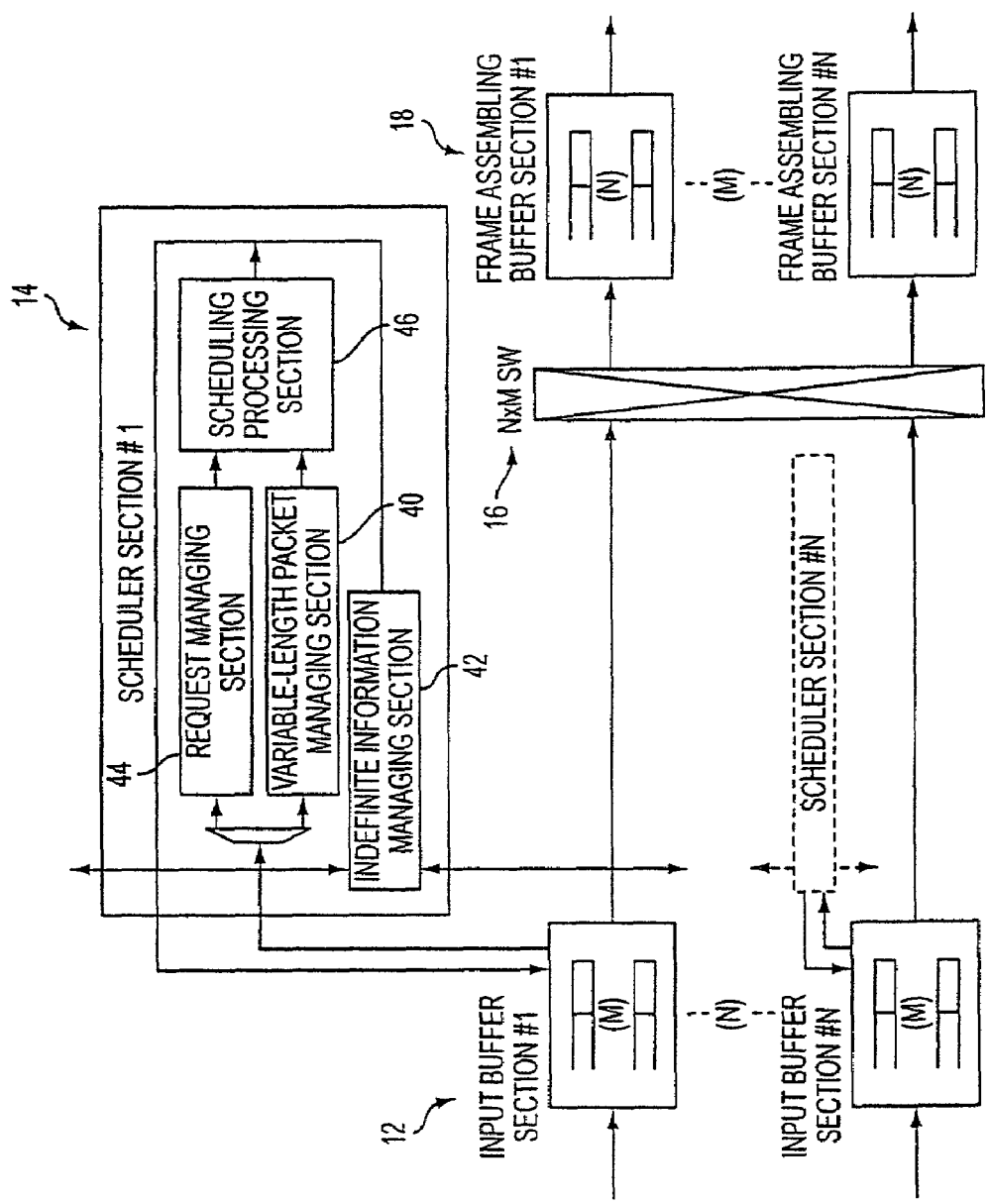
FIG. 13 is a diagram showing a structure of a scheduler at the input side by taking the processing at the output side into consideration.

When the processing in the output buffer section 18 is taken into consideration, it is desirable that fixed-length packets generated from the same variable-length packet are continuously scheduled as far as possible at the input side although the fixed-length packets output from the output lines of the switch section 16 are arrayed in such a state that the packets from a plurality of input lines are mixed. FIG. 13 shows a structure of an inter-line scheduler 14 that takes this point into consideration. A variable-length packet-managing section 40 of the scheduler section manages the transmission state of variable-length packets by logic output lines. When a first fixed-length packet that constitutes a variable-length packet has been transmitted, a flag is set, and this flag is cleared when a final packet has been transmitted. In this way, the state of a transmission of a variable-length packet is identified. An indefinite information managing section 42 manages lines of which reading has been determined for other input line, a request managing section 44 manages the number of read requests from the input buffer section, and a scheduling processing section 46 determines a transmission logic output line based on request information, indefinite information, and a variable-length packet transmission state.

The scheduling processing section 46 decides for each logic output line whether a fixed-length packet that constitutes a variable-length packet is currently being transmitted or not, and selects with priority a logic output line that is currently transmitting the packet for the scheduling. This makes it easy to collectively read fixed-length packets that constitute one variable-length packet. Therefore, it becomes possible to decease the time for waiting for variable-length packets at the output side, and this results in a reduction in buffer volume of variable-length packet assembling at the output side.

Detailed examples of scheduling operation will be explained with reference to FIG. 14 and FIG. 15. To facilitate the explanation, the operation of 3×3 switches will be explained as an example. Each input line has logic queues (hereinafter to be referred to as a VOQ: Virtual Output Queue) 47 logically divided into output lines. Each VOQ has a variable-length packet state register 48 that shows a variable-length packet transmission state. Each VOQ is further divided into a plurality of queues by a plurality of QoS classes, and these queues are omitted from the drawings.

The variable-length packet state register 48 is a register for identifying a VOQ that is currently transmitting a variable-length packet. When a packet has been read from a buffer, the packet type of the packet is identified. When the packet is not a variable-length packet end packet, the register 48 is set to "1", and when the packet is a variable-length packet end packet, the register 48 is reset. When the register 48 is in a state of being set to "1", the scheduler handles this state as a variable-length packet transmission state. Whether the read packet is a variable-length packet end packet or not can be judged by referring to a packet identification bit of the packet header.

The scheduling processing section 46 determines a read VOQ along the following two steps for each input line by referring to the variable-length packet state register 48.

Step 1: Only VOQs from which variable-length packets are currently being transmitted are scheduled.

Step 2: Only when read VOQs have not been decided at the step 1, the VOQs from which variable-length packets have not yet been transmitted are scheduled.

Figure 14:
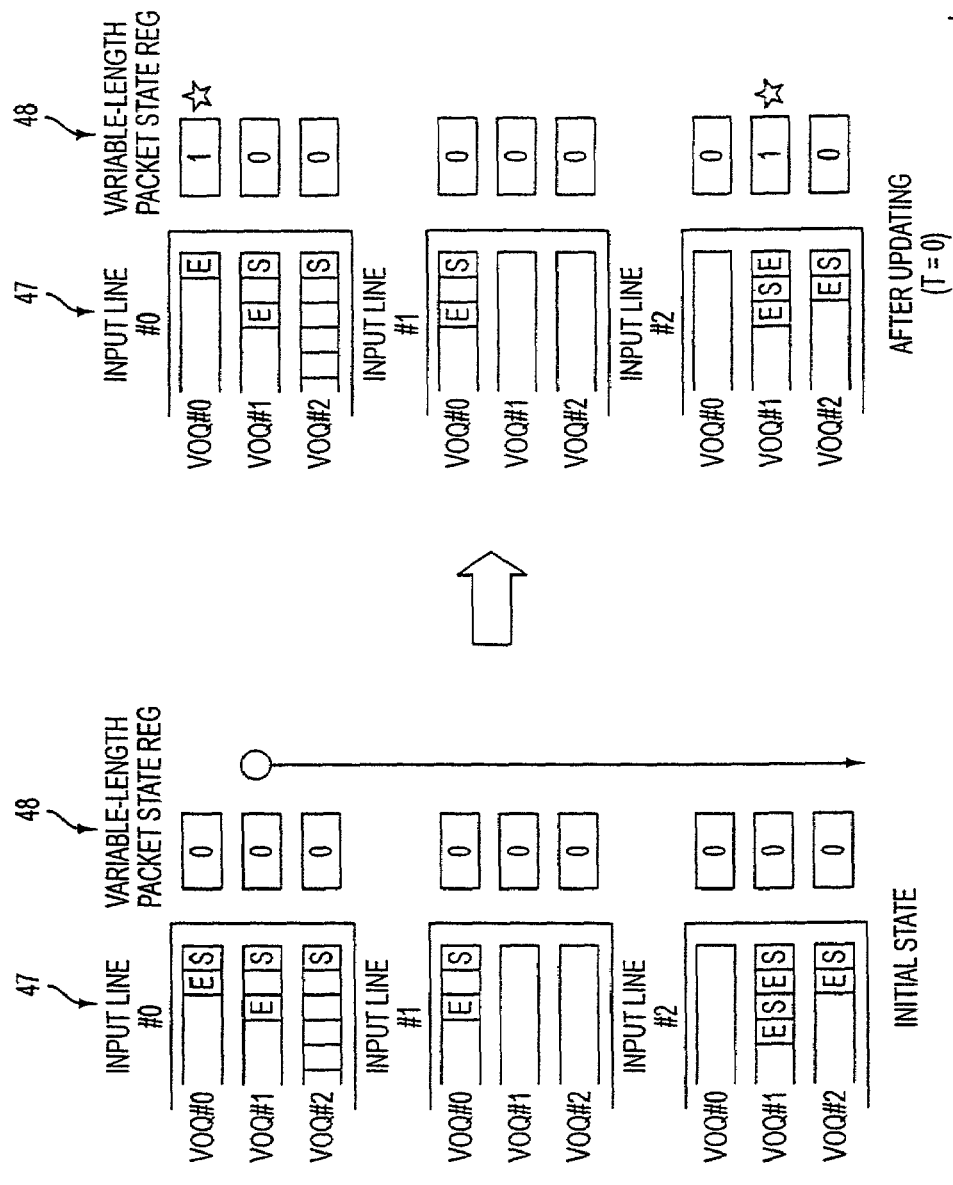
FIG. 14 is a diagram showing one example of the operation of the scheduler shown in FIG. 13.
Figure 15:
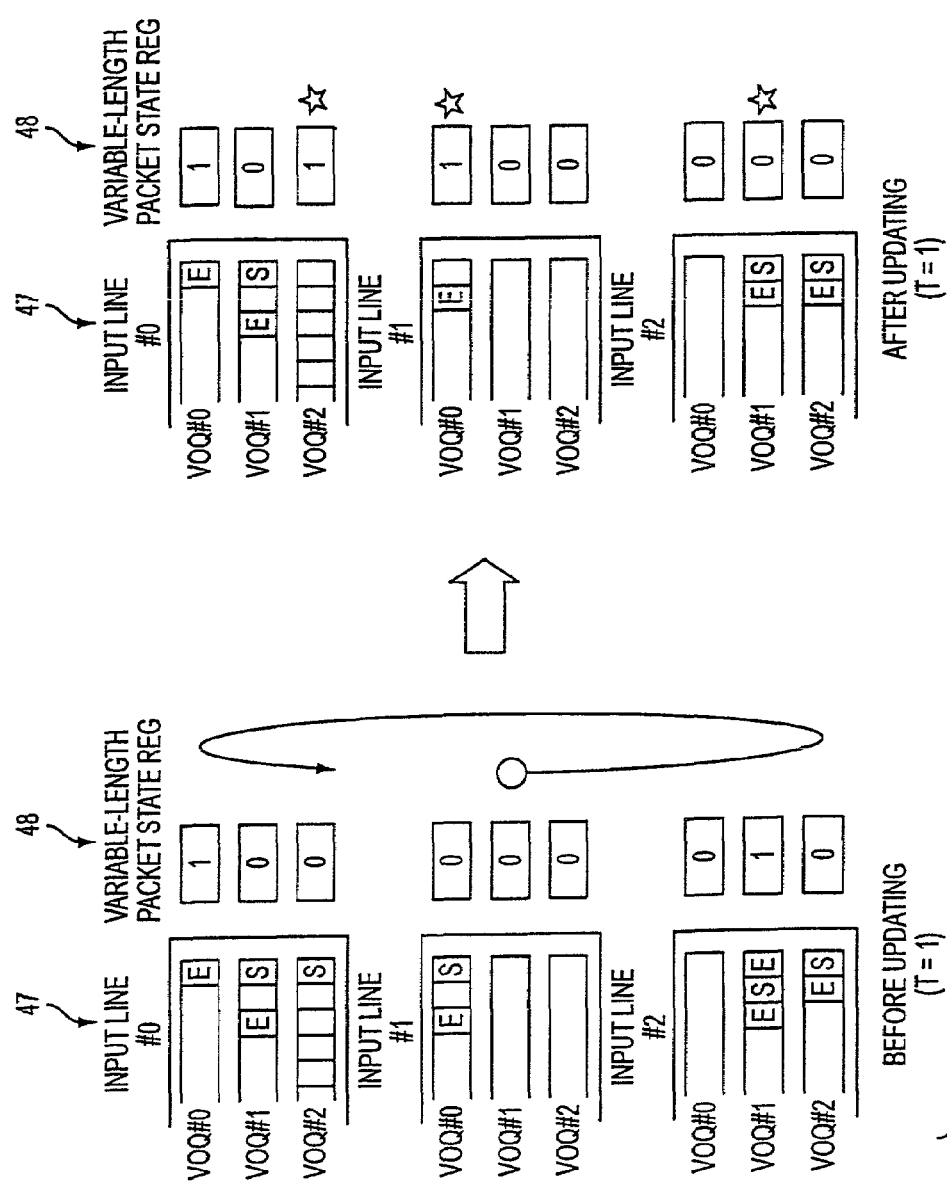
FIG. 15 is a diagram showing another example of the operation of the scheduler shown in FIG. 13.

First, as an initial state, packets are stored as shown on the left side of FIG. 14. It is assumed that the scheduling is executed starting from an input line #0 to an input line #1 and to an input line #2. The input line for starting the scheduling (a round in FIG. 14) is updated for each scheduling period according to a predetermined rule.

(1) A scheduling operation when T=0

In the input line #0, all the VOQs are in the state that variable-length packets have not yet been transmitted. Therefore, no VOQ has been decided yet at the step 1. Accordingly, at the step 2, a read VOQ is determined based on the round robin method from among lines from which variable-length packets have not yet been transmitted (all the VOQs in this example). It is assumed that VOQ #0 has been selected. A scheduling is executed in a similar step in the input line #1 (a read VOQ is expressed by a ★ mark in FIG. 14). As the VOQ #0 has already been selected by the input line #0, it is not possible to select any VOQ when T=0. It is assumed that VOQ #1 has been selected in the input line #2.

(2) An updating of a variable-length packet state register when T=0

Packets are read from VOQs that have been determined by the scheduling processing, and the variable-length packet state registers are updated according to the types of packets that have been read out.

When T=0, packets are read from the input line #0-VOQ #0 and the input line #2-VOQ #1 respectively. As these read packets are not variable-length packet end packets, the variable-length packet state registers are set to "1" (refer to the right side in FIG. 14). Based on this setting, the input line #0-VOQ #0 and the input line #2-VOQ #1 are handled as variable-length packet transmitting VOQs in the next scheduling period, and the scheduling is carried out with a priority set to these packets.

The scheduling operation when T=1 will be explained with reference to FIG. 15. When T=1, the start input line is updated, and the scheduling is carried out starting from an input line #1 to an input line #2 and to an input line #0.

(3) A scheduling operation when T=1

In the input line #1, all the variable-length packet state registers 48 are "0". Therefore, the VOQ #0 is selected as a read VOQ from among the VOQs from which variable-length packets have not yet been transmitted.

In the input line #2, there is a VOQ from which a variable-length packet is currently being transmitted. Therefore, this VOQ is selected with priority. In this example, there is only the VOQ #1 as the VOQ from which a variable-length packet is currently being transmitted. Therefore, the VOQ #1 is selected as the read VOQ. When there are a plurality of VOQs, a VOQ is selected based on the round robin method.

Next, in the input line #0, there is also a VOQ from which a variable-length packet is currently being transmitted. Therefore, similarly, an attempt is made to determine a read VOQ with priority from VOQs from which variable-length packets are currently being transmitted. However, the VOQ #0 has already been selected by the input line #1, and thus, the VOQ #0 cannot be selected. Accordingly, a read VOQ is selected from among VOQs from which variable-length packets have not yet been transmitted. In this example, the VOQ #1 and the VOQ #2 are the VOQs from which variable-length packets have not yet been transmitted. Therefore, the VOQ #2 is selected as the read VOQ based on the round robin method and because VOQ #1 was selected by input line #2. As explained above, when there is a VOQ from which a variable-length packet is currently being transmitted, and when this VOQ is being selected by other input line and the VOQ from which a variable-length packet is currently being transmitted cannot be selected, a VOQ from which a variable-length packet has not yet been transmitted is selected.

(4) An updating of a variable-length packet state register when T=1

Packets are read from VOQs that have been selected by the scheduling processing, and the variable-length packet state registers are updated according to the types of packets that have been read out.

When T=1, packets are read from the input line #0-VOQ #2, the input line #1-VOQ #0 and the input line #2-VOQ#1 respectively.

As these read packets read from the input line #0-VOQ #2 and the input line #1-VOQ #0 respectively are not variable-length packet end packets, the variable-length packet transmission registers are set to "1". Based on this setting, the input line #0-VOQ #2 and the input line #1-VOQ #0 are handled as variable-length packet transmitting VOQs in the next scheduling period, and the scheduling is carried out with a priority set to these packets.

On the other hand, the packet that has been read from the input line #2-VOQ #1 is a variable-length packet end packet. Therefore, the variable-length packet state register is cleared to "0". Accordingly, this VOQ is handled as a VOQ from which a variable-length packet has not yet been transmitted in the next scheduling period.

As explained above, when a VOQ from which a variable-length packet is currently being transmitted is scheduled with priority as far as possible, it becomes easier to continuously read packets transferred from one input line for each VOQ. As a result, it becomes possible to decrease the time for waiting for variable-length packets at the output side.

Figure 16:
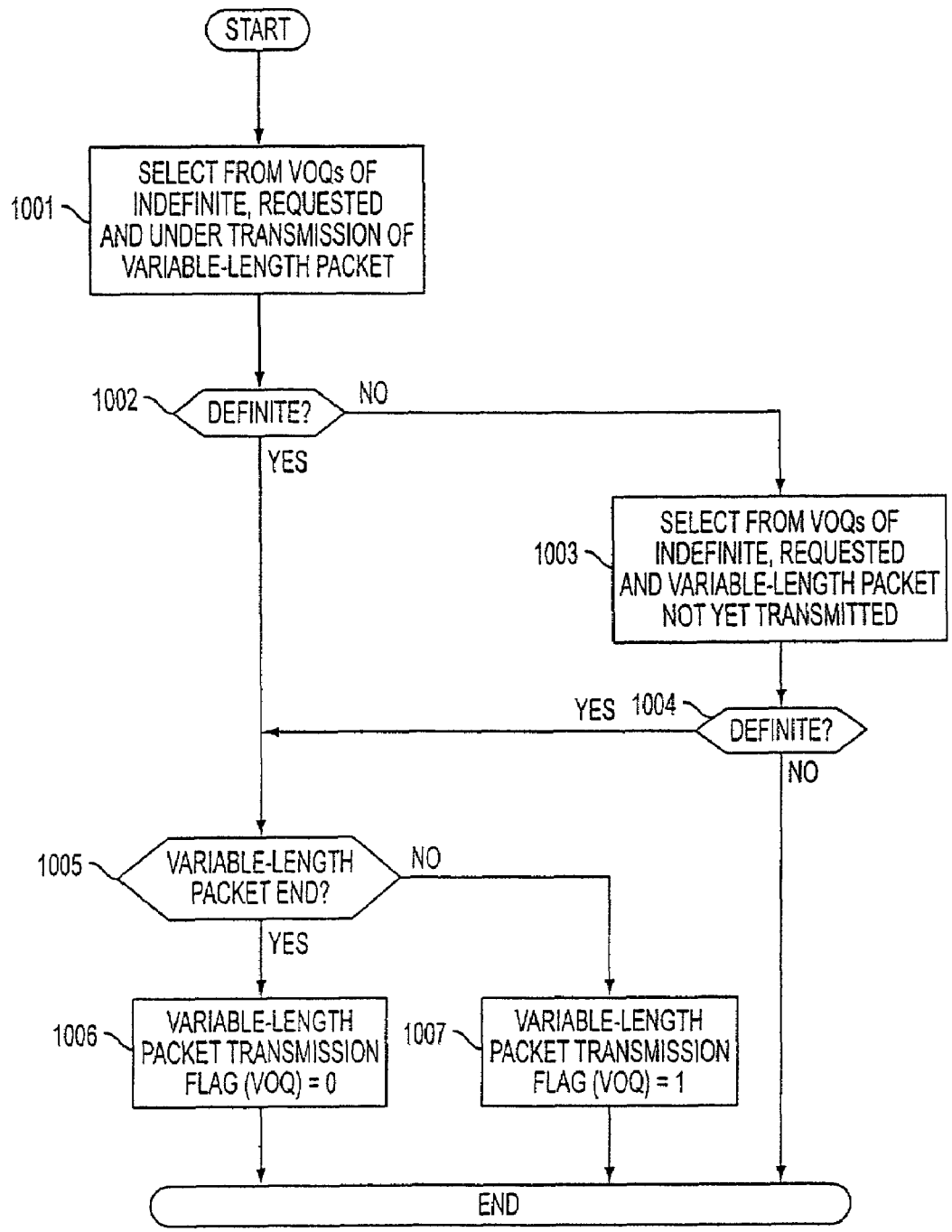
FIG. 16 is a flowchart of the operation of the scheduler shown in FIG. 13.

FIG. 16 shows a flowchart of this scheduling processing. This flowchart is a scheduling processing flow in one input line.

Steps 1001 to 1004 show the scheduling process. First, at the step 1001, a VOQ from which a variable-length packet is currently being transmitted is scheduled with priority. In this case, "indefinite" means that a VOQ has not yet been selected by another input line. "Requested" means that packets are stored in the buffer. "Under transmission of a variable-length packet" means a state that "1" has been set to a variable-length packet state register. At the step 1002, a decision is made as to whether a read VOQ has been definite in the processing at the step 1001. When a read VOQ has been decided, the step proceeds to a process of updating the variable-length packet state register. When a read VOQ has not yet been decided, the step proceeds to a process of scheduling a VOQ from which a variable-length packet has not yet been transmitted.

The processing at the step 1003 is executed only when a VOQ has not been decided at the step 1001. This step 1003 is for executing the scheduling of a VOQ from which a variable-length packet has not yet been transmitted (the variable-length packet state register=0). The step 1004 is for deciding whether a read VOQ has been decided at the step 1003 or not. When a read VOQ has not yet been decided, the scheduling processing is finished, and when a read VOQ has been decided, the process proceeds to a step of updating the variable-length packet state register.

Steps 1005 to 1007 are the process for updating the variable-length packet state register. At these steps, a packet is read out from a VOQ that has been determined by the scheduling processing. A type of packet that has been read is judged. When the packet is not a variable-length packet end packet, the variable-length packet state register is set to "1". When the packet is a variable-length packet end packet, this register is cleared.

Figure 17:
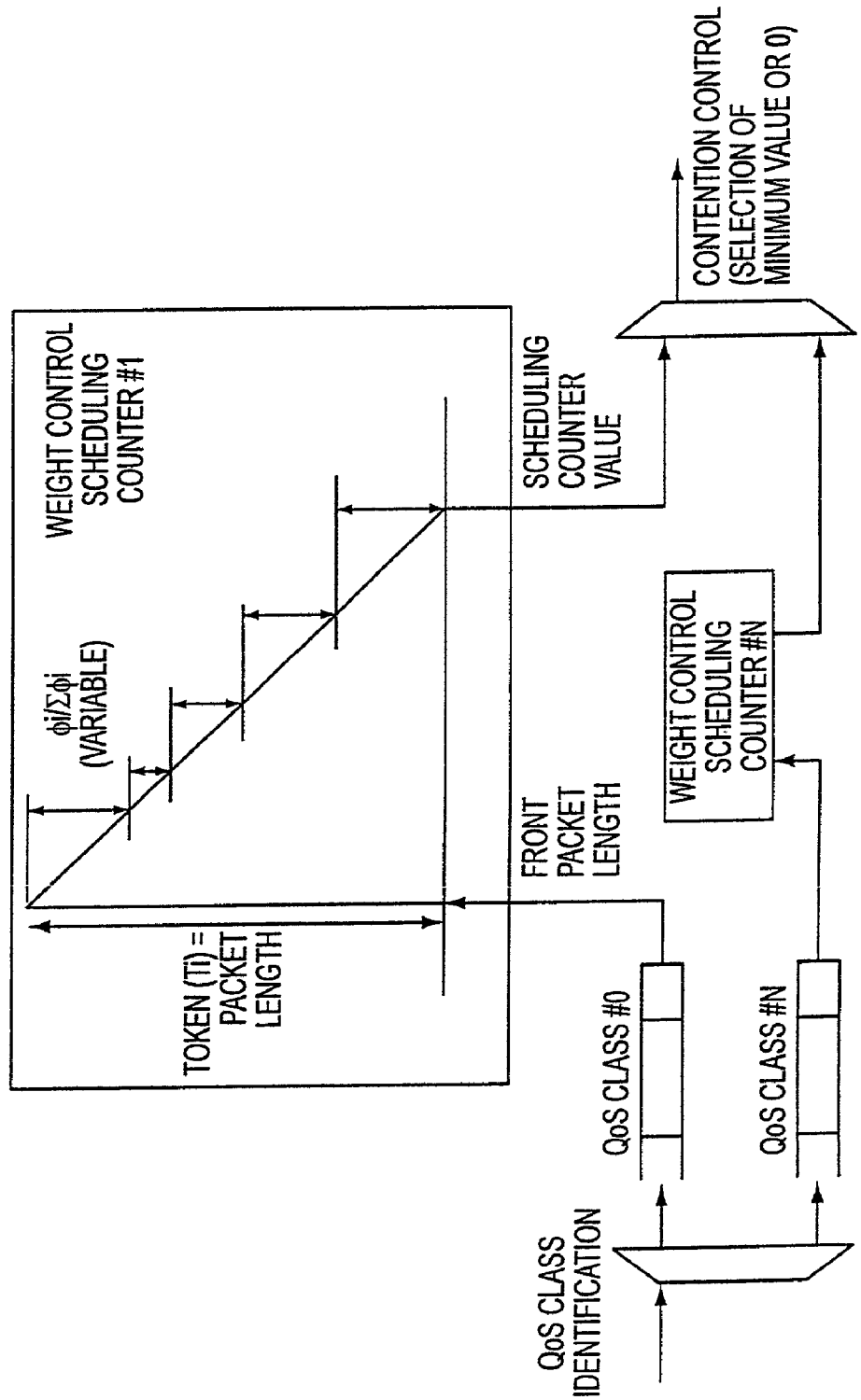
FIG. 17 is a diagram showing a concept of a first example of a QoS control of a variable-length packet in the present invention.

In the variable-length-based QoS control section 30 shown in FIGS. 8, 10 and 11, it is necessary to carry out a QoS control by taking the packet length into consideration. FIG. 17 shows a concept of one example of a method for realizing a QoS control taking the packet length into consideration. In the variable-length-based QoS control section 30 shown in FIG. 8, a counter value (to be called a token in this case) is provided corresponding to the packet length of the front packet buffered in each QoS class. For the token value, the packet length, for example, can be used as it is when a normalized value as shown in the equation (5) is used as a weight value ($\Phi_i$) for each QoS class.

$$\Phi_i = R \times \tau \times \Phi_{is} / \Sigma \Phi_{is} \quad (5)$$

Where R represents a total target link rate, $\tau$ represents a unit time for an internal processing (for example, fixed-length packet time), $\Phi_{is}$ represents a weight value allocated to each QoS class, and $\Sigma \Phi_{is}$ represents a total sum of $\Phi_{is}$ for active QoS classes. The suffix i corresponds to a number attached to the QoS class. The value of $R \times \tau \times \Sigma \Phi_{is}$ in the equation (5) is constant. Therefore, it is possible to use the weight $\Phi_{is}$ in each QoS class in place of $\Phi_i$ that is calculated from the equation (5).

As shown in FIG. 17, the token value ($T_i$) corresponding to the front packet of each QoS class is subtracted by $\Phi_{is}/\Sigma \Phi_i$ for each unit time ($\tau$). When it is possible to read a packet, a packet of the QoS class that has a token value of either a minimum token value (in the case of the packet of the best effort class) or 0 (in the case of the packet of the bandwidth guaranteed class of which rate is prescribed) is read out.

According to this method, it is possible to proportionally allocate the bandwidth to each QoS class among active QoS classes according to the weight value like the WFQ. Further, as it is not necessary to hold an expected finish time F (i, k) for all the queued packets like the WFQ, it is possible to decrease the scale of hardware. Further, for achieving a real-time scheduling, it is also possible to control the priority between this scheduling and the bandwidth guarantee-type QoS scheduling that prescribes a reading rate. When $\Sigma \Phi_i$ is made constant without depending on the number of active queues, this scheduling method can be directly used as a bandwidth guarantee-type QoS class scheduler that prescribes a reading rate. Therefore, it is possible to decrease the scale of hardware and to decrease the design process by making the circuits common. Further, it is also possible to set in a pipeline processing the processing of adding tokens, the processing of subtracting values from the tokens, and the processing of comparing tokens of QoS classes and selectively reading a queue of a QoS class that has a minimum token or a 0 token. This makes it possible to carry out high-speed processing.

Figure 18:
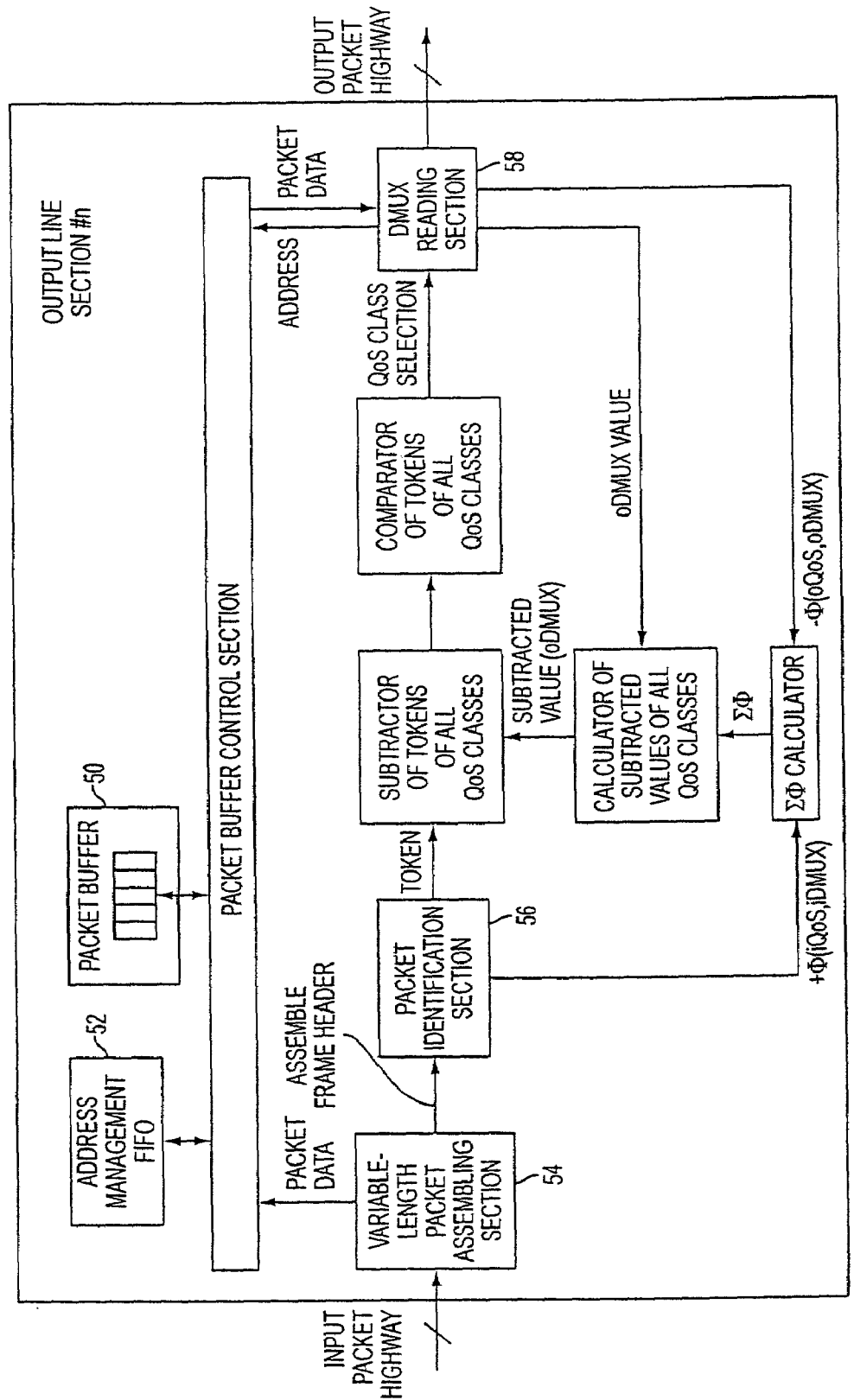
FIG. 18 is a diagram showing one example of a circuit structure for achieving the QoS control shown in FIG. 17.
Figure 19:
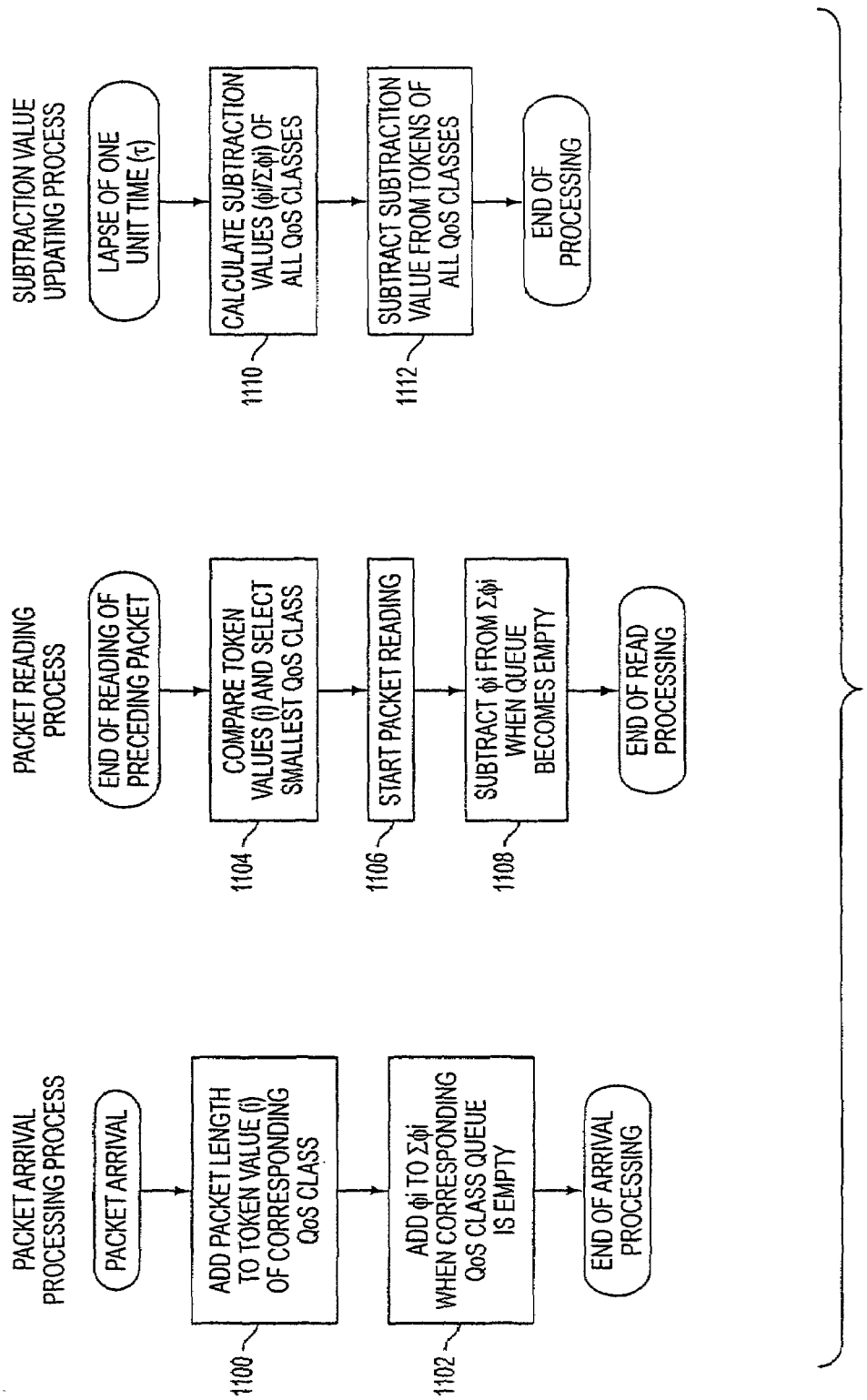
FIG. 19 is a flowchart of the operation of the QoS control shown in FIG. 17.

FIG. 18 shows an example of an actual hardware structure, and FIG. 19 shows a flowchart. The examples shown correspond to a structure that, in the variable-length-based QoS control section, the packet buffer is common to the variable-length packet assembling section and the QoS control section, and only the address for writing into the buffer is transferred. The fixed-length packet that has been input to the output line section is written into a packet buffer 50. An address management FIFO 52 structures a FIFO chain of addresses for each input line and for each contracted QoS class. A variable-length packet assembling section 54 manages the arrival of one variable-length packet in each QoS class. For one variable-length packet that has arrived, the variable-length packet assembling section 54 copies the address of a corresponding packet buffer, and constructs an address FIFO for each QoS class and for each DMUX. Further, the variable-length packet assembling section 54 transfers header information to a packet identification section 56. The packet identification section 56 selects information necessary for the QoS scheduling such as a QoS class, a DMUX number, a packet length, etc., from the packet header. The packet identification section 56 selects a read QoS class according to a processing flow shown in FIG. 19 to be described later. A DMUX reading section 58 reads a corresponding packet from the packet buffer into an output packet highway. In this case, the DMUX reading section 58 manages a time slot fixed for each DMUX, posts the number of the DMUX to be scheduled at the timing of each time slot, and executes the processing flow shown in FIG. 19 for the corresponding DMUX.

In the processing flow shown in FIG. 19, three processes operate in relation to each other. In a packet arrival processing process, a token value is added to each QoS class of a corresponding variable-length packet when the variable-length packet has arrived or when the variable-length packet has come to the front of the FIFO in the address management FIFO 52 (at step 1100). Then, $\Phi_i$ is added to the total sum of the weight values $\Sigma\Phi_i$ (at a step 1102). In a packet reading process, the token values (i) of QoS classes are compared and a QoS class having a minimum token value is selected, after the reading of the variable-length packets has been finished and before the next variable-length packet is selected, or when the selection of a variable-length packet is not being carried out in the initial state (at a step 1104). Then, the reading of a packet of the corresponding QoS class is started (at a step 1106). In this case, when there is no other packet that is being queued to the same QoS class and when the queue has no packet, $\Phi_i$ is subtracted from the total sum of the weight values $\Sigma\Phi_i$ (at a step 1108). On the other hand, in a subtraction value processing process, subtraction values are calculated for all the QoS classes for each unit time (at a step 1110), and subtraction values are subtracted from the token values of the all QoS classes (at a step 1112).

Figure 20:
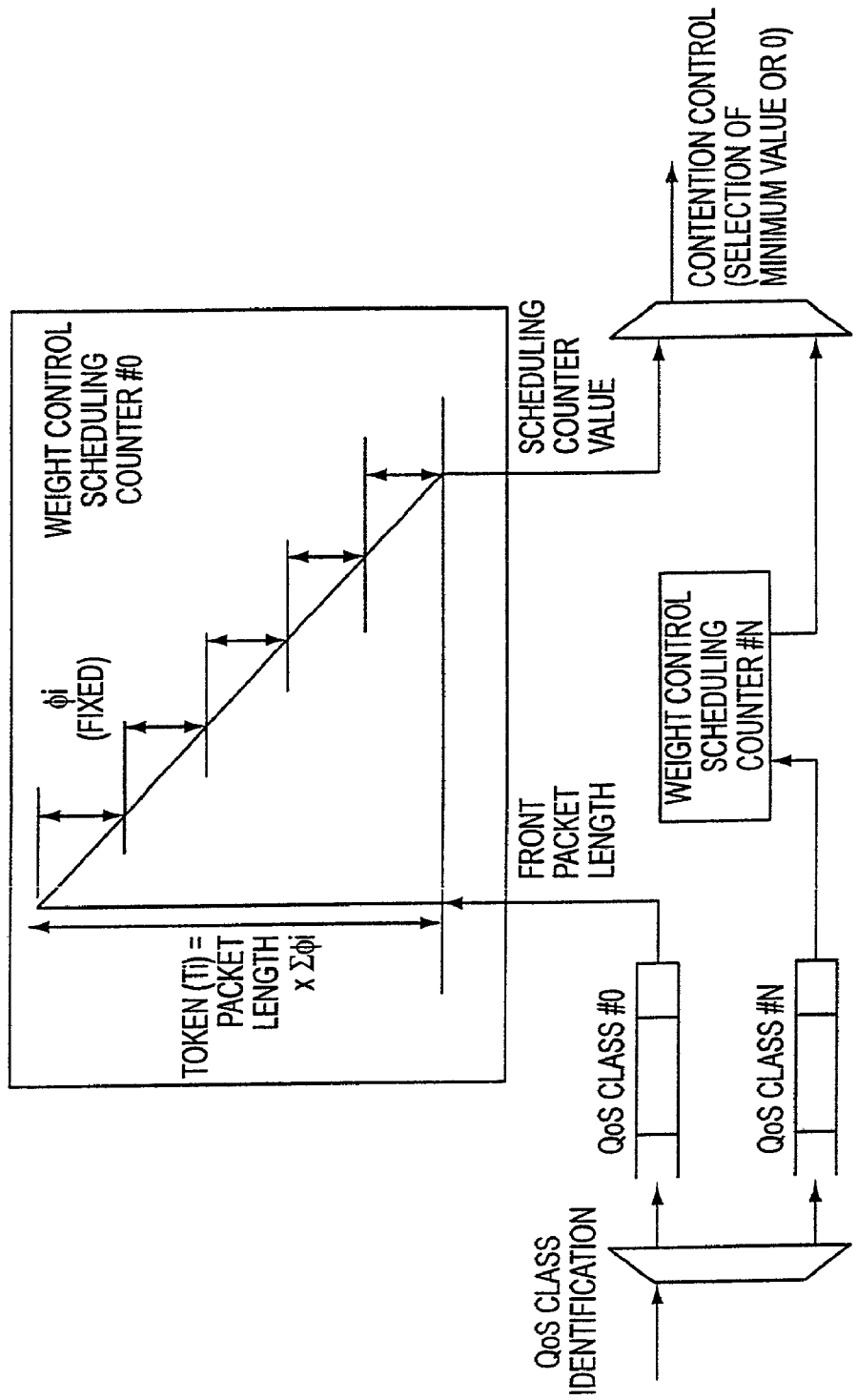
FIG. 20 is a diagram showing a concept of a second example of a QoS control of a variable-length packet.

FIG. 20 is a diagram that shows a concept of a second example of the QoS control taking a packet length into consideration. A token value ($T_i$) is replaced with a token value $x\Sigma\Phi_i$, and $\Phi_i$ is used as a subtraction value for each unit time.

According to this method, it is possible to avoid a division processing of $\Phi_i/\Sigma\Phi_i$ that generally takes processing time. However, $\Sigma\Phi_i$ that reflects the state of the QoS class is updated only when token values are added by reading the front packet, as compared with the above method where $\Sigma\Phi_i$ can be updated for each unit time. Therefore, according to this method, there arises some characteristic deterioration in fairness.

Figure 21:
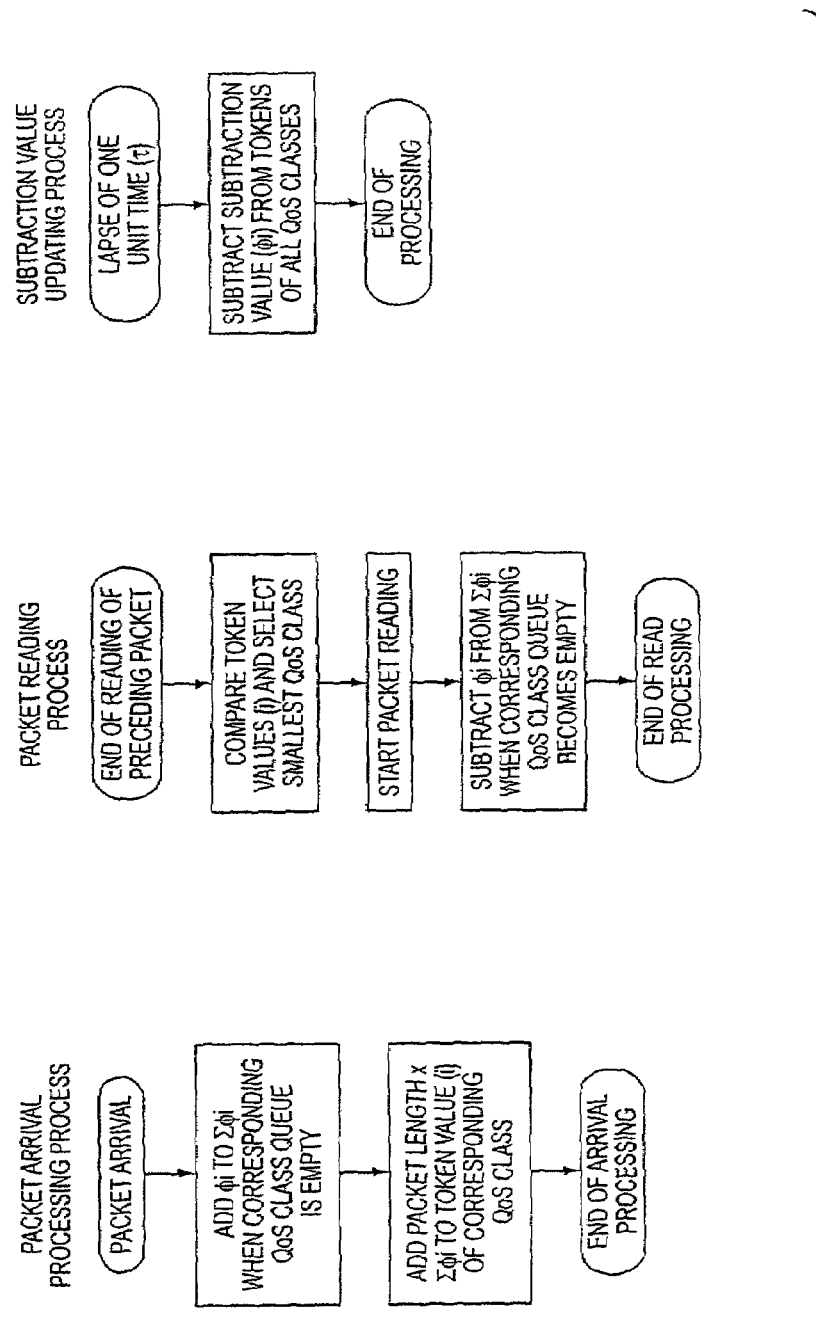
FIG. 21 is a flowchart of the operation of the QoS control shown in FIG. 20.

FIG. 21 shows a flowchart. In the packet arrival processing process, a packet length $x\Sigma\Phi_i$ is used in place of a packet length, as an addition value of the token value. In the subtraction value processing process, $\Phi_i$ is used in place of $\Phi_i/\Sigma\Phi_i$, as a subtraction value.

Figure 22:
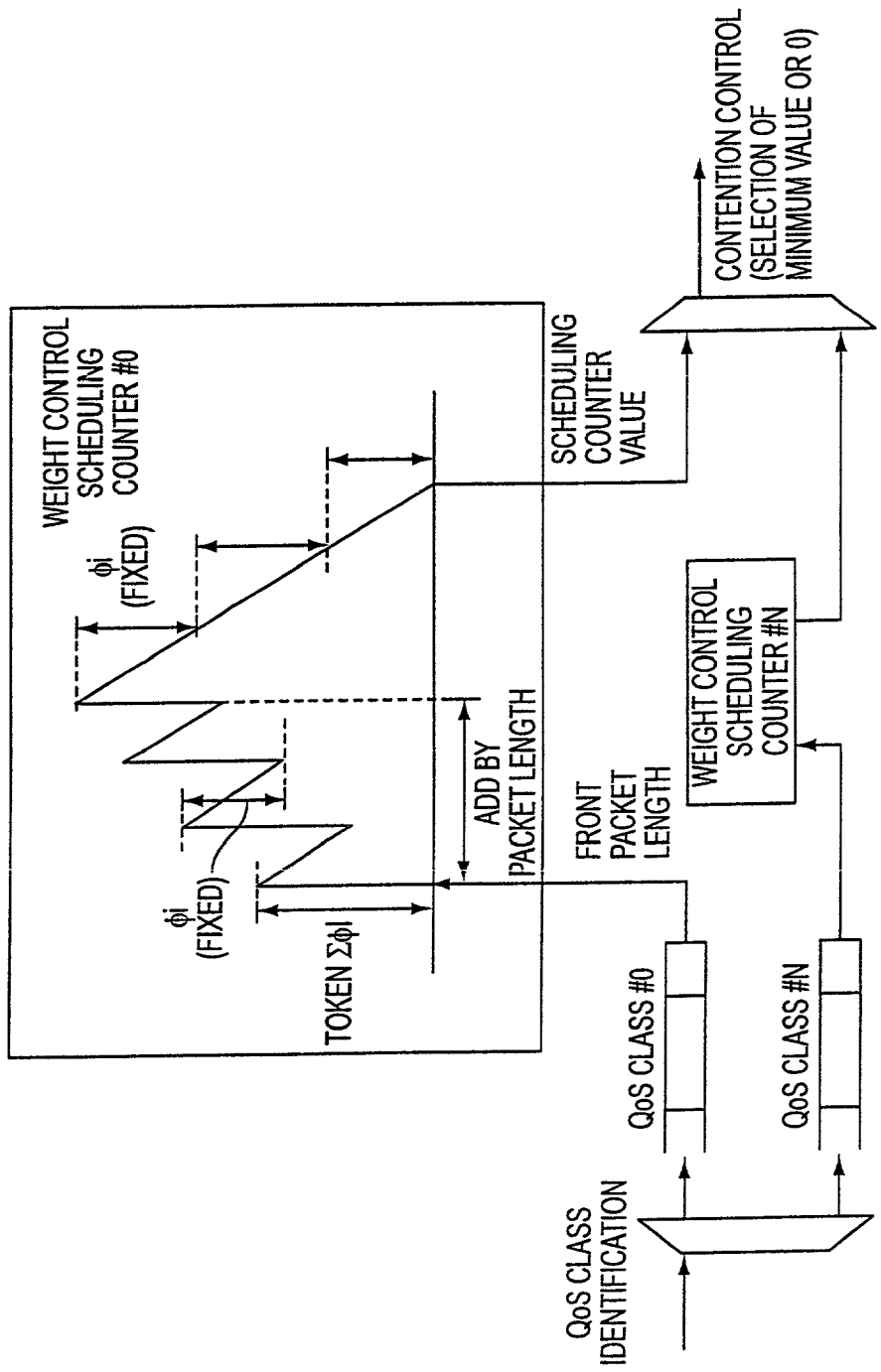
FIG. 22 is a diagram showing a concept of a third example of a QoS control of a variable-length packet.

FIG. 22 shows a third example of the QoS control taking a packet length into consideration. According to this method, instead of replacing a token value with a token value $x\Sigma\Phi_i$, the addition of $\Sigma\Phi_i$ is repeated by the number corresponding to the packet length.

According to this method, the system becomes slightly more complex as a counter is necessary for managing the number of tokens. However, it becomes possible to decrease the hardware volume as the multiplication processing can be avoided. Further, by using the latest $\Sigma\Phi_i$ each time when the $\Sigma\Phi_i$ is added by the number corresponding to the packet length, the frequency of reflecting the state of the QoS class increases. Therefore, it is possible to achieve a characteristic improvement in fairness.

Figure 23:
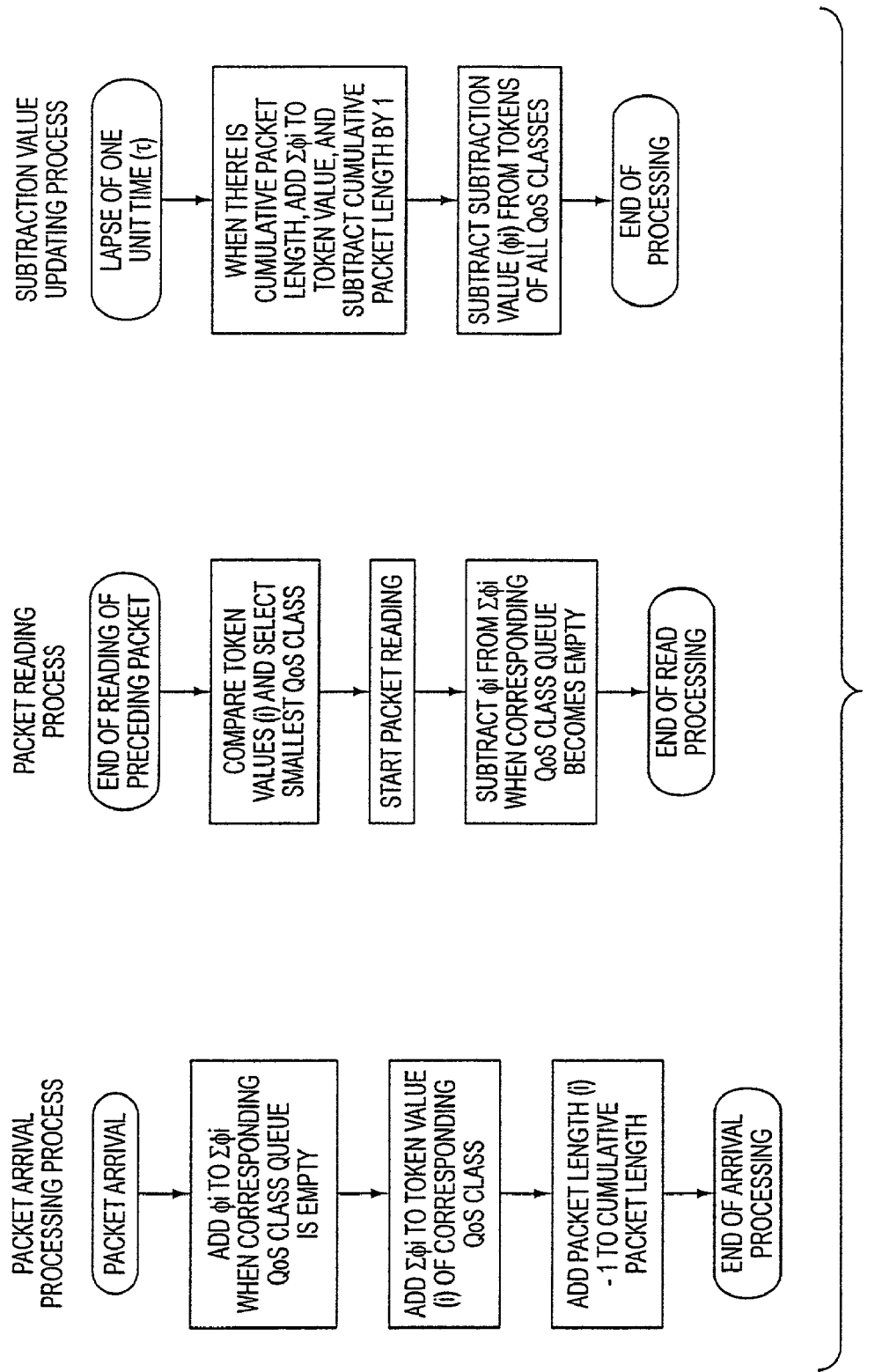
FIG. 23 is a flowchart of the operation of the QoS control shown in FIG. 22.

FIG. 23 shows a flowchart. According to this method, in the packet arrival processing process, $\Sigma\Phi_i$ is used in place of a packet length, as an addition value of the token value. A cumulative packet length counter manages the number of added $\Sigma\Phi_i$. In the subtraction value processing process, the addition of token values is repeated until when the cumulative packet length counter value becomes 0. $\Phi_i$ is used in place of $\Phi_i/\Sigma\Phi_i$, as a subtraction value.

Figure 24:
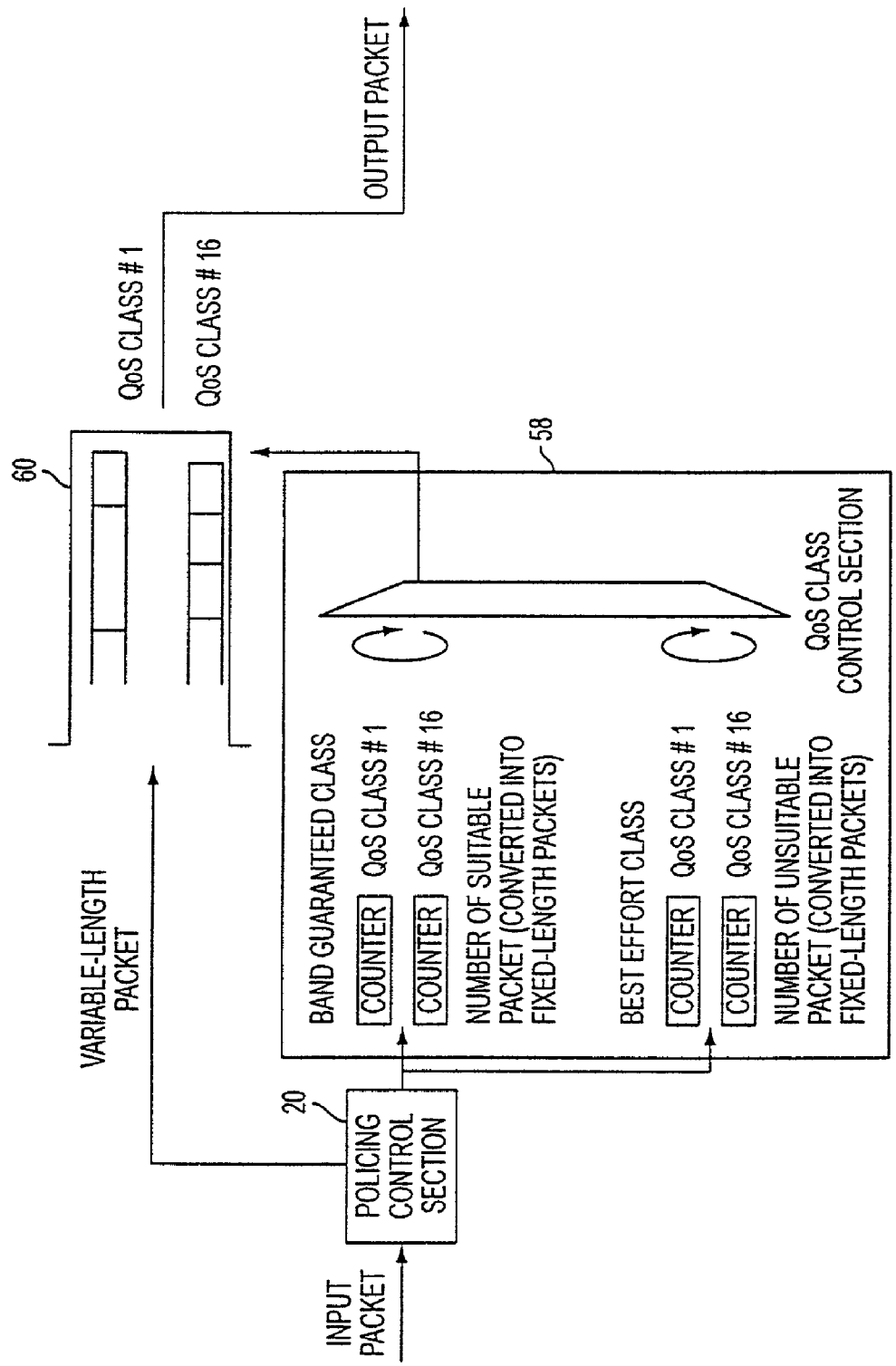
FIG. 24 is a diagram showing a first example of a QoS control capable of achieving a control of a variable-length packet of the minimum bandwidth guaranteed class.

FIG. 24 shows a concept of one example of the QoS control taking a packet length into consideration for the variable-length packet of the minimum bandwidth guaranteed class for which the minimum bandwidth is guaranteed and the use of a surplus bandwidth is permitted. For the input variable-length packet of the minimum bandwidth guaranteed class, a policing control section 20 usually provided at the pre-stage of the switch 14 tags the packet that has arrived in excess of the guaranteed minimum bandwidth. Thus, it is possible to discriminate between the packet of the bandwidth guaranteed fraction and the packet of the best effort fraction. A QoS control section 58 at a later stage of the switch section 14 counts the number of fixed-length packets that constitute the arrived variable-length packet for each QoS class (for example, 16 classes). It is preferable to arrange as follows. A counter for the bandwidth guaranteed class and a counter for the best effort class are prepared for each of all the QoS classes. Both counters are used for the minimum bandwidth guaranteed class, only the counter for the best effort class is used for the best effort class, and only the counter for the bandwidth guaranteed class is used for the bandwidth guaranteed class. With this arrangement, the flexibility of the system improves.

The QoS control section 58 controls the reading with the weighting for packets having positive counter values. The algorithm of the token calculation may be any one of the above-described three. However, in this case, the packet length of the fixed-length packet is used instead of the packet length of the variable-length packet, and packets of the bandwidth guaranteed class are read according to the set rate. When there is a contention between the request from the bandwidth guaranteed class and the request from the best effort class, simply a high priority is set to the bandwidth guaranteed class or the packet is read based on the round robin method or a pre-set priority. This scheduling processing is carried out for each fixed-length packet. The counter value of the selected QoS class is subtracted by 1, and the selected QoS class is posted to a variable-length buffer section 60.

The variable-length buffer section 60 counts the number of posts for each QoS class, and reads out one variable-length packet when a cumulative number has reached a packet length of the front packet of each queue.

Based on the above, it is possible to carry out the QoS control of a variable-length packet for the minimum bandwidth guaranteed class including the bandwidth guaranteed fraction and the best effort fraction within one QoS class. According to the control method for controlling the QoS class based on threshold values of the queue by mapping within the same queue as explained with reference to FIGS. 6 and 7, there arises a limit to the queue area in that the queue area which the packets of the best effort class can use is smaller than the queue area which the packets of the bandwidth guaranteed class can use. However, this problem can be solved by this control method. Further, there does not occur the reversals of packet order that occur when the queue of one QoS class is simply divided into the two of the bandwidth guaranteed fraction and the best effort fraction.

Further, as the scheduling of the bandwidth guaranteed class and the scheduling of the best effort class can be carried out separately, it becomes possible to achieve a complex priority control such as the reading of packets based on the round robin method or by pre-setting a priority instead of simply setting a high priority to the bandwidth guaranteed class.

Figure 25:
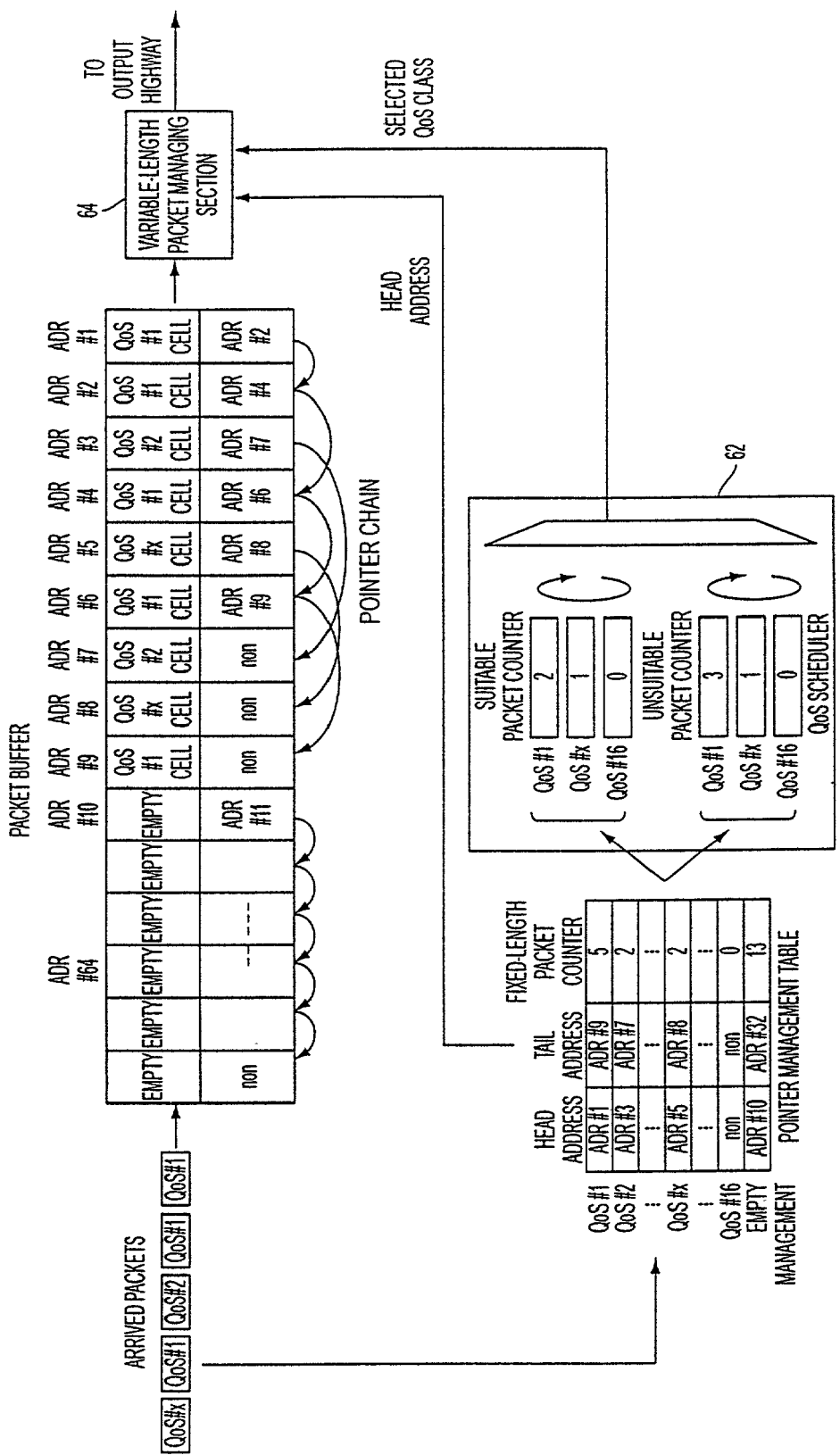
FIG. 25 is a diagram showing an example of a detailed structure for achieving the QoS control shown in FIG. 24.

FIG. 25 shows a detailed structure. This shows a case of managing the queuing to the packet buffer in the unit of fixed-length packets. However, a similar priority control can also be applied to variable-length packets by using variable-length packets instead of the continuous fixed-length packets, managing the head and the tail of the variable-length packet, and by reading each one variable-length packet continuously.

A QoS scheduler 62 counts the number of fixed-length packets that constitute the arrived variable-length packet. For packets of the minimum bandwidth guaranteed class, the QoS scheduler 62 counts these packets into a suitable packet number counter or into an unsuitable packet number counter depending on whether the frames are tagged or not. For packets of the bandwidth guaranteed class and packets of the best effort class, only one counter is used as described above. The QoS scheduler 62 selects one QoS class according to a pre-set rate, weight or priority, for each counter value that is not 0. The selected QoS class is posted to a variable-length packet managing section 64. The variable-length packet managing section 64 manages the number of selected QoS classes that have been posted, and converts the cumulative number into a packet length. When the packet number becomes larger than the packet length of the front packet of the queue for each QoS class, the variable-length packet managing section 64 outputs this variable-length packet onto an output highway.

The size and format of a fixed-length packet are optional. So long as it is possible to manage the head and tail of a variable-length packet, it is not necessary to give a header to the fixed-length packet.

Figure 26:
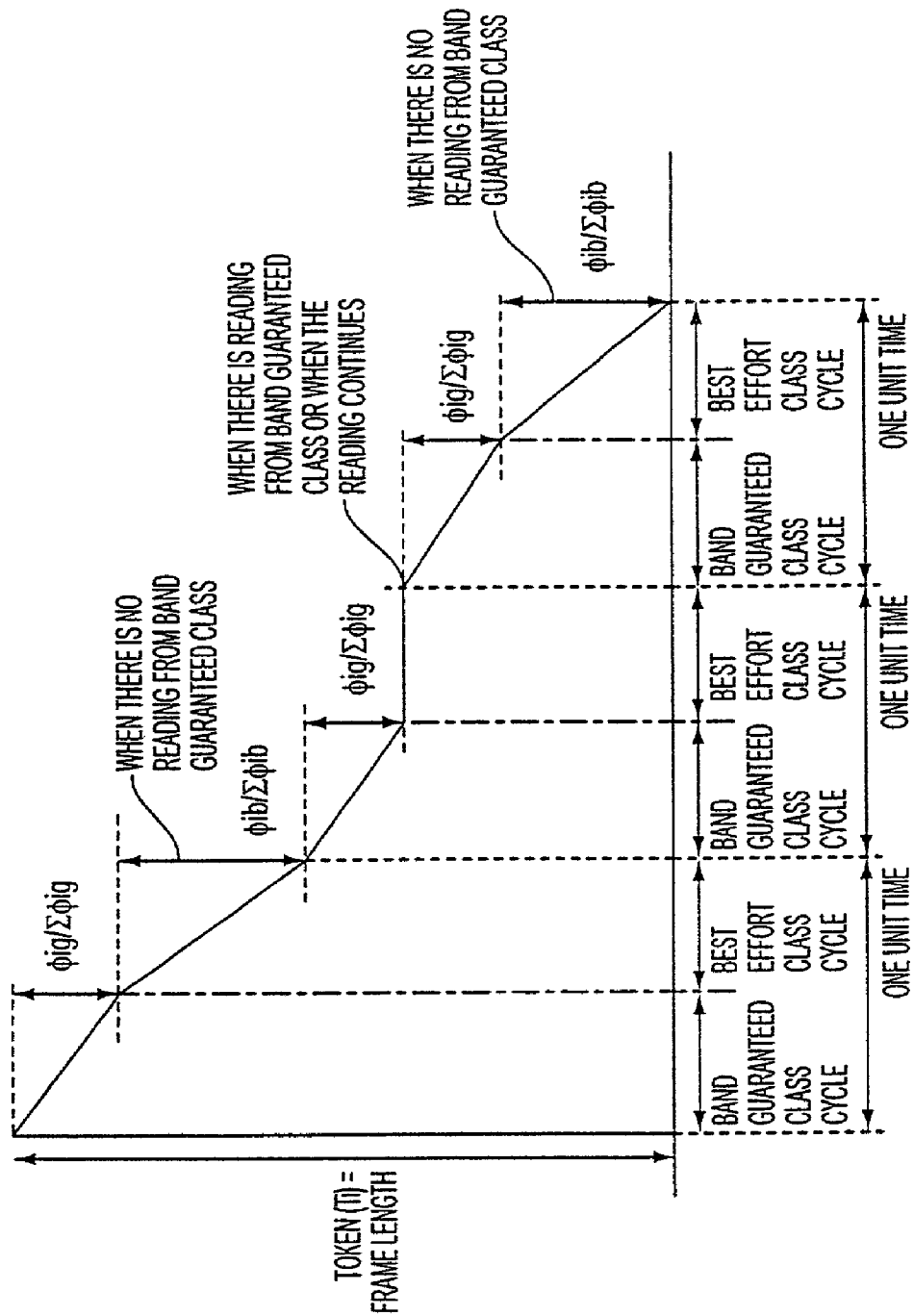
FIG. 26 is a diagram showing a second example of a QoS control capable of achieving a control of a variable-length packet of the minimum bandwidth guaranteed class.

FIG. 26 is a diagram for explaining the principle of another example of QoS control capable of achieving a variable-length packet control of the minimum bandwidth guaranteed class. FIG. 26 shows an operation of a token value of a certain QoS class. Variable-length packets that have been input are queued for each QoS class. $\Phi_{ig}$ represents a reading rate value set for the bandwidth guaranteed class. $\Phi_{ib}$ represents a weight value set for the best effort class. The $\Phi_{ib}$ of the bandwidth guaranteed class that does not include the best effort fraction is set to zero, and the $\Phi_{ig}$ of the best effort class that does not include the bandwidth guaranteed fraction is set to zero. Values other than zero are set to $\Phi_{ig}$ and $\Phi_{ib}$, for the minimum bandwidth guaranteed class.

A token subtraction processing is carried out twice including a processing for the bandwidth guaranteed class cycle and a processing for the best effort class cycle, within one unit time period. When there is no reading of a packet of the bandwidth guaranteed class in any one QoS class, the token subtraction processing for the best effort class is also carried out. When there is a reading of a variable-length packet of the bandwidth guaranteed class or when the reading of a variable-length packet of the bandwidth guaranteed class is continuing, the token processing for the best effort class cycle is not carried out. For the packet of the minimum bandwidth guaranteed class, the policing control section at the pre-stage tags in advance the frame that exceeds the minimum guaranteed band. When carrying out the scheduling for the bandwidth guaranteed class cycle and deciding the presence or absence of a frame to be read out, a decision is made that there is a packet to be read out for only the packet below the minimum guaranteed bandwidth that has no tagging. A decision is made that there is no packet to be read out for the packet that has a tagging.

Alternatively, it is also possible to carry out the token subtraction processing always for the best effort class cycle irrespective of the presence or absence of a packet of the bandwidth guaranteed class, and to use $\Sigma\Phi_{iall}$ (a total sum of $\Phi_{ig}$ and $\Phi_{ib}$ for active connections) instead of $\Sigma\Phi_{ib}$.

With the above arrangement, it is possible to carry out the scheduling in the state of a variable-length packet. It becomes possible to accommodate the minimum bandwidth guaranteed class by the simple control of carrying out the scheduling of the best effort class after the scheduling of the bandwidth guaranteed class, in the form of a variable-length packet. In general, $\Phi_{ig}$ and $\Phi_{ib}$ are different values. Therefore, of the above three token operation algorithms, only the first operation algorithm that uses a packet length as a token common to both classes can be applied.

Figure 27:
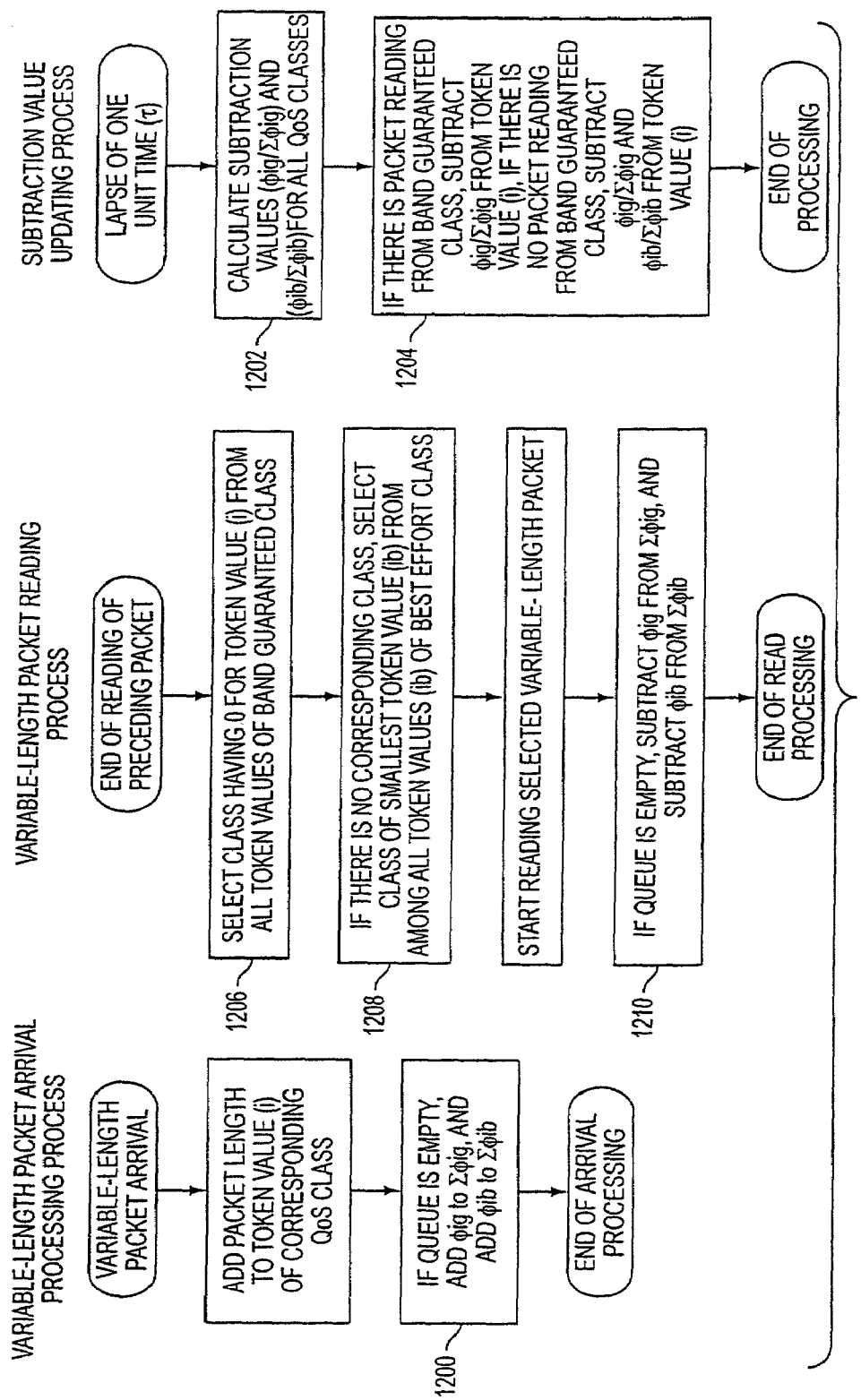
FIG. 27 is a flowchart of the operation of the QoS control shown in FIG. 26.

FIG. 27 shows a flowchart of the processing. In a variable-length packet arrival processing process, $\Sigma\Phi_i$ is separately managed as $\Phi_{ig}$ and $\Phi_{ib}$ for the bandwidth guaranteed class and the best effort class respectively (at a step 1200). Similarly, in a subtraction value updating process, $\Phi_{ig}/\Sigma\Phi_{ig}$ and $\Phi_{ib}/\Sigma\Phi_{ib}$ are managed separately instead of the subtraction value $\Phi_i/\Sigma\Phi_i$ (at a step 1202). A token subtraction processing when a packet is being read from the bandwidth guaranteed class is carried out separately from other cases (at a step 1204). In a variable-length packet reading processing, a variable-length packet is selected from a queue into which packets of the bandwidth guaranteed class have been transferred or packets of the minimum bandwidth guaranteed class without tagging have been transferred previously (at a step 1206). Next, a variable-length packet is selected from a queue into which packets of the best effort class have been transferred or packets of the minimum bandwidth guaranteed class having a tagging have been transferred previously (at a step 1208). Subtraction of $\Sigma\Phi$ is also carried out separately for the bandwidth guaranteed class and for the best effort class (at a step 1210). In the example shown in FIG. 27, it is assumed that $\Phi_{ib}$ is set to zero for the bandwidth guaranteed class and $\Phi_{ig}$ is set to zero for the best effort class. Alternatively, it may be arranged such that, in the subtraction value updating process, the subtraction of $\Sigma\Phi_{ib}$ is not carried out for the bandwidth guaranteed class and the subtraction of $\Sigma\Phi_{ig}$ is not carried out for the best effort class.

Figure 28:
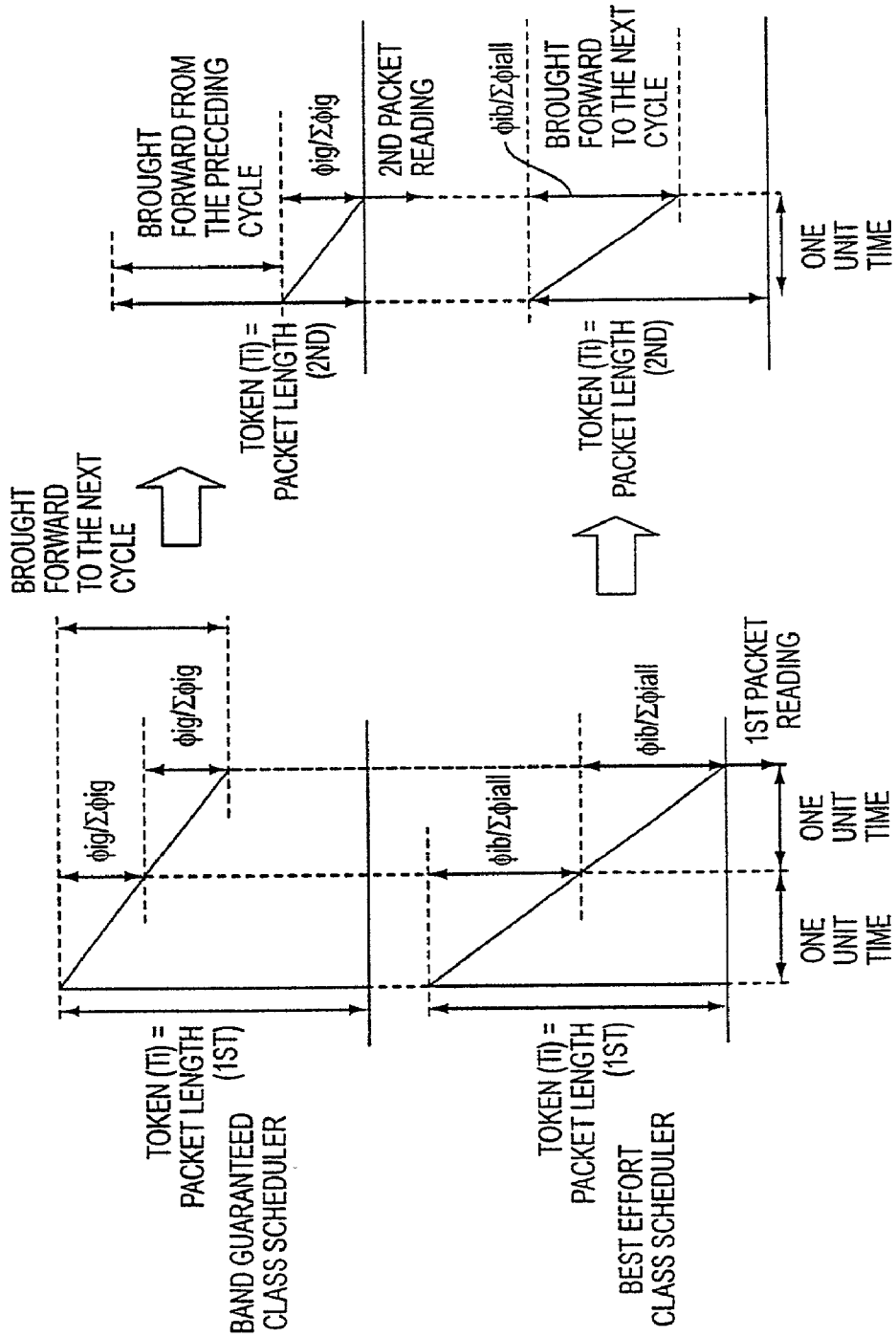
FIG. 28 is a diagram showing a third example of a QoS control capable of achieving a control of a variable-length packet of the minimum bandwidth guaranteed class.

FIG. 28 is a diagram for explaining the principle of still another example of QoS control capable of achieving a variable-length packet control of the minimum bandwidth guaranteed class. Like the case shown in FIG. 26, FIG. 28 shows the operation carried out for a token value of a certain QoS class when the first operation algorithm is applied. In this example, packets of the minimum bandwidth guaranteed class are processed in parallel by two schedulers of a scheduler for the bandwidth guaranteed class and a scheduler for the best effort class. However, for the token value, the same token value corresponding to the packet length of the front packet of a queue for each QoS class is used. In this case, the scheduler for the best effort class uses $\Sigma\Phi_{iall}$ instead of $\Sigma\Phi_{ib}$.

Packets of the minimum bandwidth guaranteed class are scheduled by the two schedulers of the scheduler for the bandwidth guaranteed class and the scheduler for the best effort class. When a variable-length packet has been first read by any one scheduler, a cumulative token subtraction value of the variable-length packet that has not been read by the other scheduler is carried forward, and this value is subtracted at the time of calculating a token value of the next variable-length packet.

According to this method, it is necessary to carry out the subtraction processing of a token separately for the bandwidth guaranteed class and for the best effort class. Therefore, the scale of hardware increases. However, as it is possible to carry out a parallel processing for both the bandwidth guaranteed class and the best effort class, a high-speed scheduling can be achieved. Further, as $\Sigma\Phi_{ig}$ and $\Sigma\Phi_{iall}$ need not coincide with each other, it is possible to apply any one of the above three operation algorithms.

Figure 29:
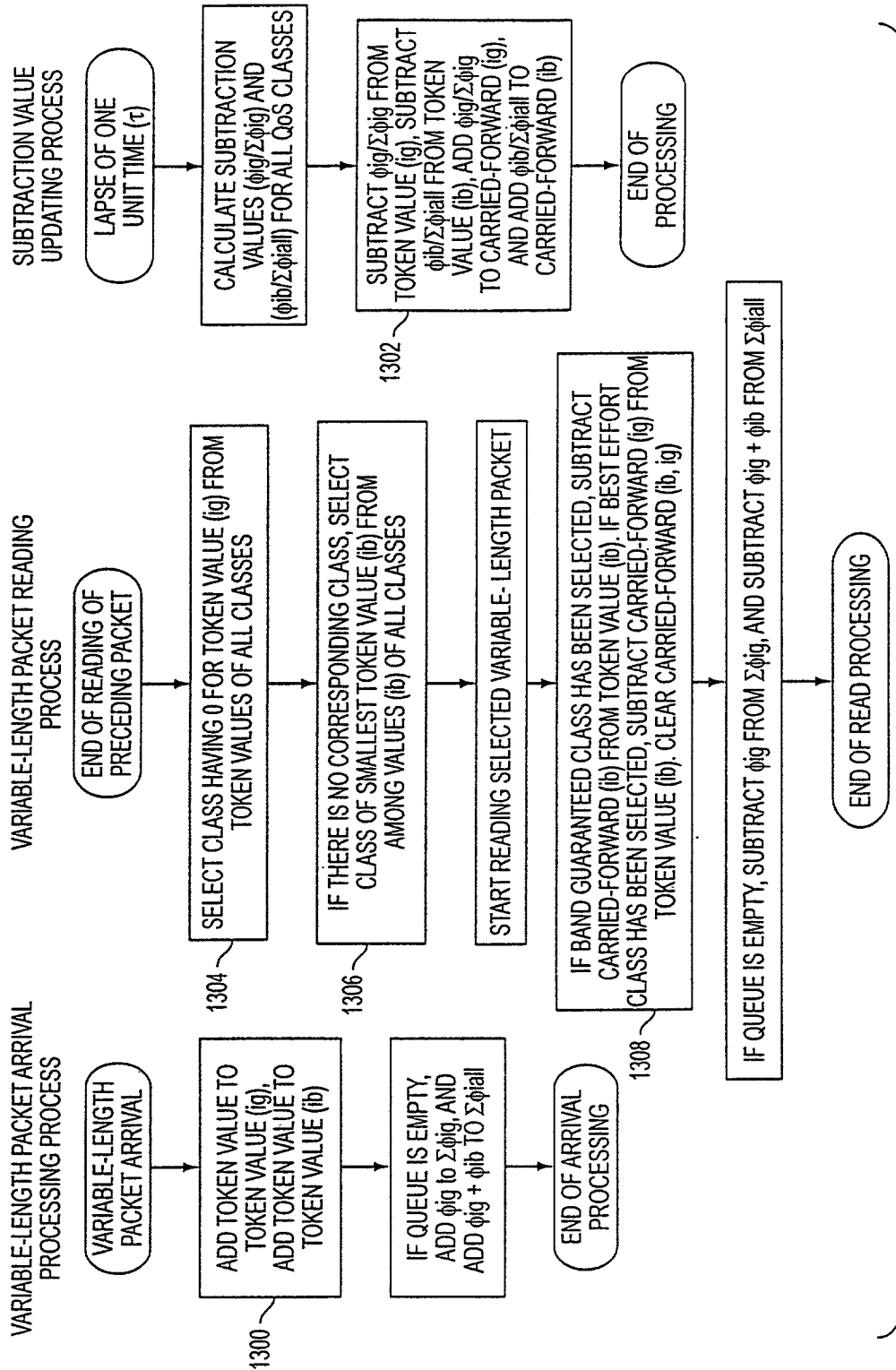
FIG. 29 is a flowchart of the operation of the QoS control shown in FIG. 28.

FIG. 29 shows a flowchart. In this example, in a frame arrival processing process, a token value is managed separately as a token value (ig) and a token value (ib) for the bandwidth guaranteed class and for the best effort class respectively, for one QoS class (at a step 1300). Further, in a subtraction value updating process, when $\Phi_{(ig)}/\Sigma\Phi_{(ig)}$ and $\Phi_{(ib)}/\Sigma\Phi_{(iall)}$ are subtracted from the token value (ig) and the token value (ib) respectively, the subtraction volumes are stored as a carried forward value (ig) and a carried forward value (ib) respectively (at a step 1302). At the time of selecting a read packet, in a variable-length packet reading process, first, a class of which token value (ig) is zero is selected from among all the QoS classes where variable-length packets exist (at a step 1304). For a packet of the best effort class having no bandwidth guaranteed fraction, when $\Phi_{ig}$ is set to zero, the subtraction of the token value (ig) is not substantially carried out at the step 1302. Therefore, this packet is not selected at this selection step. Next, a class of which token value (ig) is a minimum is selected from among all the QoS classes where variable-length packets exist (at a step 1306). Similarly, for a packet of the bandwidth guaranteed class having no best effort fraction, when $\Phi_{ib}$ is set to zero, the subtraction of the token value (ib) is not substantially carried out at the step 1302. Therefore, this packet is not selected at this selection step. A packet of the minimum bandwidth guaranteed class having both the bandwidth guarantee fraction and the best effort fraction is selected as a packet of one of the two classes, and the carried-forward token value not selected is reflected in the next selection of a packet. Therefore, a—(carried forward value) is set in the token value not selected (at a step 1308).

Figure 30:
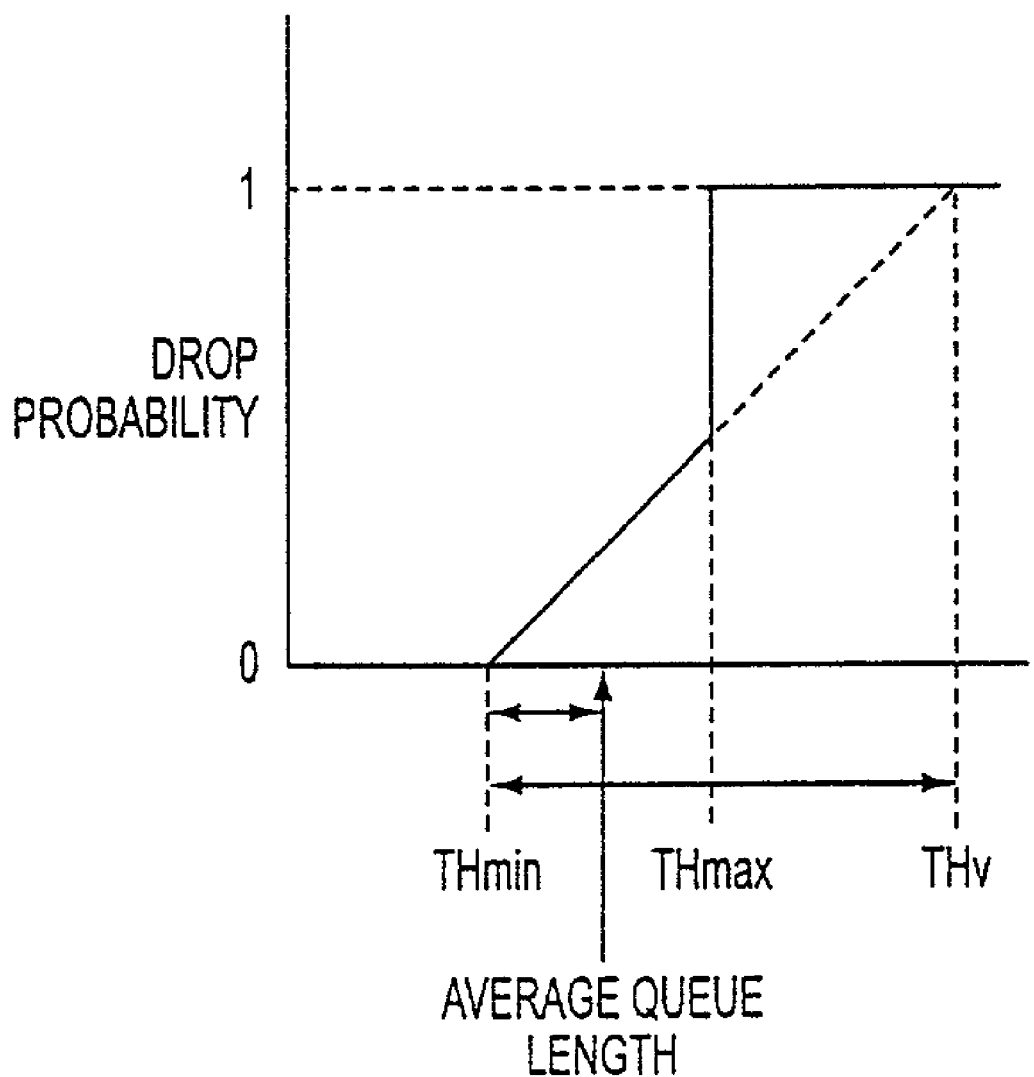
FIG. 30 is a diagram showing a relationship between an average queue length and a drop probability in a packet drop control according to the present invention.

Next, a packet drop method relating to the first embodiment of the present invention will be explained. In the following description, a "variable-length packet" will be referred to as a "frame" and a "fixed-length packet" will be simply referred to as a "packet". In the present invention, packet drop is carried out periodically instead of at random, and this period can be changed according to the state of the length of a queue. This achieves the drop with high security. Drop is carried out at the time of reading. Therefore, it is possible to drop from the from of the queue. This makes it possible to promptly post the drop to the terminal. A decision of drop is made at the time of reading the front packet. As shown in FIG. 30 and in the equation (6), a drop probability is determined according to the queue length. Drop is carried out in the period determined by the equation (7). As a result, a long frame can be dropped in a high probability. By dropping a packet of one frame during one packet time, it is possible to prevent a reduction in the throughput.

$$\text{Drop probability} = (\text{average queue length} - TH_{min})/(TH_v - VH_{min}) \quad (6)$$

$$\text{Drop cycle} = 1/(\text{drop probability} \times \text{packet length}) \quad (7)$$

Figure 31:
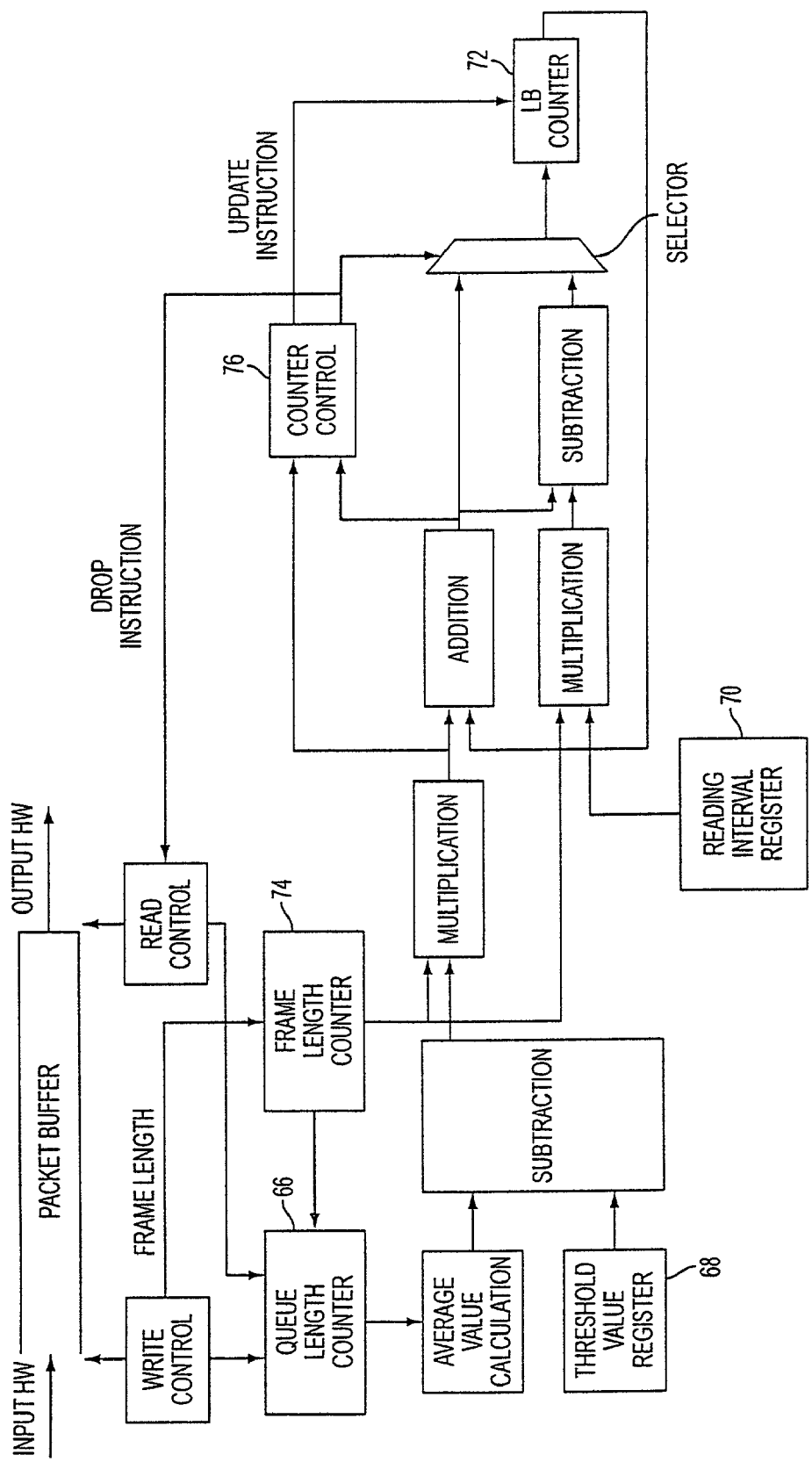
FIG. 31 is a diagram showing a structure of a first example of the packet drop control according to the present invention.
Figure 32:
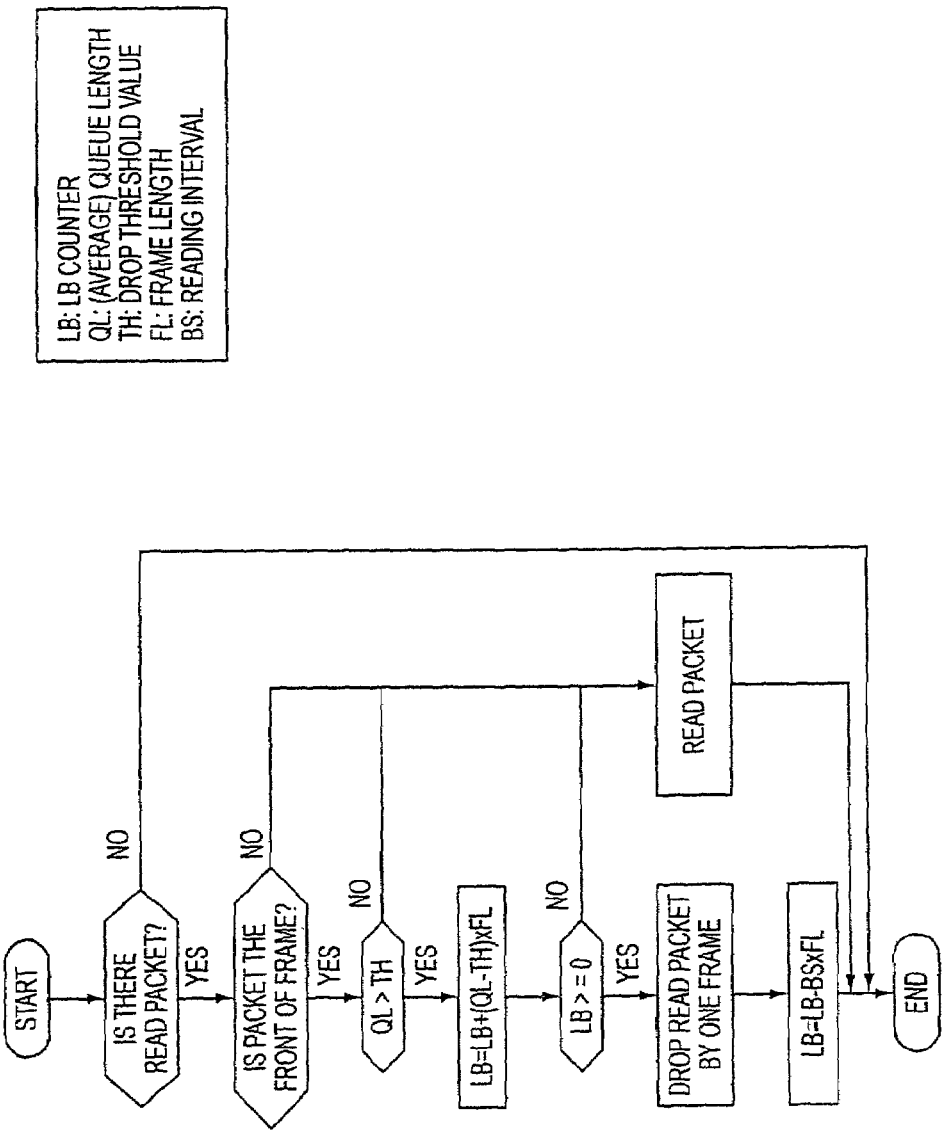
FIG. 32 is a flowchart of the packet drop control processing shown in FIG. 31.
Figure 33:
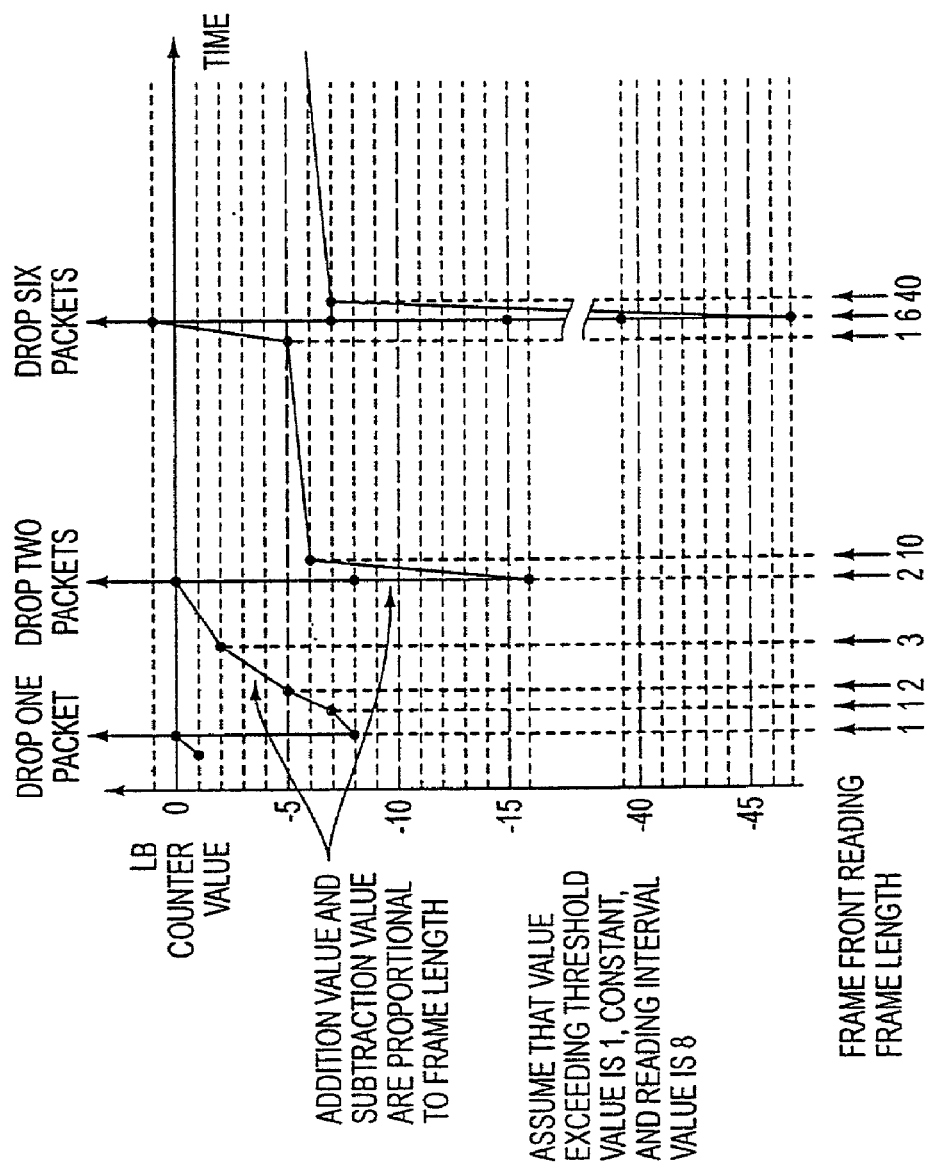
FIG. 33 is a graph showing one example of the operation of a Leaky Bucket (LB) counter in the packet drop control shown in FIG. 31.

FIG. 31 shows a detailed circuit structure, FIG. 32 shows an operation flow, and FIG. 33 shows one example of the operation. A circuitry for this method consists of a queue length counter 66 for managing the length of a queue within a buffer, a threshold value register 68 for holding a set threshold value, a reading interval register 70 for holding a set reading interval parameter, an LB counter 72 to be used for controlling the reading interval, a frame length counter 74 for managing the frame length of a front frame of a buffer, a counter controller 76 for controlling the operation of the LB counter, and other operating units.

At the time of reading a front packet of a frame, an average queue length is compared with a threshold value. When the average queue length does not exceed the threshold value, the packet is read directly. When the average value exceeds the threshold value, a value obtained by multiplying a difference between the threshold value and the average queue length to a frame length is added to the LB counter 72. When a result of the addition exceeds 0, all the packets belonging to this frame are dropped (a detailed method will be described later). Then, a value obtained by multiplying the frame length to the value of the reading interval register 70 is subtracted from the value of the LB counter. When a result of the addition does not exceed 0, the packet is read directly. As the value to be added to the LB counter becomes larger, the probability that the counter value exceeds 0 becomes higher. As a result, by this operation, it is possible to drop a frame in the probability according to the congestion level and the frame length.

The average queue length may be a value at a certain time or a value obtained by a moving average. As the drop control is carried out when a lasting congestion occurs instead of a temporary congestion, it is effective to use a value obtained by moving average. When a large buffer can be obtained, the threshold value may be set to a high level. In this case, when an actual queue length exceeds this threshold value, a decision may be made that this is a lasting congestion. By dropping a frame at the time of reading the frame, the front frame of the buffer can be dropped.

Figure 34:
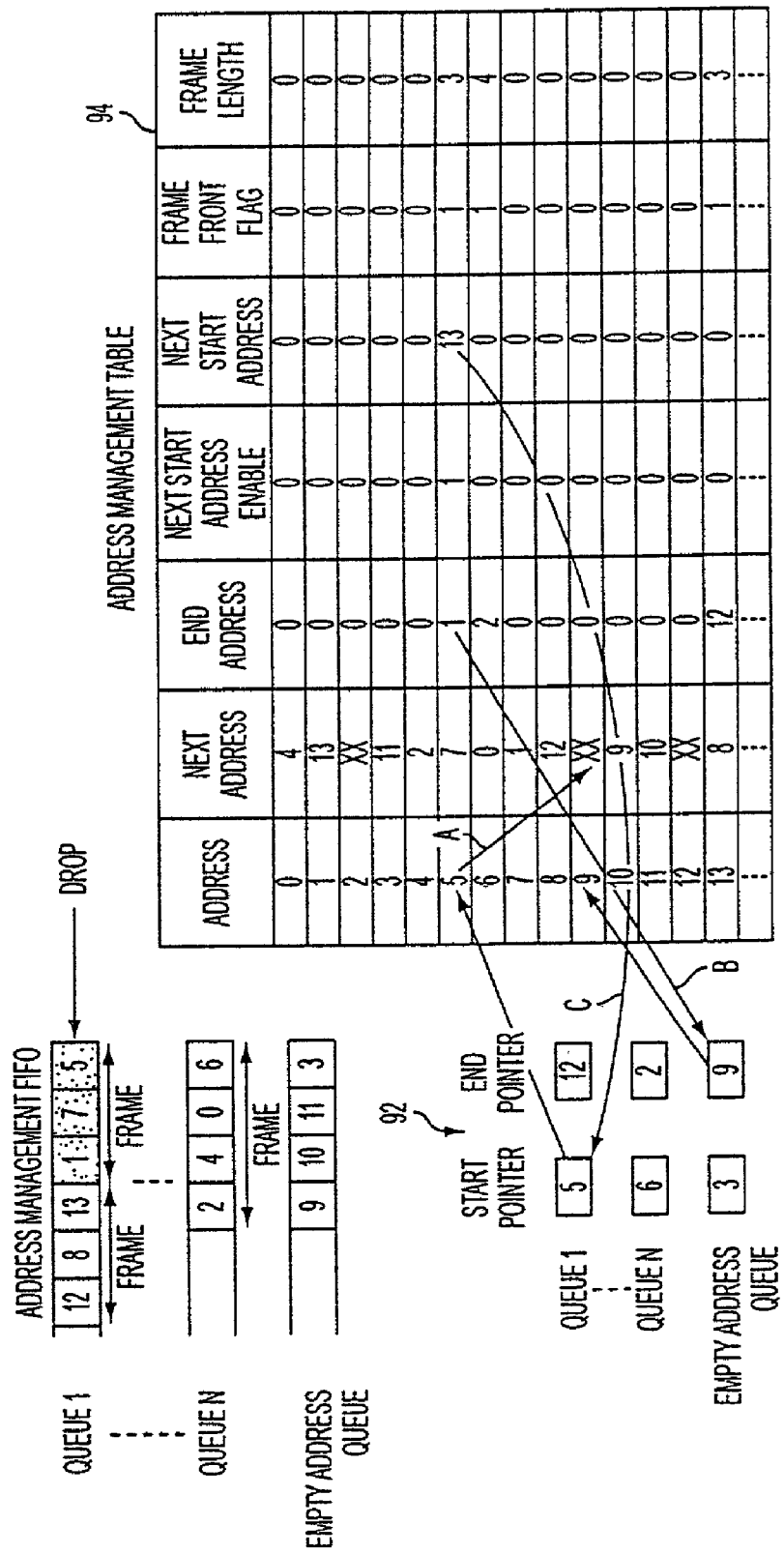
FIG. 34 is a diagram showing one example of the operation of the packet drop control according to the present invention.
Figure 35:
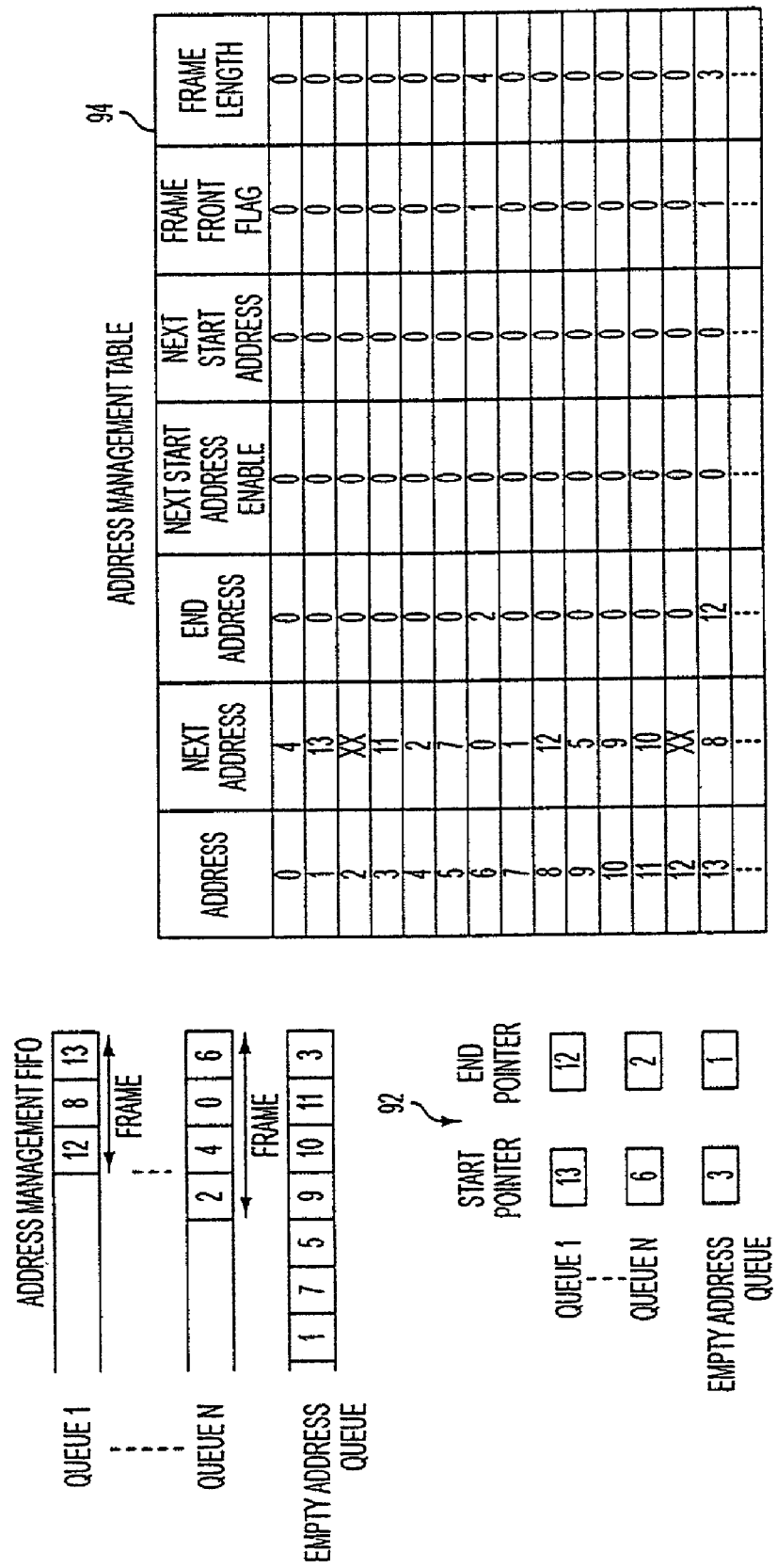
FIG. 35 is a diagram showing one example of the operation of the packet drop control according to the present invention.

FIG. 34 and FIG. 35 show one example of a method of dropping all the packets belonging to one frame within one packet time. An address managing FIFO of which concept is shown on the left upside of each drawing consists of a start/end pointer 92 and an address management table 94 for each queue. The address management table 94 stores a record having fields of a next address that shows a next address, an END address that shows an address of a frame end packet, a next start address enable that shows an existence of the next frame in the queue, a next start address that shows a start address of the next frame, a frame front flag that shows a front of the frame, and a frame length.

In FIG. 34, for reconnecting a frame to be dropped to an empty address queue, the value of the next address of the record of the end address (address 9) shown by an end pointer of the empty address queue is rewritten by the front address (address 5) of the frame to be reconnected (at a step A). Then, the end pointer of the empty address queue is rewritten by the END address value (address 1) of the frame to be reconnected (at a step B). Next, for removing the dropped frame from the queue, a start pointer of the queue is rewritten by the next start address (address 13) (at a step C). Based on the above rewriting of the address link, a resultant address is obtained as shown in FIG. 35. Thus, it is possible to drop one frame within one packet time.

As another example of a packet drop, there is one of which basic idea is the same as the above, except a decision of drop is carried out at each time of a packet reading, and drop probability is made proportional to only the volume of the average queue length which exceeds the threshold value. A frame is dropped in the cycle that matches this probability. As the drop decision is made for each packet, a long frame can be dropped in a proportionally high probability as a result. After one packet has been dropped, a packet of the same frame is dropped each time when the packet is read. As the packet drop time is proportional to the number of dropped packets, this method is characteristically inferior to the above method. On the other hand, the circuit structure becomes simple because of the packet by packet operation. Therefore, this method is suitable for a buffer control that requires a higher-speed operation.

The above drop method is controlled for each queue. When a plurality of threshold values are provided, it becomes possible to prioritize the drop processing.

Figure 36:
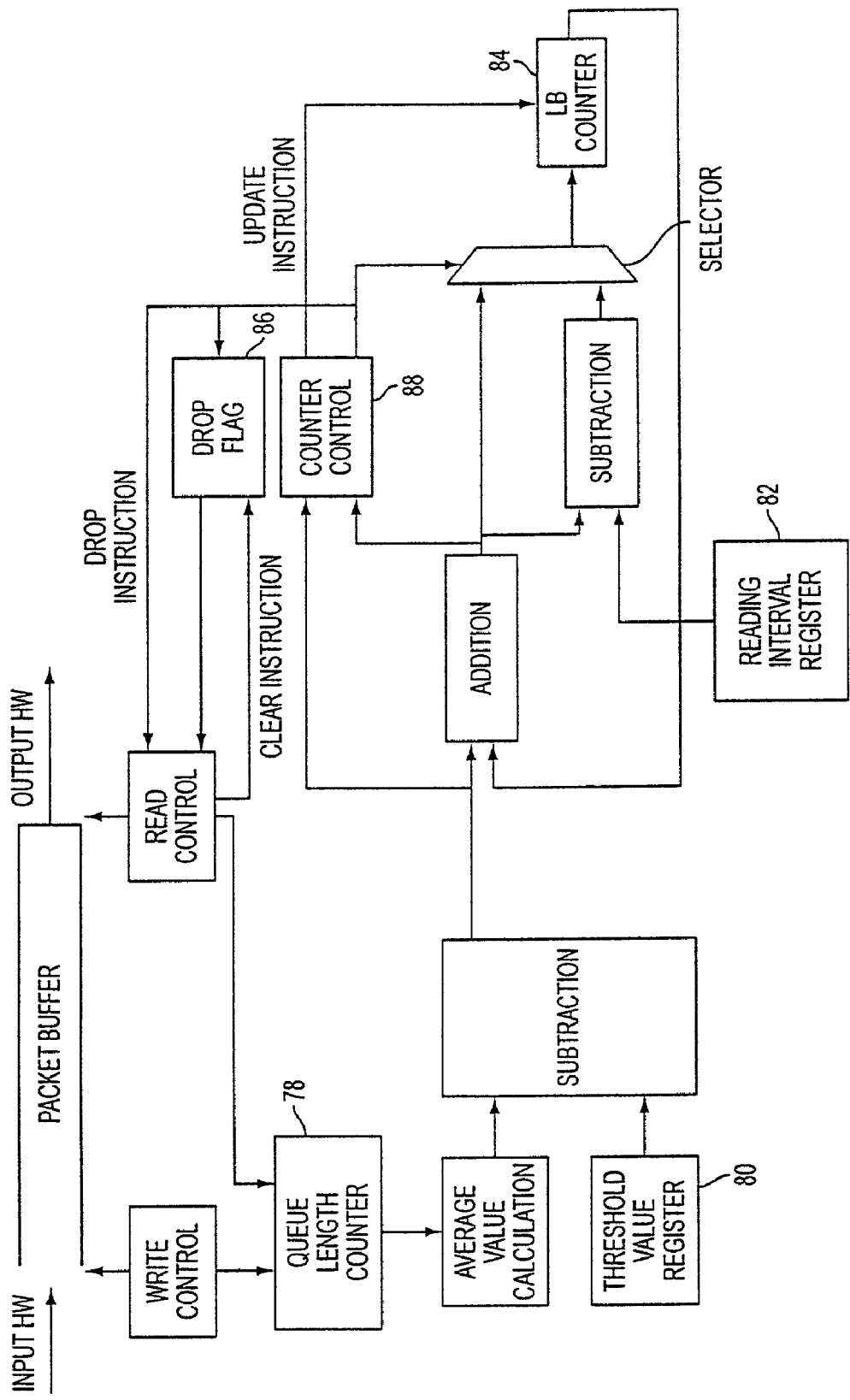
FIG. 36 is a diagram showing a structure of a second example of the packet drop control according to the present invention.
Figure 37:
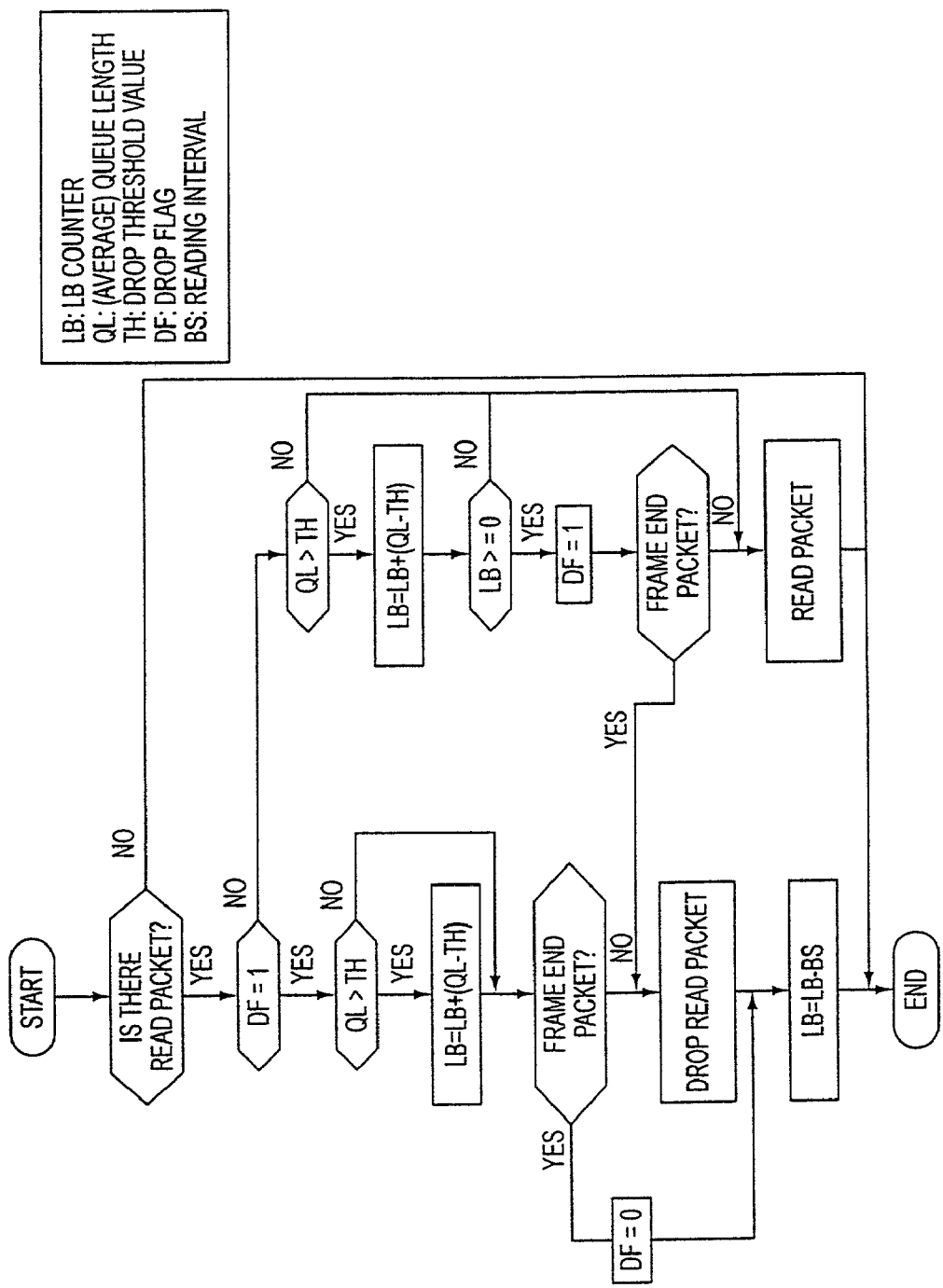
FIG. 37 is a flowchart of the packet drop control processing shown in FIG. 36.
Figure 38:
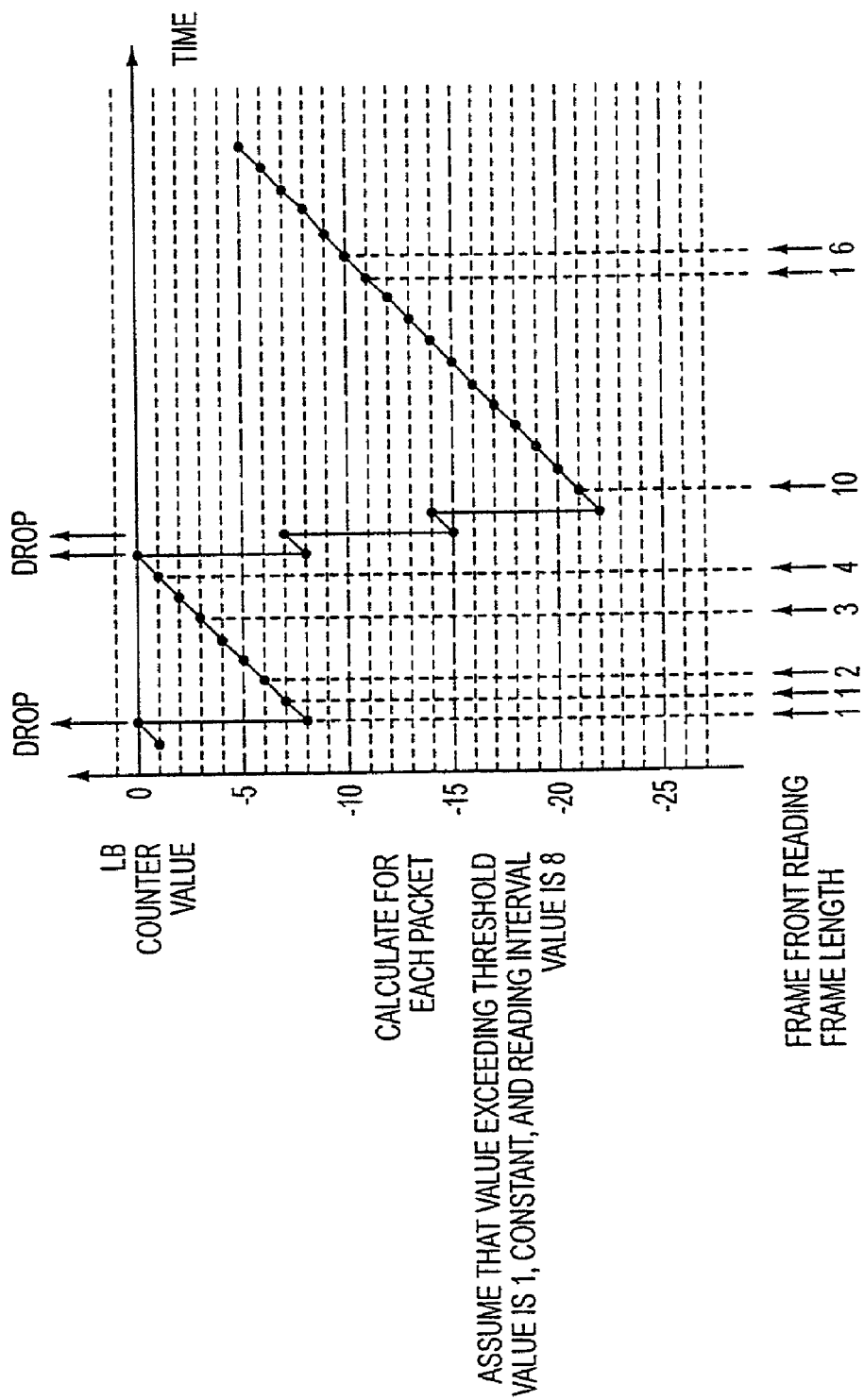
FIG. 38 is a graph showing one example of the operation of an LB counter in the packet drop control shown in FIG. 36.

FIG. 36 shows an example of a detailed structure of the packet drop method. A circuitry for this method consists of a queue length counter 78 for managing a queue length, a threshold value register 80 for holding a set threshold value, a reading interval register 82 for holding a set reading interval parameter, an LB counter 84 to be used for the reading interval control, a drop flag 86 that shows that a frame is being dropped, a counter controller 88 for controlling the LB counter, and other operating units. At the time of reading each packet, an average queue length is compared with a threshold value. When the average queue length does not exceed the threshold value, the packet is read directly. When the average value exceeds the threshold value, a difference between the threshold value and the average queue length is added to the LB counter 84. When a result of the addition exceeds 0, the corresponding packet is dropped. Then, a value of the reading interval register is subtracted from the value of the LB counter, and a drop flag is set. When a result of the addition does not exceed 0, the packet is read directly. After one packet has been dropped, a packet of the same frame is dropped each time when the packet is read. A difference between the LB threshold value and the queue length is added to the value of the LB counter, and a value of the reading interval register is subtracted from the counter value. At the end of the same frame, the flag is cleared. (It is also possible to decide the frame drop after clearing the drop flag, when the front frame has arrived.) As the end packet is not dropped, it is possible to discriminate between the dropped frame and the next frame. Further, as the drop decision is made for each packet, the probability of drop becomes higher when the frame is longer. Therefore, based on this operation, it is possible to drop a frame in the probability according to the congestion level and the frame length. FIG. 37 shows the flow of the above operation, and FIG. 38 shows an example of the operation of the LB counter. The average queue length may be a value at a certain time or a value obtained by moving average. As the drop control is carried out when a lasting congestion occurs instead of a temporary congestion, it is effective to use a value obtained by moving average. When a large buffer can be obtained, the threshold value may be set to a high level. In this case, when an actual queue length exceeds this threshold value, a decision may be made that this is a lasting congestion. By dropping a frame at the time of reading the frame, the front frame of the buffer can be dropped. As the packet drop takes one frame time, this method is characteristically inferior to the above methods. On the other hand, as the circuit structure becomes simple, this method is suitable where a higher-speed operation is required.

For the LB counter control, positive and negative values may be revered, and the drop decision may be based on a threshold value instead of 0.

Figure 39:
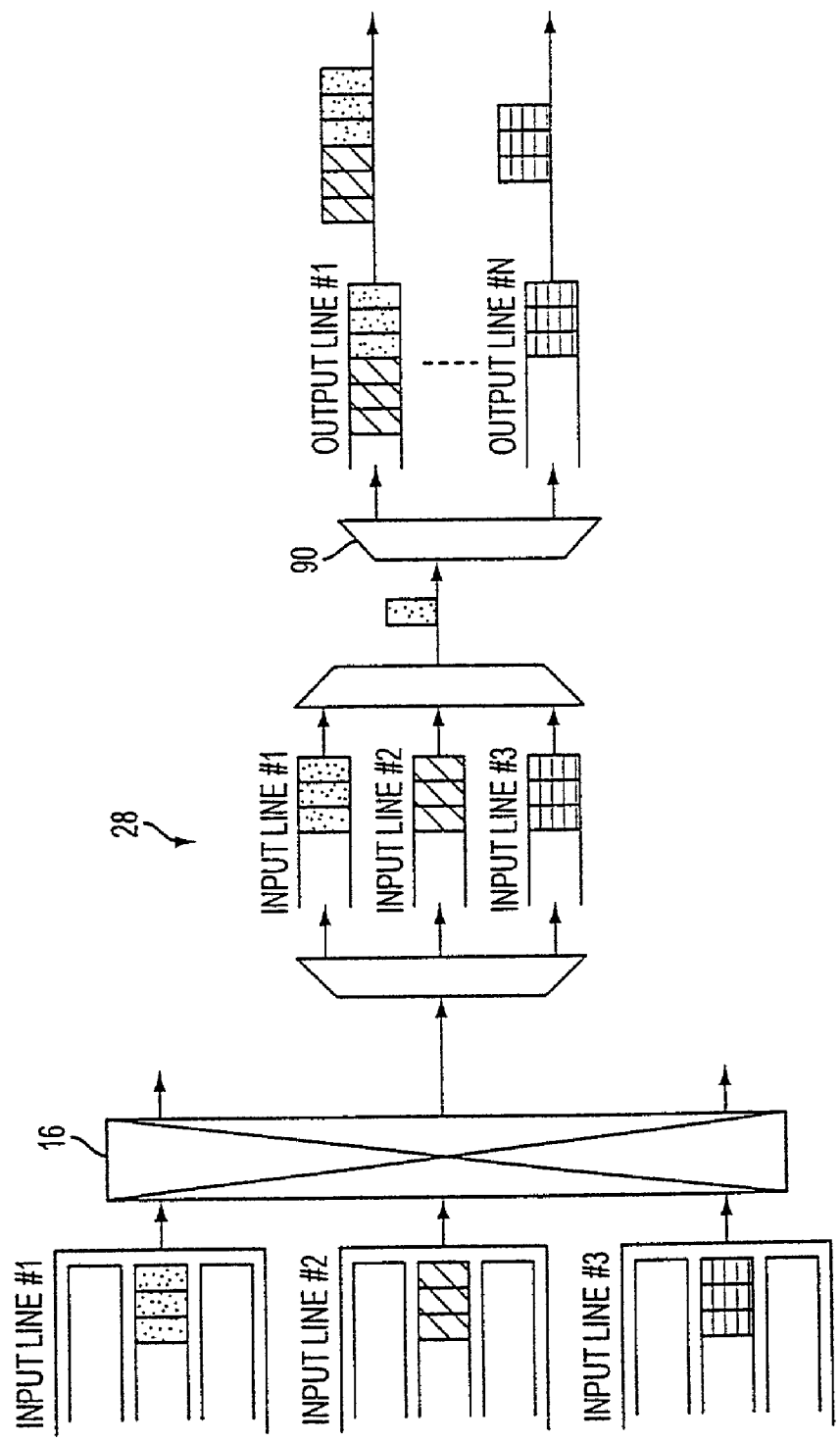
FIG. 39 is a diagram for explaining a problem to be solved in a multicast control of a variable-length packet.
Figure 40:
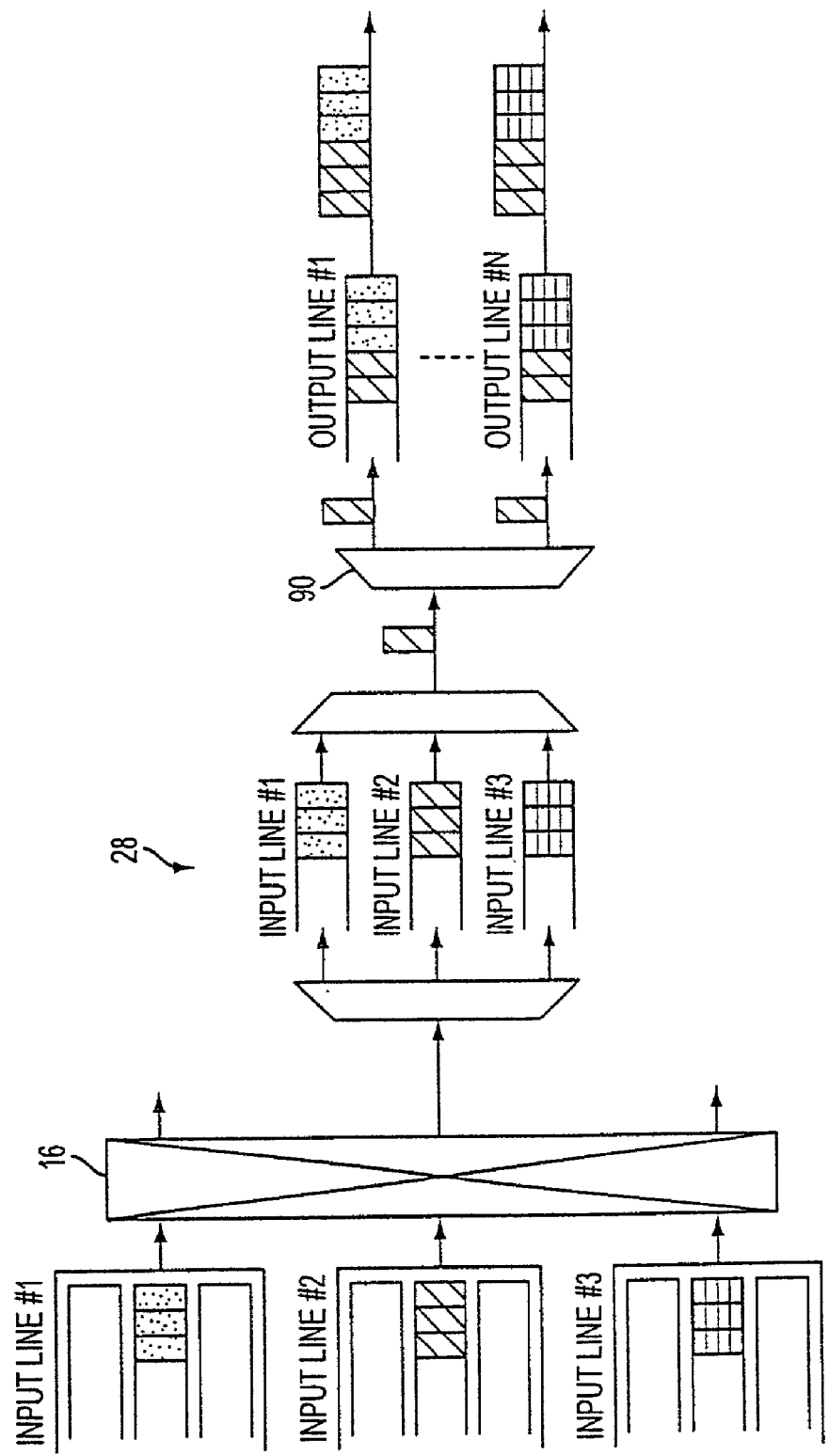
FIG. 40 is a diagram for explaining a problem to be solved in a multicast control of a variable-length packet.
Figure 41:
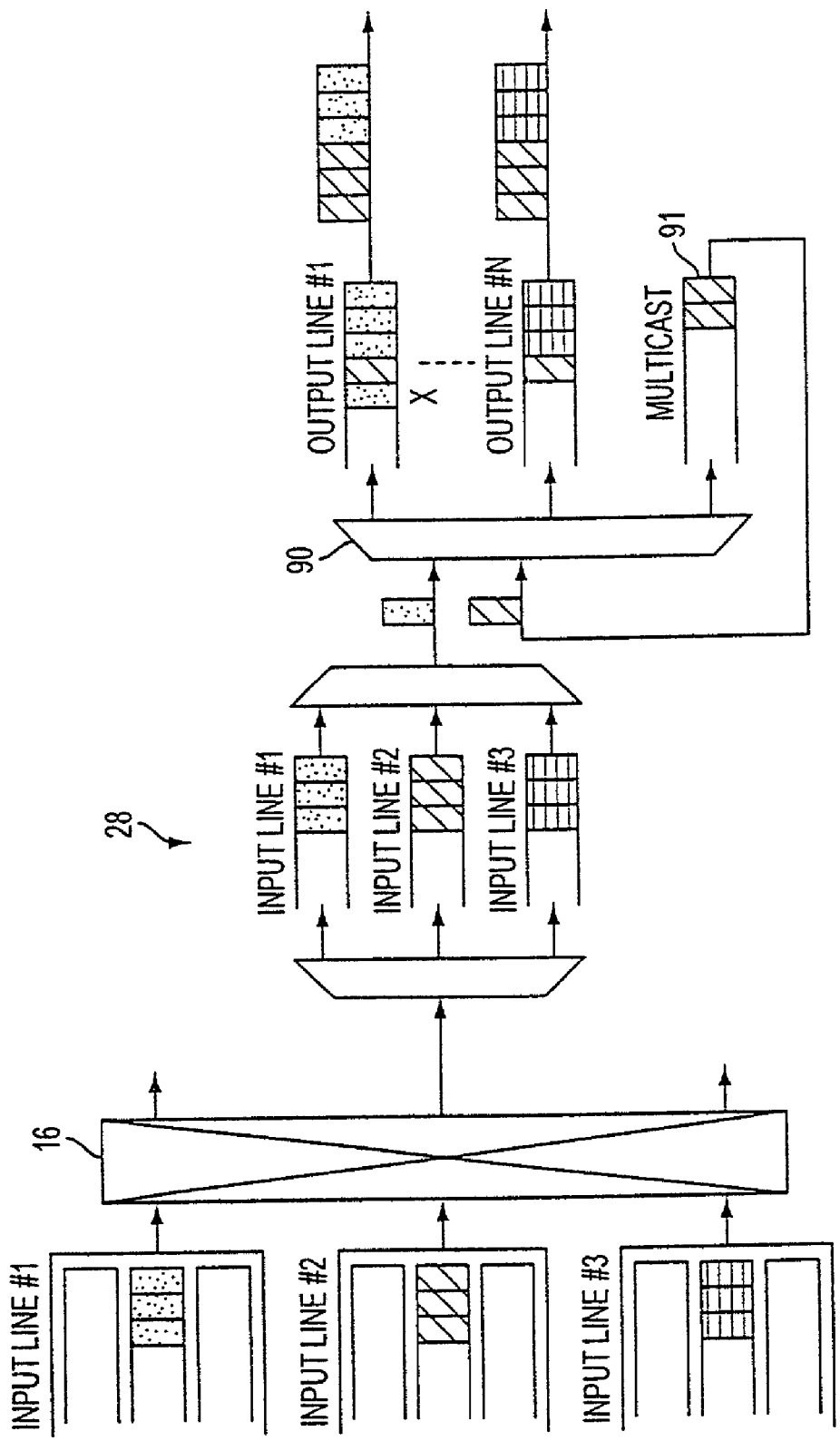
FIG. 41 is a diagram for explaining a problem to be solved in a multicast control of a variable-length packet.

A packet switch for switching a frame that is a variable-length packet has the following problem to be solved when one frame is to be multicast to a plurality of low-speed lines. As shown in FIG. 39, after packets for one frame have been stored into a frame assembling buffer 28 from a switch section 16, the packets are transferred to a DMUX 90. In this case, in order to simultaneously copy the packets into a plurality of low-speed lines as shown in FIG. 40, it is necessary to update addresses by the number of multicasts within one packet time. Therefore, when the packets are transferred one packet by one packet, this method is not suitable for a high-speed operation. Further, as shown in FIG. 41, when a separate queue 91 is provided for multicast, it is necessary to control to avoid a contention between a packet that does not carry out the multicast and the multicast copied destination in order to guarantee the frame continuity. Further, there is also a problem that the multicasting takes time in proportion to the frame length.

Figure 42:
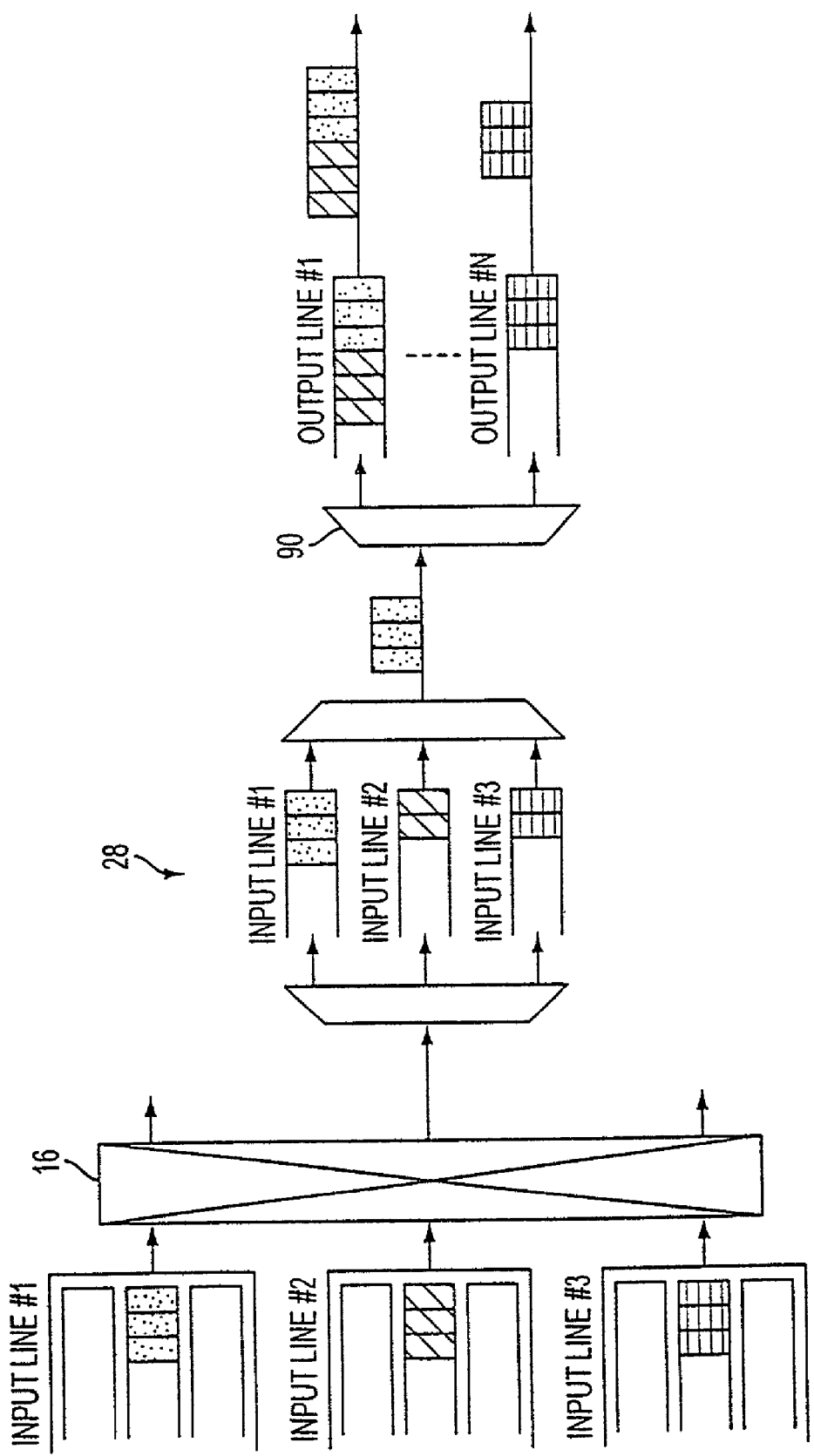
FIG. 42 is a diagram showing a concept of a transfer of packets from a frame assembling buffer to a DMUX in a frame unit.

As shown in FIG. 42, the problem of the contention of reading in the frame assembling buffer 28 can be solved when, instead of one packet, the packets for one frame are collectively moved from the frame assembling buffer 28 to the DMUX 90. The move of the packets for one frame can be done within one packet time when the storage address within the packet buffer is moved instead of actually moving the data of the packets, as explained below.

A detailed example of the packet move in a frame unit will be explained with reference to FIGS. 43 and 44. An address managing FIFO of which concept is shown on the left upside of each drawing consists of a start/end pointer 92 and an address management table 94 for each queue. The address management table 94 stores a record having fields of a next address that shows a next address, an END address that shows an address of a frame end packet, a next start address enable that shows an existence of the next frame in the queue, a next start address that shows a start address of the next frame, a frame front flag that shows a front of the frame, and a frame length.

Figure 43:
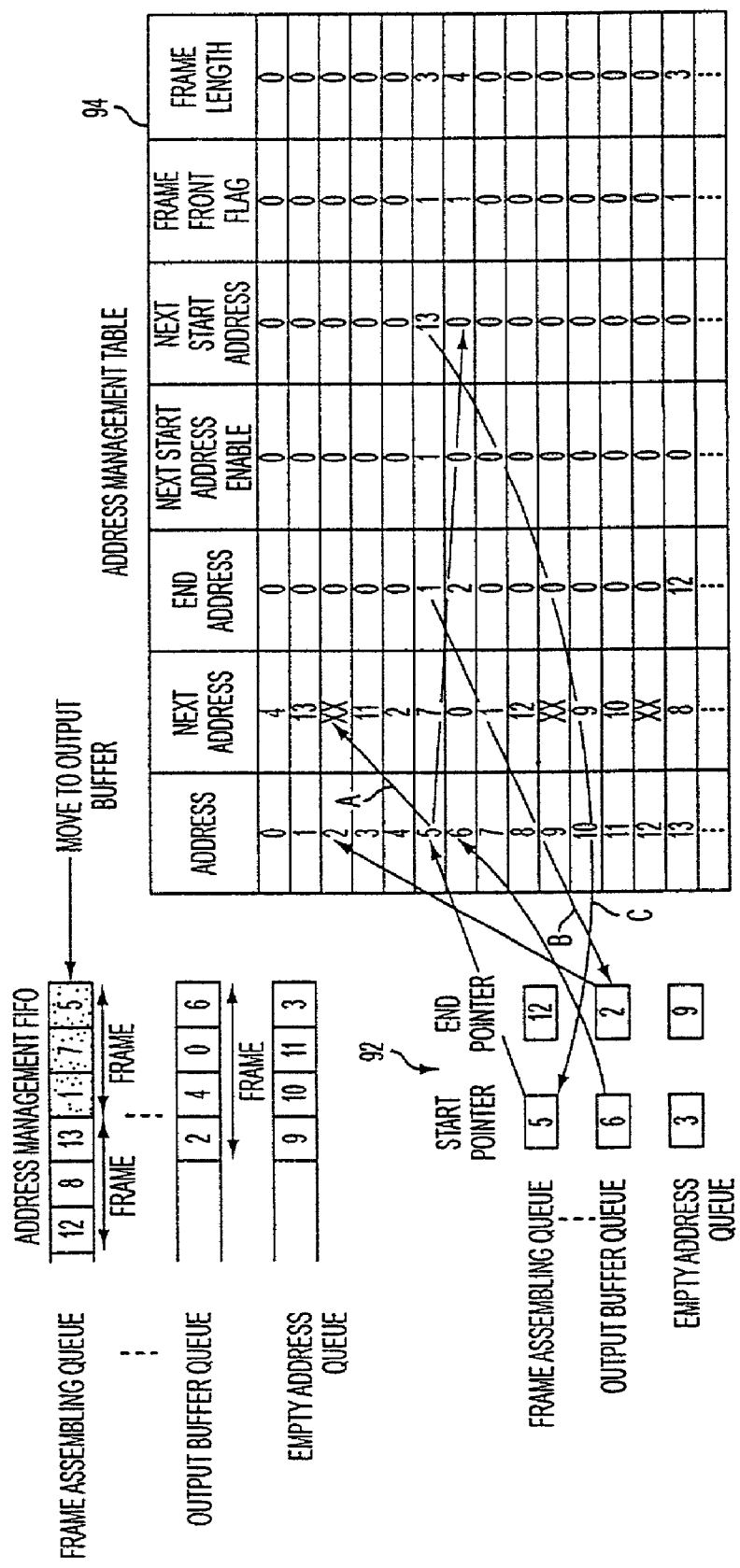
FIG. 43 is a diagram showing a detailed example of a transfer in a frame unit.
Figure 44:
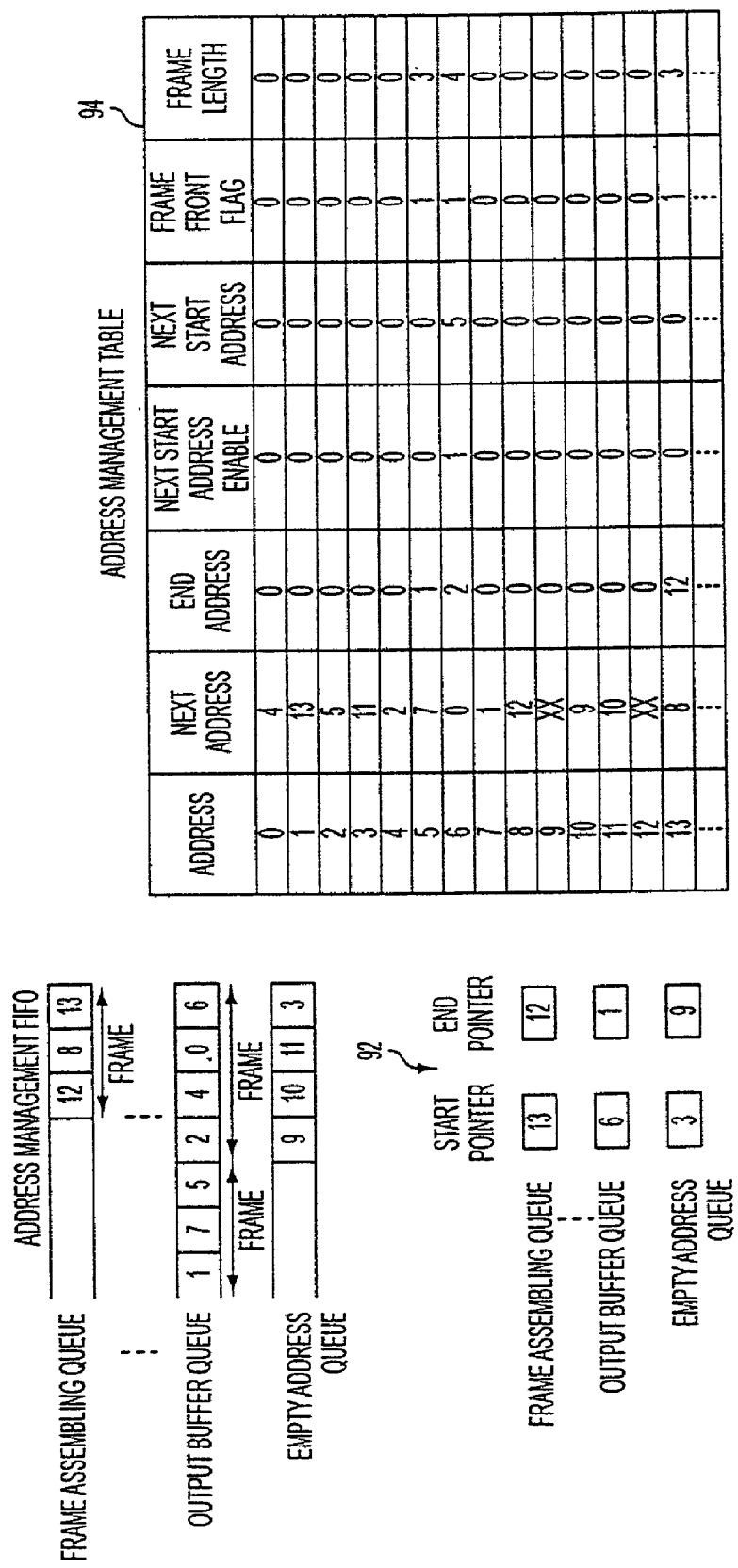
FIG. 44 is a diagram showing a detailed example of a transfer in a frame unit.

In FIG. 43, packets for one frame have been accumulated in the frame assembling buffer. First, for reconnecting this frame to an output buffer queue, the value of the next address of the record of the end address (address 2) shown by an end pointer of the output buffer is rewritten by the front address (address 5) of the frame (at a step A). Then, the end pointer of the output buffer is rewritten by the END address value (address 1) of the frame to be reconnected (at a step B). Next, for updating the frame assembling queue, a start pointer of the frame assembling queue is rewritten by the next start address (address 13) (at a step C). Based on the above rewriting, a resultant address is obtained as shown in FIG. 44. Thus, it is possible to move one frame from the frame assembling buffer to the output buffer within one packet time.

Figure 45:
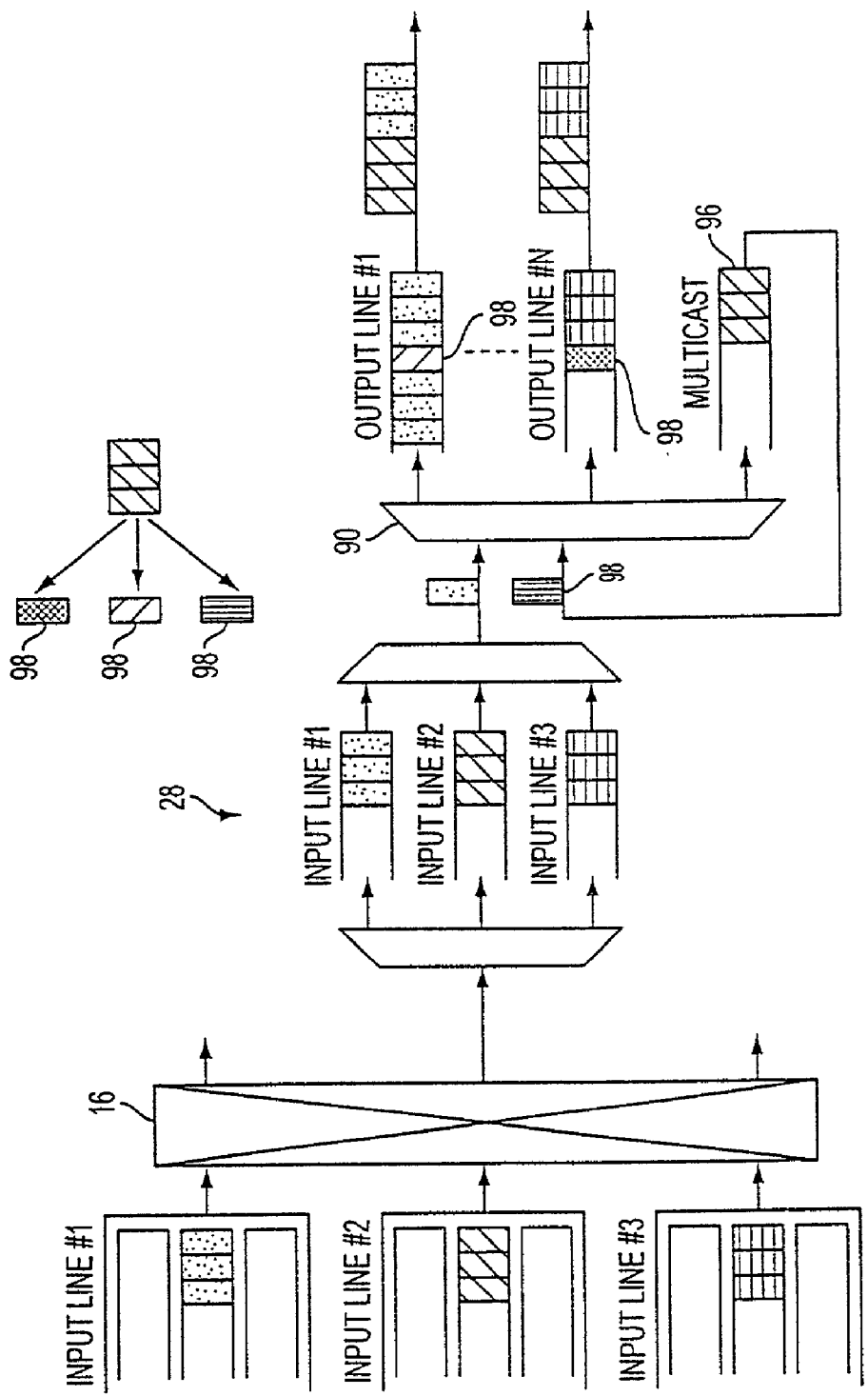
FIG. 45 is a diagram showing a concept of a multicast control according to a first embodiment of the present invention.

FIG. 45 shows a concept of the multicast according to the present invention. A frame to be multicast is first moved to a multicast queue 96 via a DMUX 90. This move is also carried out by rewriting only the address. At the time of copying the frame to each output line of the DMUX 90 from the multicast queue 96, one multicast address 98 is given to each copied frame. The multicast address 98 is reconnected to the address link. Based on this arrangement, one frame can be virtually copied within on packet time. Therefore, the frame continuity can be guaranteed, and the control of contention between the multicast frame and the unicast frame is unnecessary. Further, the time required for the copying is only the number of copy×the copy time.

FIGS. 46 to 53 show detailed examples of the multicast processing. In addition to the structures shown in FIGS. 43 and 44, the output buffer further includes queues for a plurality of output lines. Therefore, there are additionally prepared start/end address pointers for these queues to the plurality of output lines and the multicast queue 96, and a connection management table 100. The address management table 94 additionally includes fields for a multicast identification bit, a CID for identifying a multicast connection, an allocation completion flag that shows a completion of reallocation from the multicast queue, a multicast counter for managing the number of multicast outputs of a frame, and a frame address that shows the address of a frame corresponding to the multicast address. The connection management table stores the CID of a multicast connection together with the number of actual output line. In the example shown, CIDs 2 and 1 are registered in this order, and the output lines corresponding to these CIDs are 1 and 4 respectively.

Figure 46:
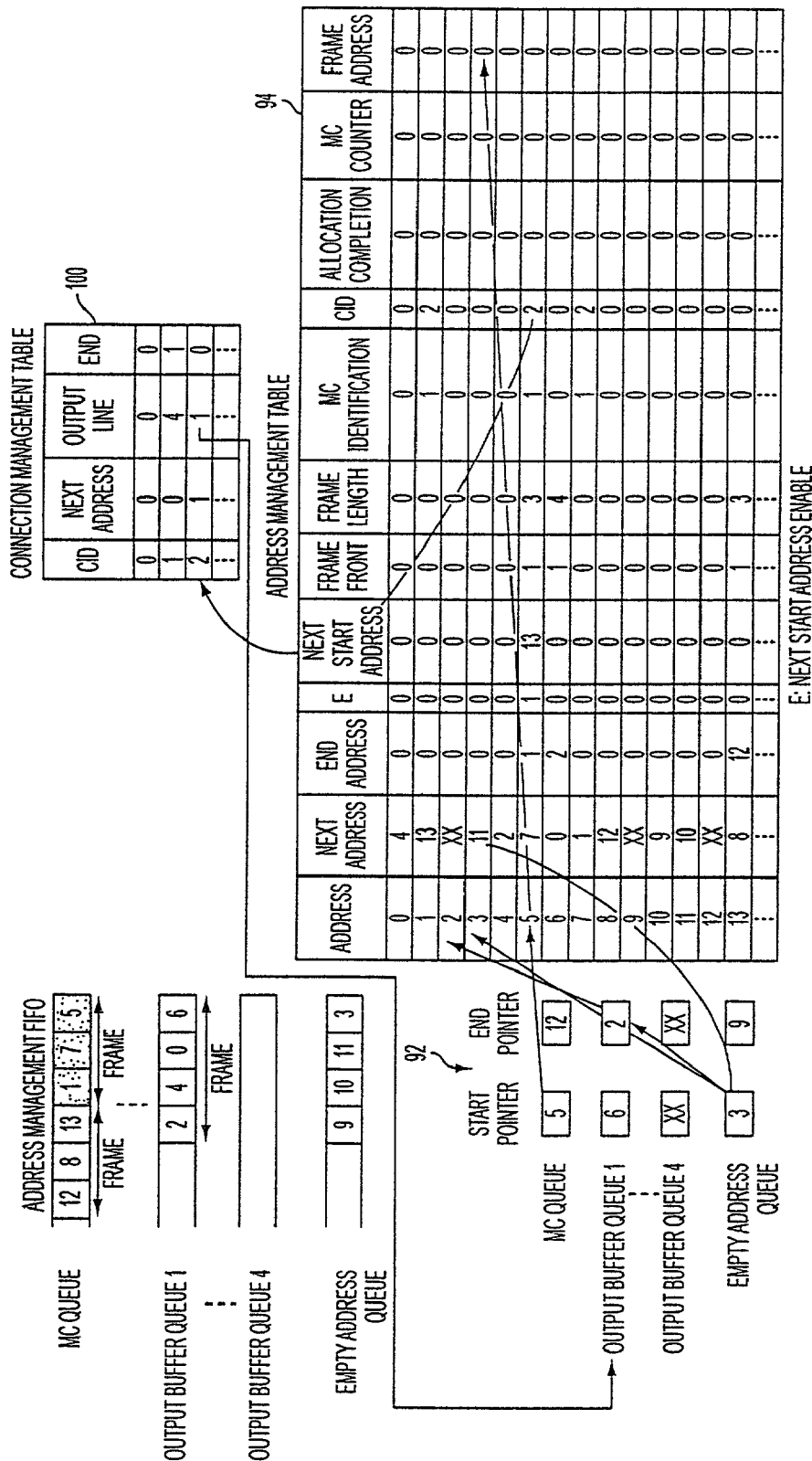
FIG. 46 is a diagram showing a detailed example of a multicast control.
Figure 47:
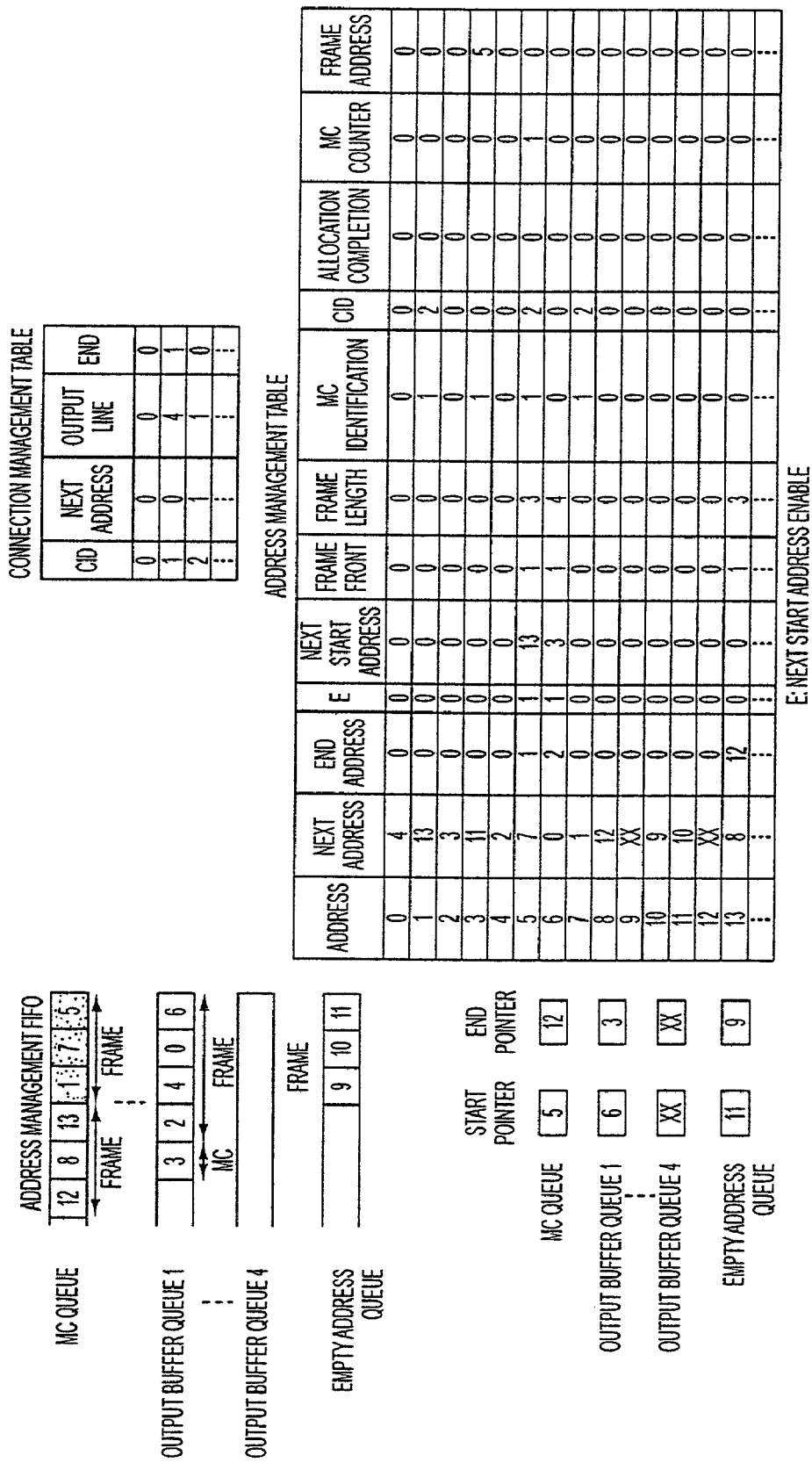
FIG. 47 is a diagram showing a detailed example of a multicast control.
Figure 48:
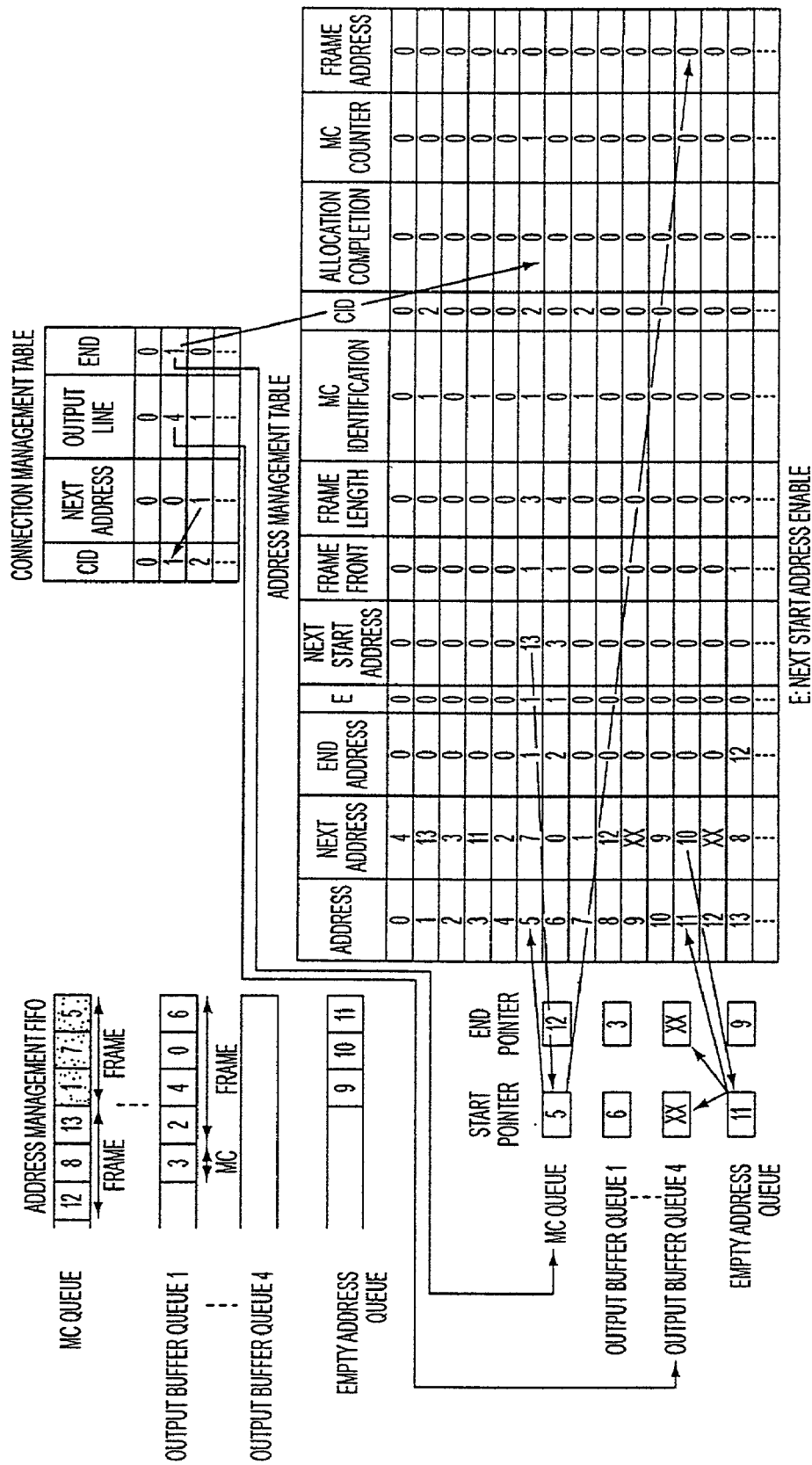
FIG. 48 is a diagram showing a detailed example of a multicast control.
Figure 49:
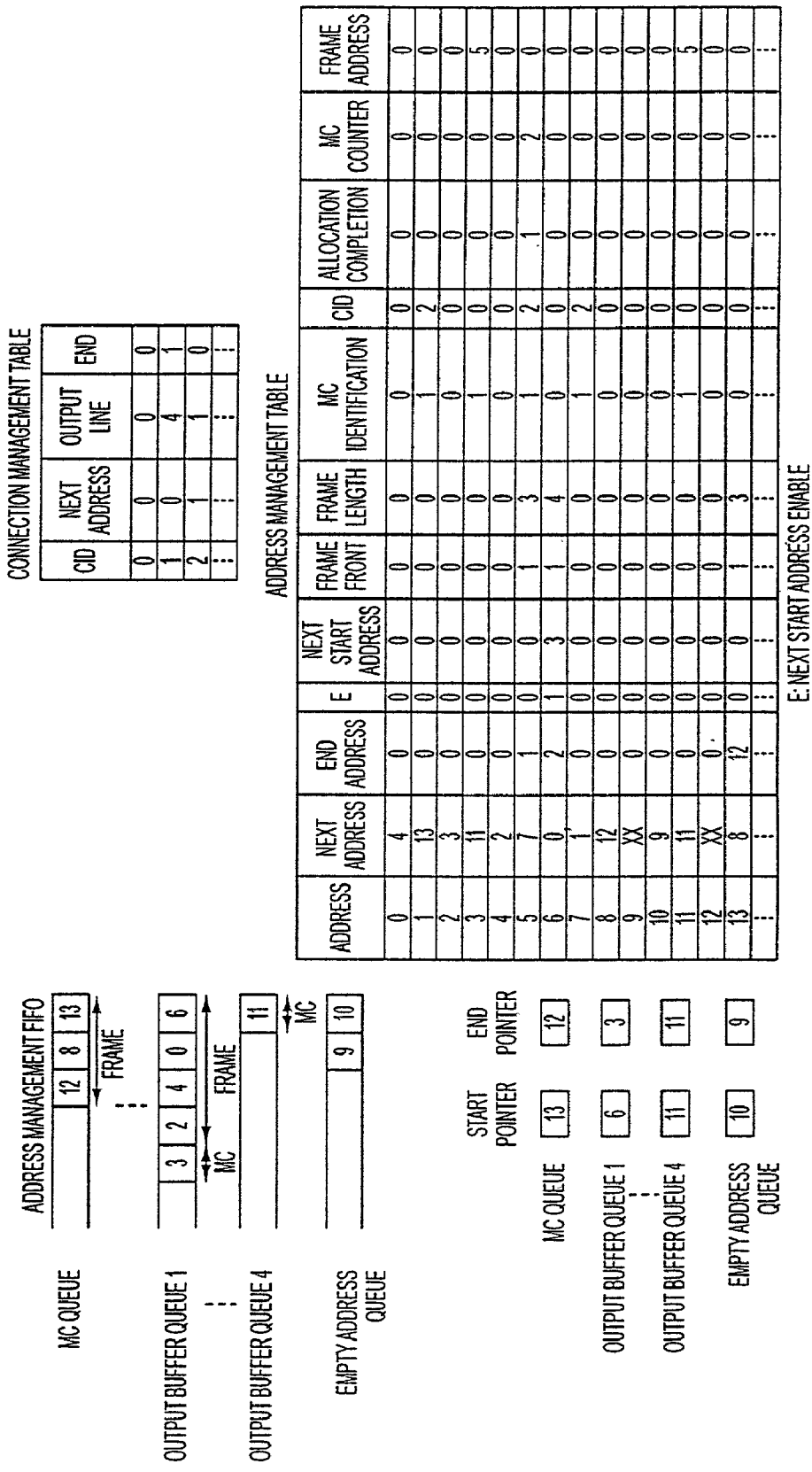
FIG. 49 is a diagram showing a detailed example of a multicast control.
Figure 50:
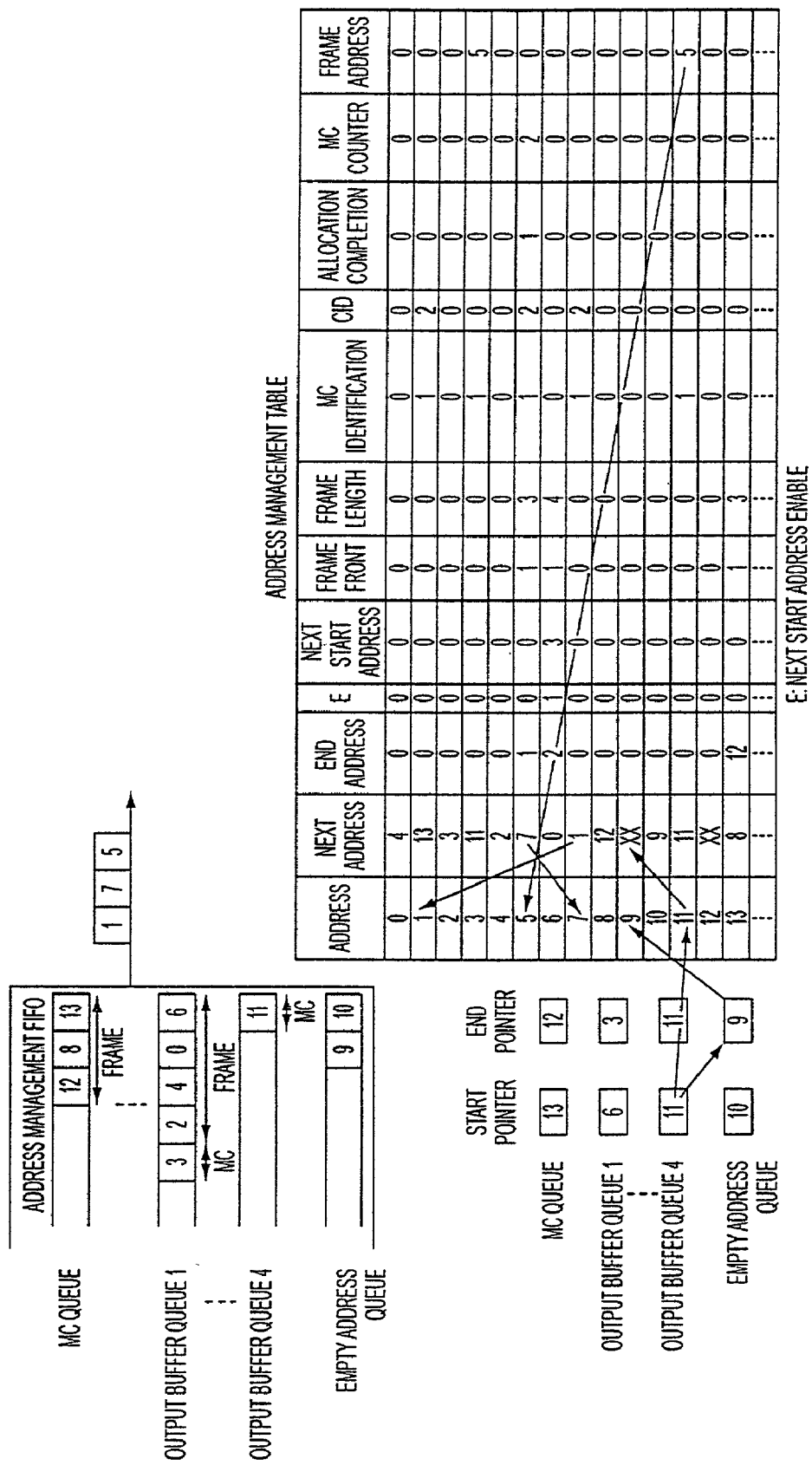
FIG. 50 is a diagram showing a detailed example of a multicast control.
Figure 51:
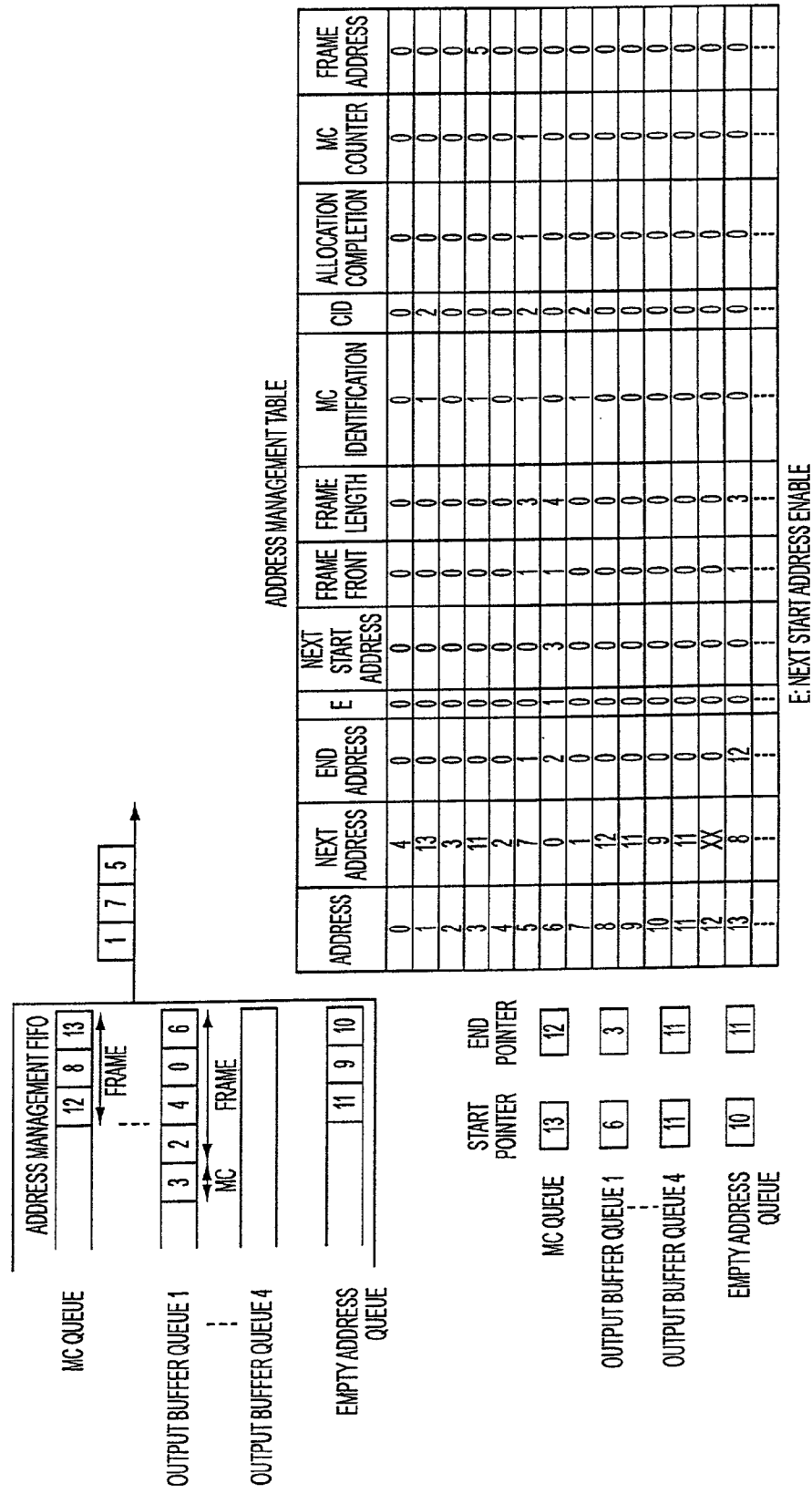
FIG. 51 is a diagram showing a detailed example of a multicast control.
Figure 52:
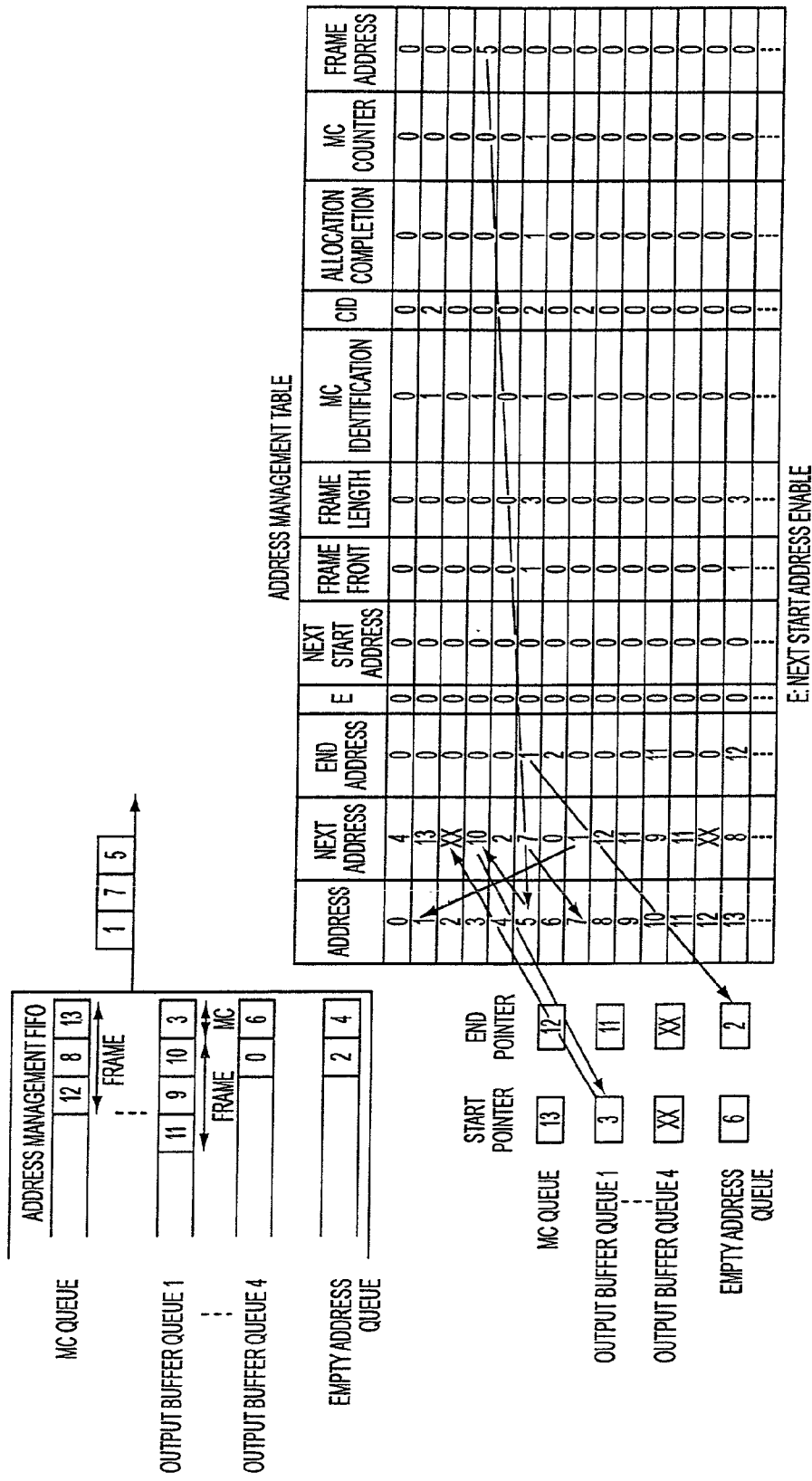
FIG. 52 is a diagram showing a detailed example of a multicast control.
Figure 53:
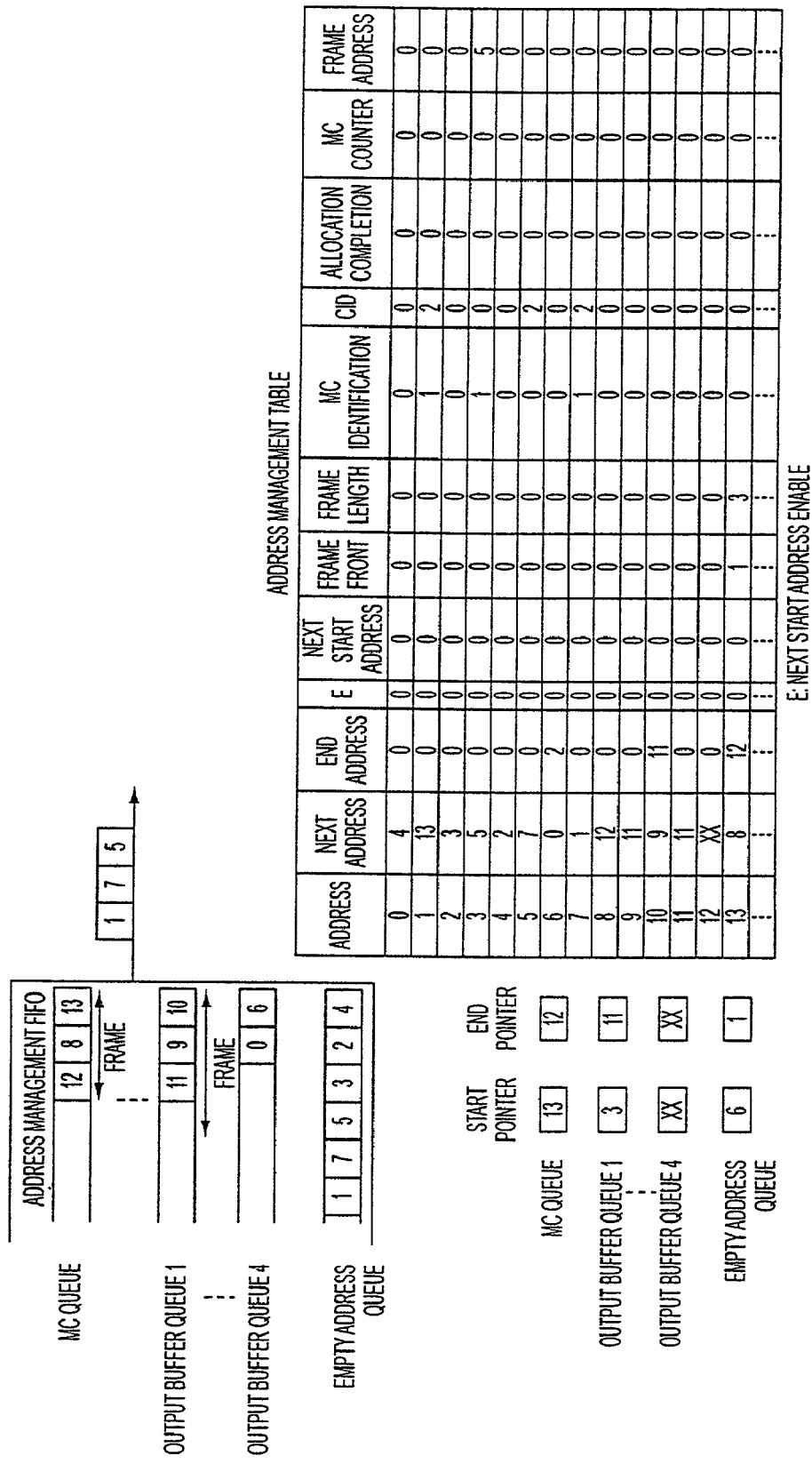
FIG. 53 is a diagram showing a detailed example of a multicast control.

When the frame assembling of the multicast frame has been completed, the frame moves to the multicast queue instead of the output buffer (reference FIG. 46). As the same address cannot be used for queues by output lines, new empty addresses (addresses 3 and 11) are secured at the time of the copying. These addresses are reconnected to corresponding output buffer queues (queues 1 and 4) on behalf of the frame. At the same time, the start address (address 5) of the actual frame is held in the field of the frame address of the multicast address (addresses 3 and 11) in the address management table, and the end address (address 1) of the frame is held in the END address of this address. Each time when the frame is copied, the multicast counter of this address is incremented, and the reallocation completion flag is set at the time of the final copy of the same frame (identified by the END flag of the connection management table) (reference FIGS. 47 to 49).

At the time of reading from the DMUX, packets from the frame address (address 5) to the END address (address 1) of the multicast address (addresses 3 and 11) are read out. After the reading of the packets for one frame has been completed, the multicast address is returned to the empty address queue, and the multicast counter is decremented. When the result of this is 0 and when the reallocation completion flag is being set, the address for one frame is returned to the empty address by rewriting the link with the pointer (reference FIGS. 50 to 53). When the reallocation is carried out by rewriting the link with the end pointer without using the multicast address at the time of the first copy, it is possible to decrease the number of used address although control becomes complex.

Figure 54:
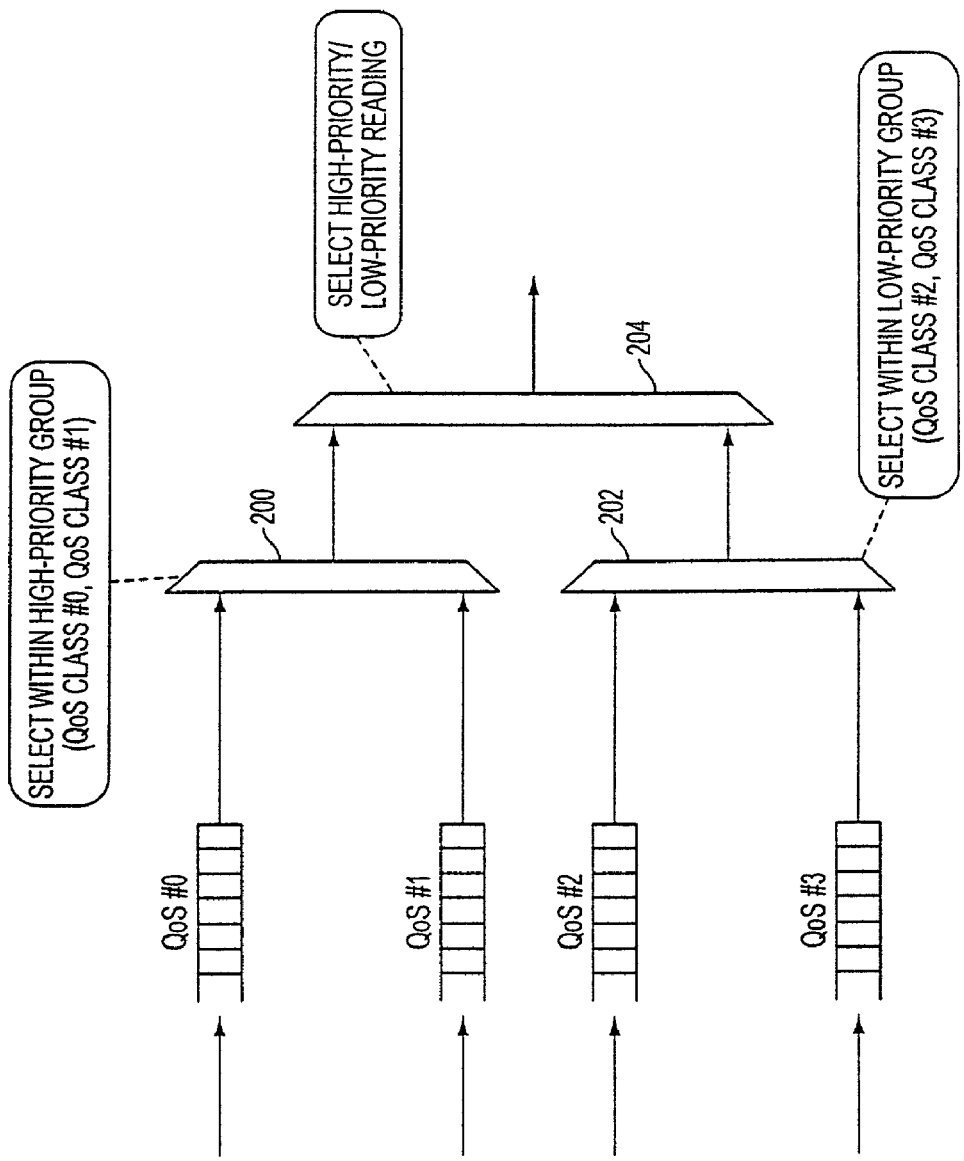
FIG. 54 is a diagram showing a concept of another QoS control according to the present invention.

FIG. 54 shows a concept of another example of QoS control that can be applied to any one of the input side and the output side of the switch 16.

A selector 200 selects one of QoS classes that belong to a high-priority group according to a predetermined rule. A selector 202 selects one of QoS classes that belong to a low-priority group according to a predetermined rule. A selector 204 selects one of the QoS class selected by the selector 200 and the QoS class selected by the selector 202.

This QoS control can be realized by only a simple priority selecting circuit. It is possible to decrease the scale of hardware as compared with the case where a contention control is carried out by setting a rate and a reading rate to each QoS class in advance.

This QoS control can be applied to the input side where there is little quality deterioration due to packet drop or others. The QoS control can also be applied to the output side where there is no quality deterioration.

Figure 55:
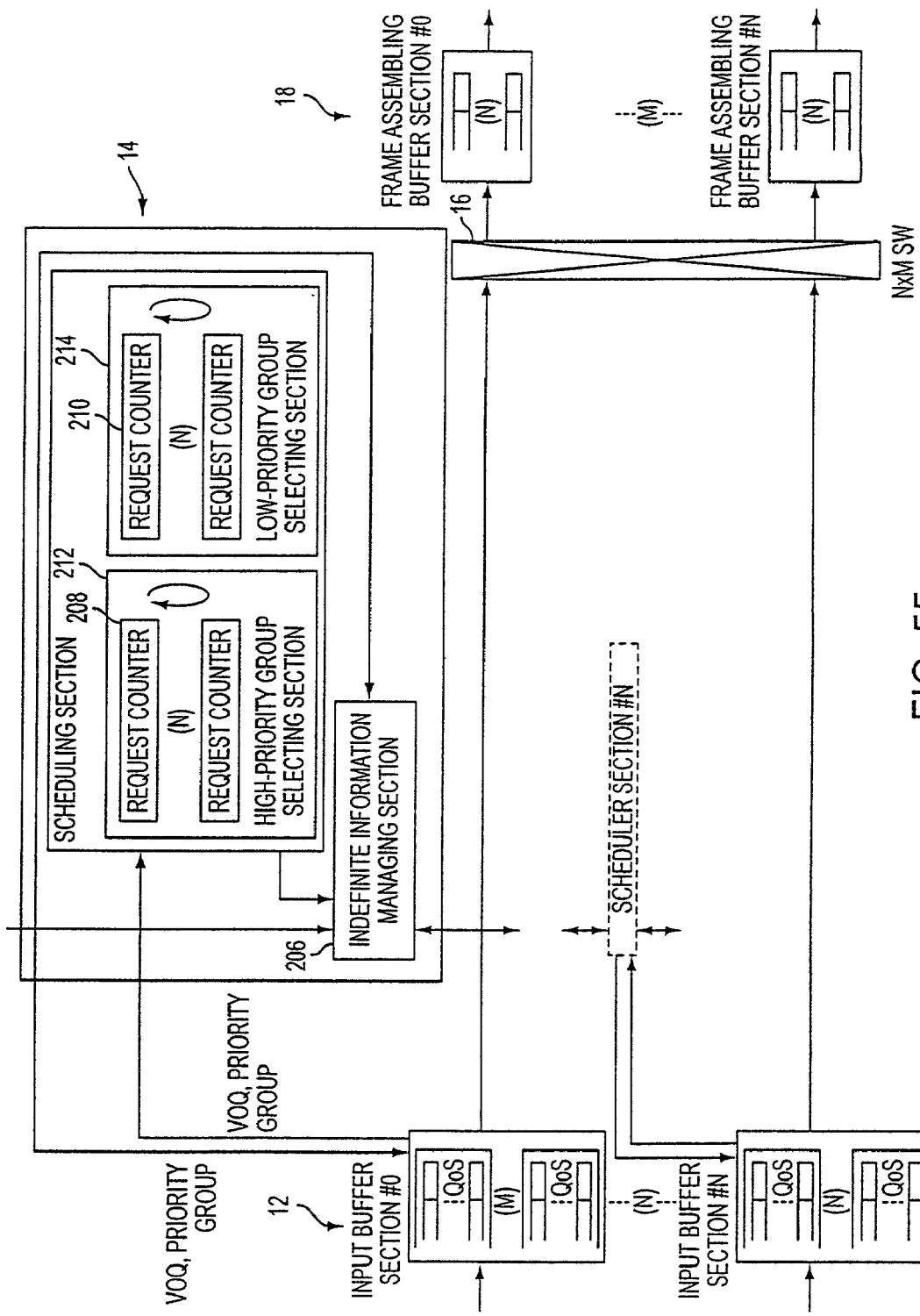
FIG. 55 is a diagram showing an example of a case where the QoS control shown in FIG. 54 is applied to the input side.

FIG. 55 shows an example of a case where the QoS control shown in FIG. 54 is applied to the input buffer section 12 at the input side of the switch 16 and to the inter-line scheduler 14 shown in FIG. 1. In FIG. 55, the input buffer section 12 has a queue for each QoS class of each of M VOQs. A scheduling section 14 executes a contention control of queues of the total number of VOQs×the number of QoS classes so that the same VOQs are not selected during one unit time. Each scheduling section 14 executes this contention control by communicating indefinite VOQ information by an indefinite information managing section 206.

When a fixed-length packet has arrived in the QoS class for each VOQ of the input buffer section 12, the input buffer section 12 posts a corresponding VOQ number and a priority group of the QoS class of the packet to the scheduling section 14. Each of request counters 208 and 210 of the scheduling section 14 manages the number of requests. Packets of the bandwidth guaranteed class are posted as packets of the high-priority group, and packets of the best effort class are posted as packets of the low-priority group, for example.

Next, a high-priority group selector 212 within one scheduling section 14 selects one VOQ from among VOQs of which request counter is not 0, and posts indefinite VOQs to an adjacent scheduling section 14 via the indefinite information managing section 206. The scheduling section 14 that has received the indefinite VOQs selects one VOQ from among the indefinite VOQs in a similar manner. This operation is repeated sequentially, and the scheduling of the high-priority group for all the input lines is completed.

Next, for the input lines for which VOQs of the high-priority group have not been selected, a low-priority group selector 214 of each scheduler 14 sequentially selects VOQs that have not been selected by the high-priority group selector, in a similar manner to the above.

Based on the above processing, unique VOQ values corresponding to the high-priority group or the low-priority group are selected for all the input lines. The above function corresponds to the selector 204 shown in FIG. 54.

Figure 56:
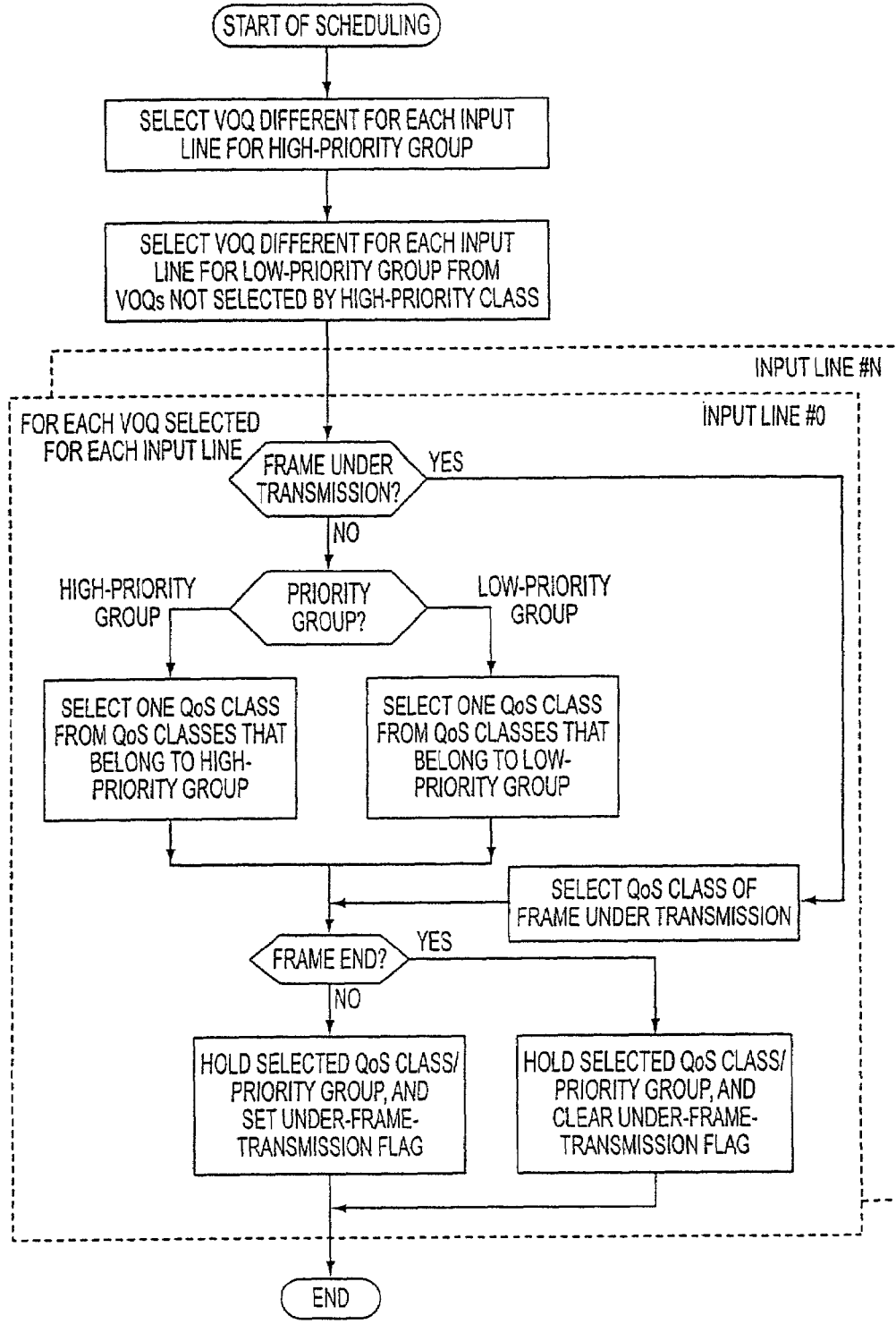
FIG. 56 is a flowchart of the operation of a circuitry shown in FIG. 55.

The scheduler 14 posts the determined VOQ value and priority group to the input buffer section 12. The input buffer section 12 executes the processing of FIG. 56, and selects one QoS class from the high-priority group or the low-priority group. When the selection is so managed as to maintain the continuity of one variable-length packet, the continuity of the frame within the same QoS class can be guaranteed.

Figure 57:
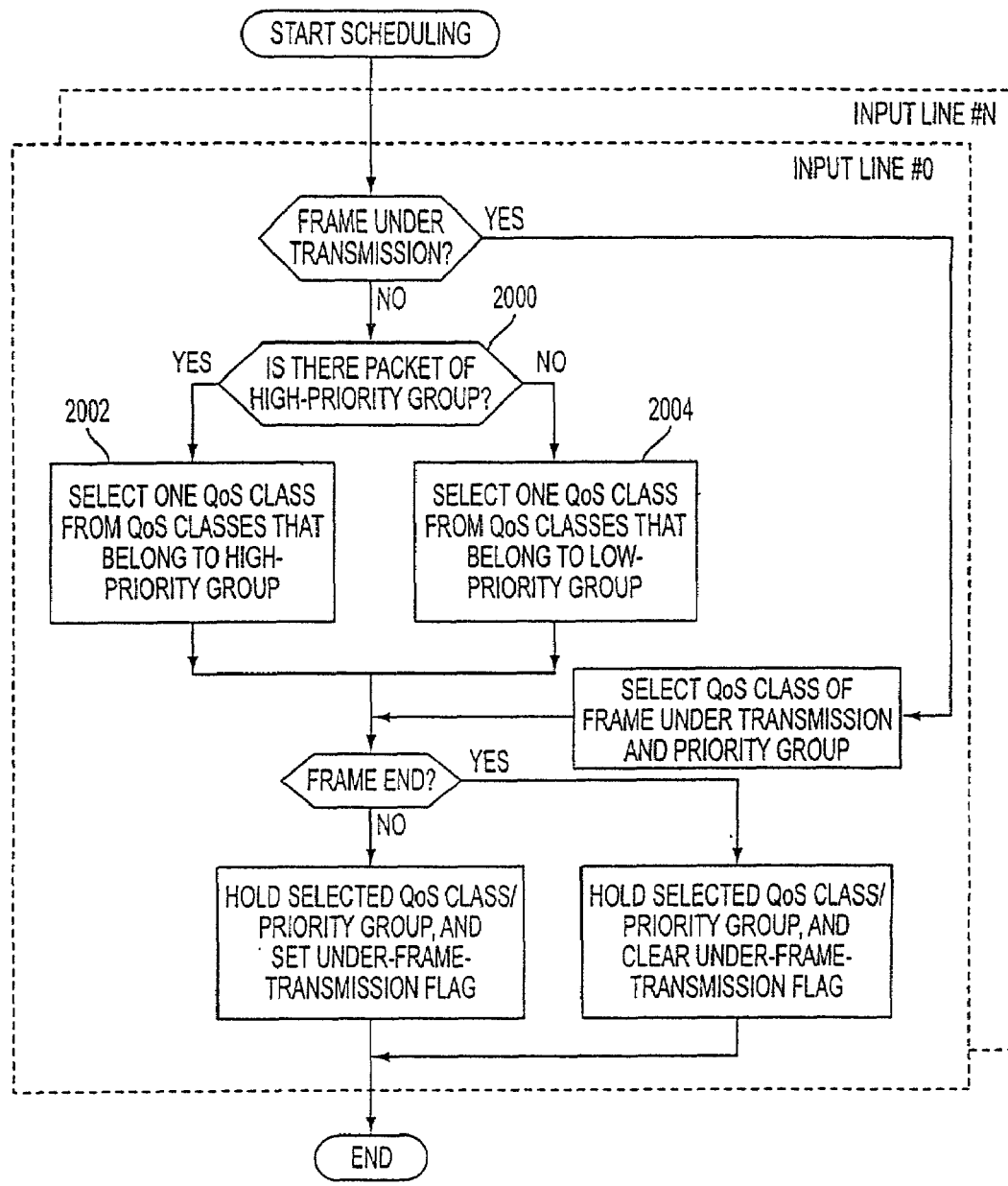
FIG. 57 is a diagram showing an example of a case where the QoS control shown in FIG. 54 is applied to the output side.

FIG. 57 shows an example of a case where the QoS control of FIG. 54 is applied to the QoS control by the QoS control section 30 in FIG. 8. This control is different from the control carried out in the input buffer section 12 in that a decision of the high-priority group or the low-priority group is made based on the presence or absence of a packet corresponding to the high-priority group, instead of based on the contention control. In other words, processing at steps 2000, 2002 and 2004 in FIG. 57 corresponds to the processing of the selectors 204, 200 and 202 in FIG. 54 respectively.

Figure 58:
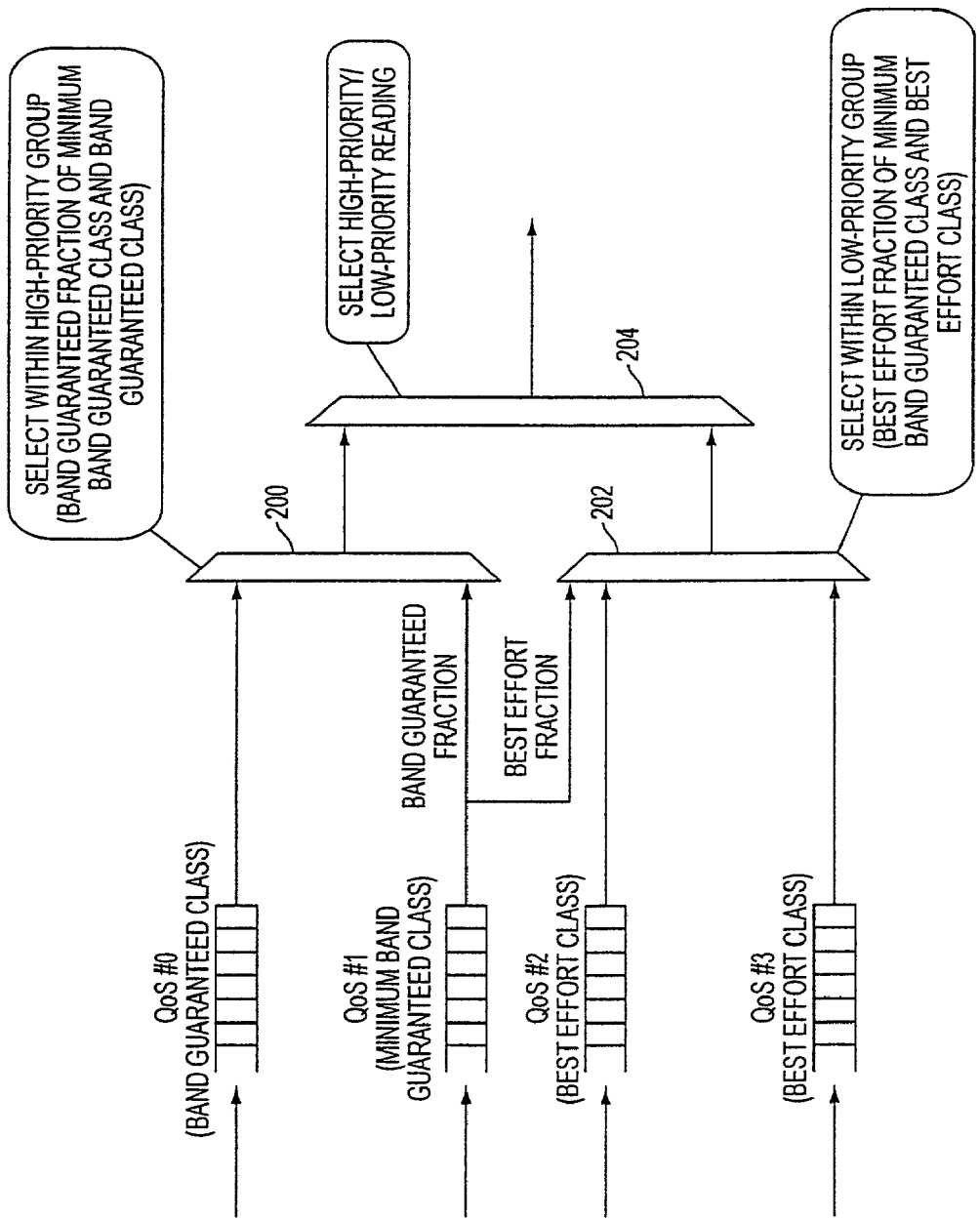
FIG. 58 is a diagram showing a mapping of each QoS class in the QoS control.

FIG. 58 shows one example of allocating each QoS class to any one of the high-priority group and the low-priority group in the QoS control of FIG. 54.

In the example shown in FIG. 58, a queue of the bandwidth guaranteed class is mapped into the high-priority group, and a queue of the best effort class is mapped into the low-priority group. The minimum bandwidth guaranteed class is mapped into both the high-priority group and the low-priority group, the minimum bandwidth guaranteed class being the class for which a bandwidth is guaranteed up to the minimum rate, and a reading is possible for the rate above the minimum rate only when there is a surplus in the band. A reading of the bandwidth guaranteed fraction is mapped into the high-priority group, and a reading of a surplus bandwidth fraction is read as the low-priority group. The QoS control of the minimum bandwidth guaranteed class is realized in this way.

With the above arrangement, based on a simple priority selection, it is possible to set a higher priority to the bandwidth guaranteed fraction of the minimum bandwidth guaranteed class than to the best effort class, thereby to equally prioritize the bandwidth guaranteed fraction and the bandwidth guaranteed class. Also, it is possible to set a lower priority to the surplus bandwidth fraction of the minimum bandwidth guaranteed class than to the best effort class, thereby to equally prioritize the surplus bandwidth fraction and the best effort class. Therefore, it is possible to accommodate the minimum bandwidth guaranteed class without affecting the bandwidth guaranteed class and the best effort class.

Figure 59:
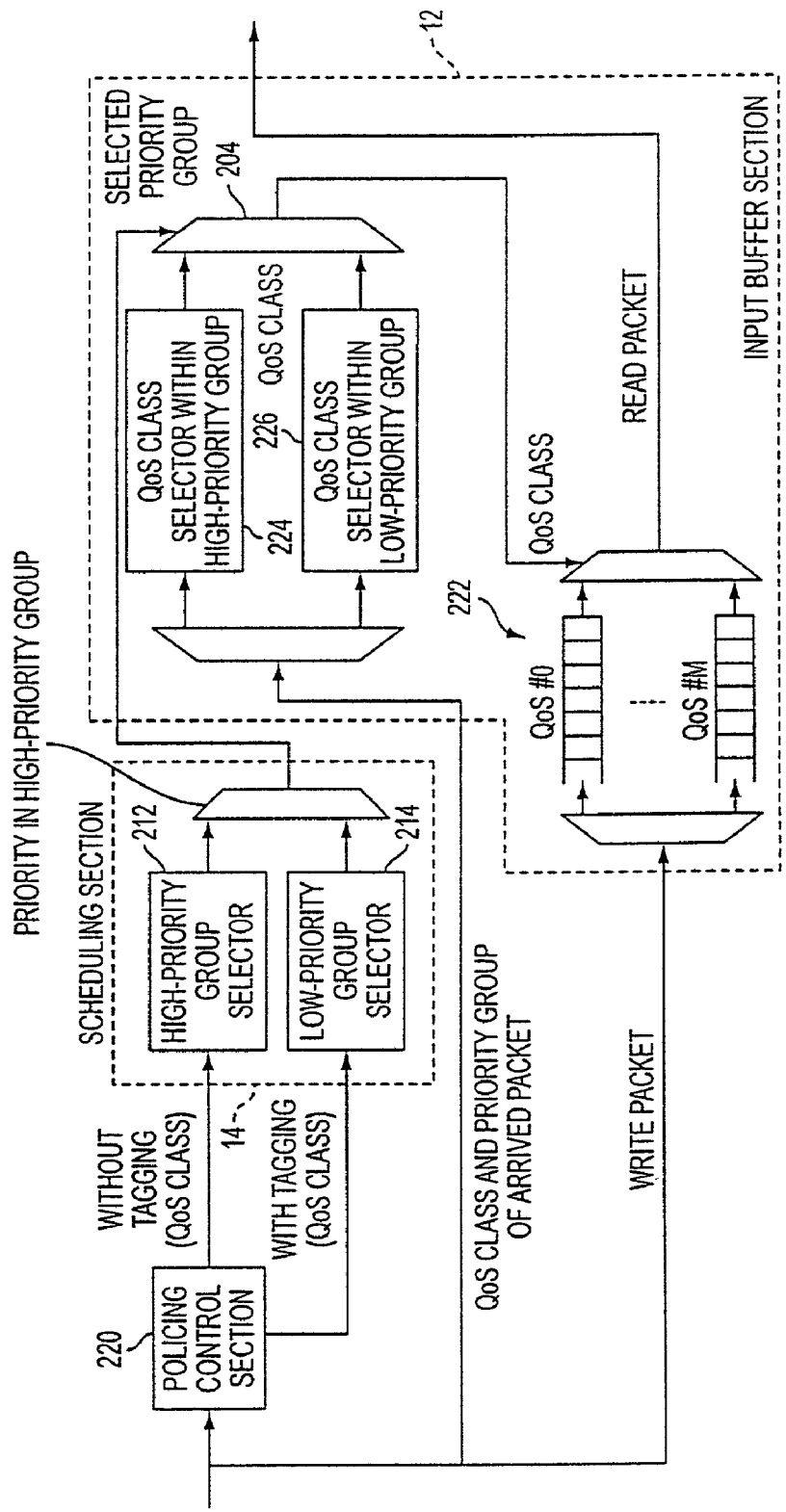
FIG. 59 is a diagram showing an example of a structure for achieving a QoS control of a minimum bandwidth guaranteed class.

FIG. 59 shows a detailed circuit structure of the input buffer section 12 and the scheduling section 14 when the method of FIG. 58 is applied to the QoS control at the input side of the switch 16. For mapping the minimum bandwidth guaranteed class into the high-priority group or the low-priority group, a policing control section 220 at the pre-stage monitors the traffic of arriving packets. The policing control section 220 does not tag a packet that has been rated at a prescribed minimum guaranteed rate or below, and tags a packet that has been rated above the minimum guaranteed rate.

When a packet without a tag has arrived, the policing control section 220 posts the packet as the high-priority group to the scheduling section 14, and when a tagged packet has arrived, the policing control section 220 posts the packet as the low-priority group to the scheduling section 14. Both packets are held in the same QoS class 222. When a packet of the bandwidth guaranteed class or a packet of the best effort class has arrived, although not shown, the packet is posted as the high-priority class or the low-priority group respectively without passing through the policing control section 20.

When the VOQ and the priority group have been determined in each scheduling section 14 and these have been posted to the input buffer section 12, a QoS class selecting section 224 or 226 within the posted priority group of the VOQ selects one QoS class and reads one packet from a corresponding QoS class 222. For the minimum guaranteed class, the packet is read from the corresponding queue irrespective of the presence or absence of a tagging and irrespective of whether the packet has been selected from the high-priority group or from the low-priority group.

Figure 60:
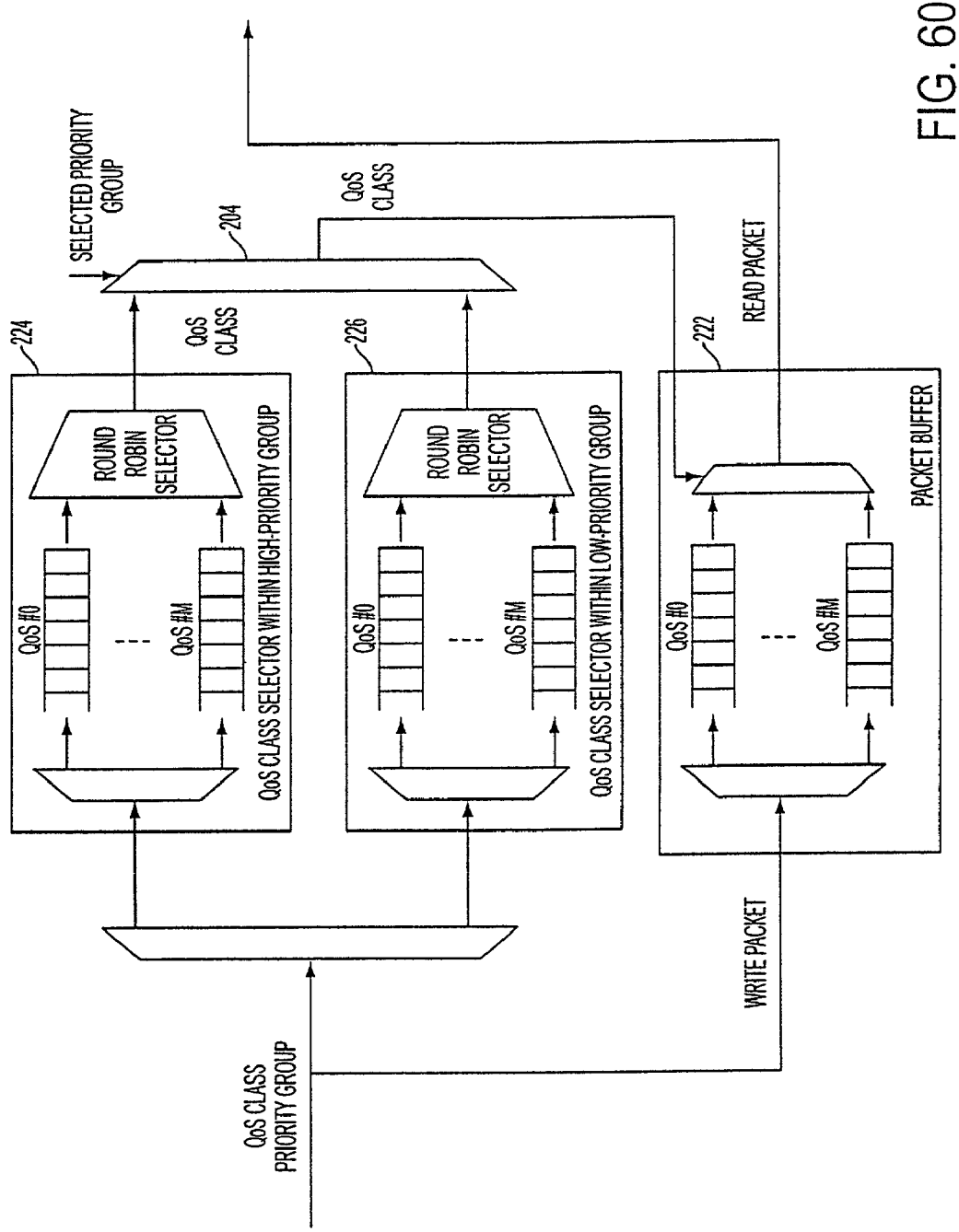
FIG. 60 is a diagram showing a case of executing a selection of a QoS class within a priority group based on a round robin method.

For the selection of one QoS class within the high-priority group or within the low-priority group, it is possible to apply a simple round robin method as shown in FIG. 60, for example. In the case of the round robin method, it is possible to conduct a fair allocation of the bandwidth to each QoS class with a small scale of hardware. However, when there is a deviation in the traffic between QoS classes, a delay time increases in proportion to the increase in the traffic and unfairness occurs in the delay time.

Figure 61:
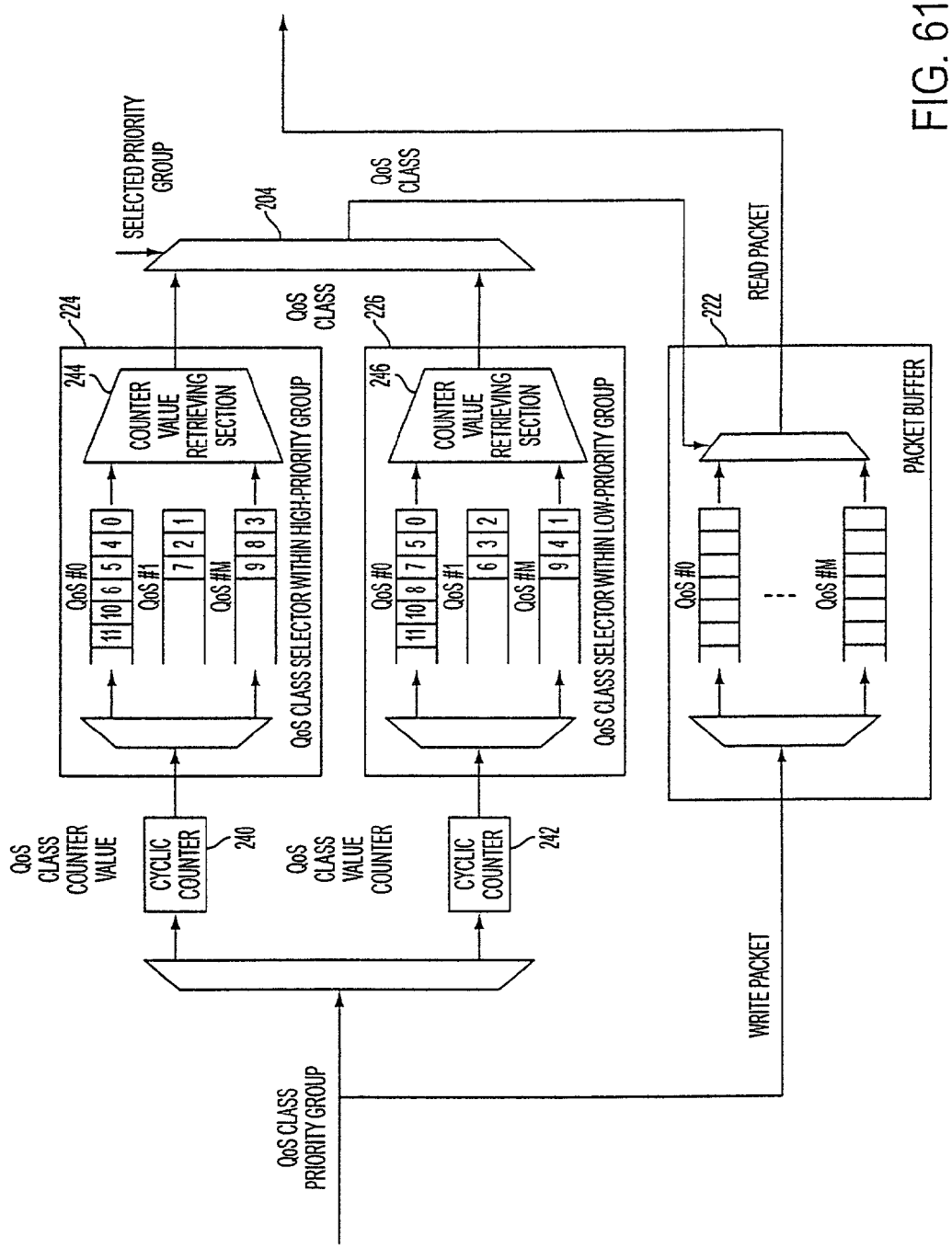
FIG. 61 is a diagram showing a case of executing a selection of a QoS class within a priority group based on a time stamp.

When packets are selected in the order of packet arrival within each group, the problem of unfair delay time can be solved. In order to achieve this, for example, a time stamp that shows the arrival order is given to the data stored in each queue of the QoS class selecting sections 224 and 226, and the packets are selected in this order, as shown in FIG. 61. In FIG. 61, cyclic counters 240 and 242 are incremented by 1 each time when the packet information of the QoS class within each priority group has been registered. When each counter has counted up to the number of packets corresponding to the input buffer volume, the count returns to 0. The value of the counter is added to the packet information. Each of counter value retrieving sections 244 and 246 also has an internal counter which is incremented by one when a packet has been selected, and retrieves information having a cycle counter value that coincides with the value of the internal counter.

Figure 62:
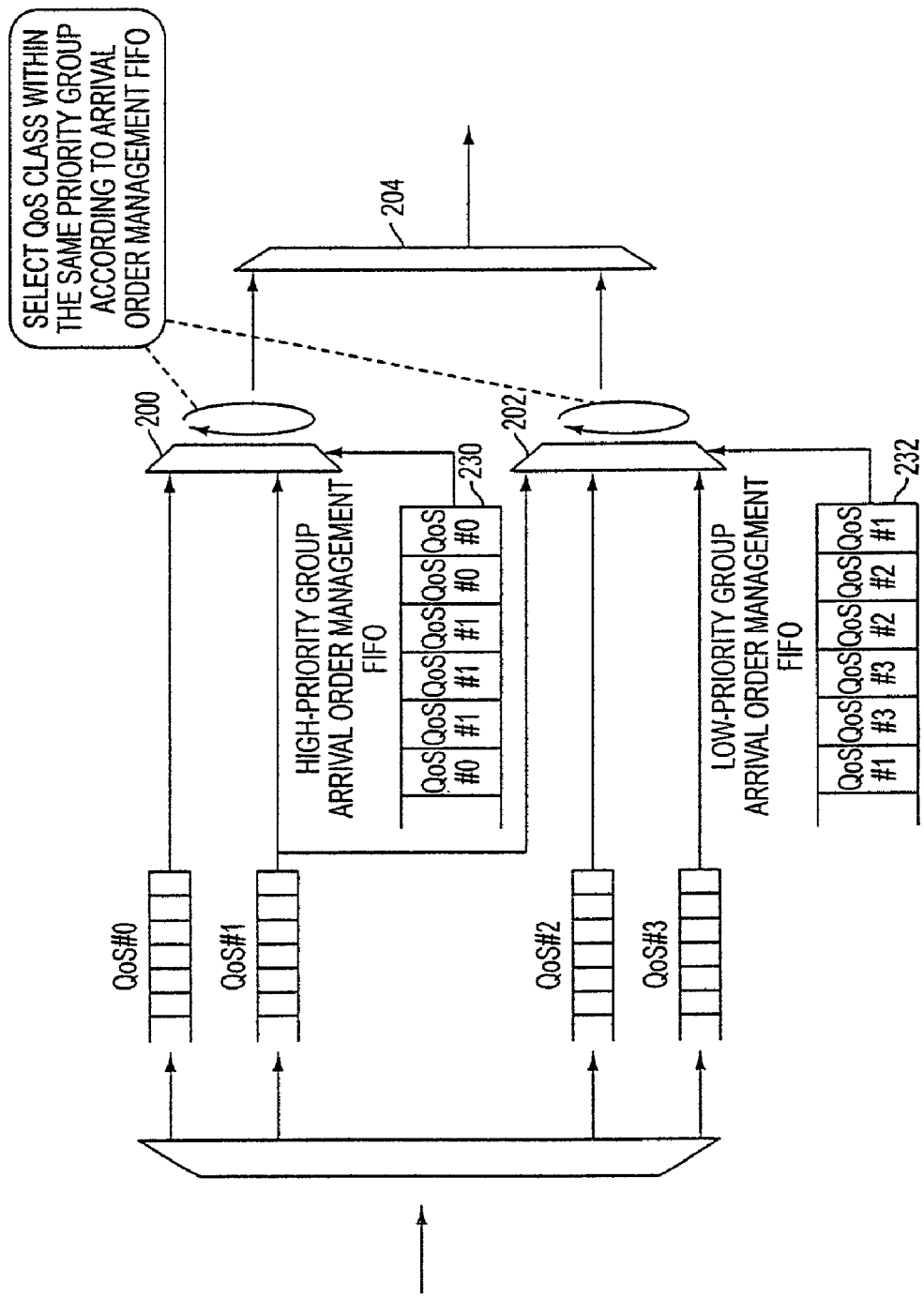
FIG. 62 is a diagram showing a case of executing a selection of a QoS class within a priority group based on arrival sequence management FIFO.

As another method of packet selection, the number of a QoS class of an arrived packet is stored in FIFO 230 and FIFO 232 within each group as shown in FIG. 62. It is possible to select packets according to the arrival order when packets are selected according to numbers read out from the FIFO.

Figure 63:
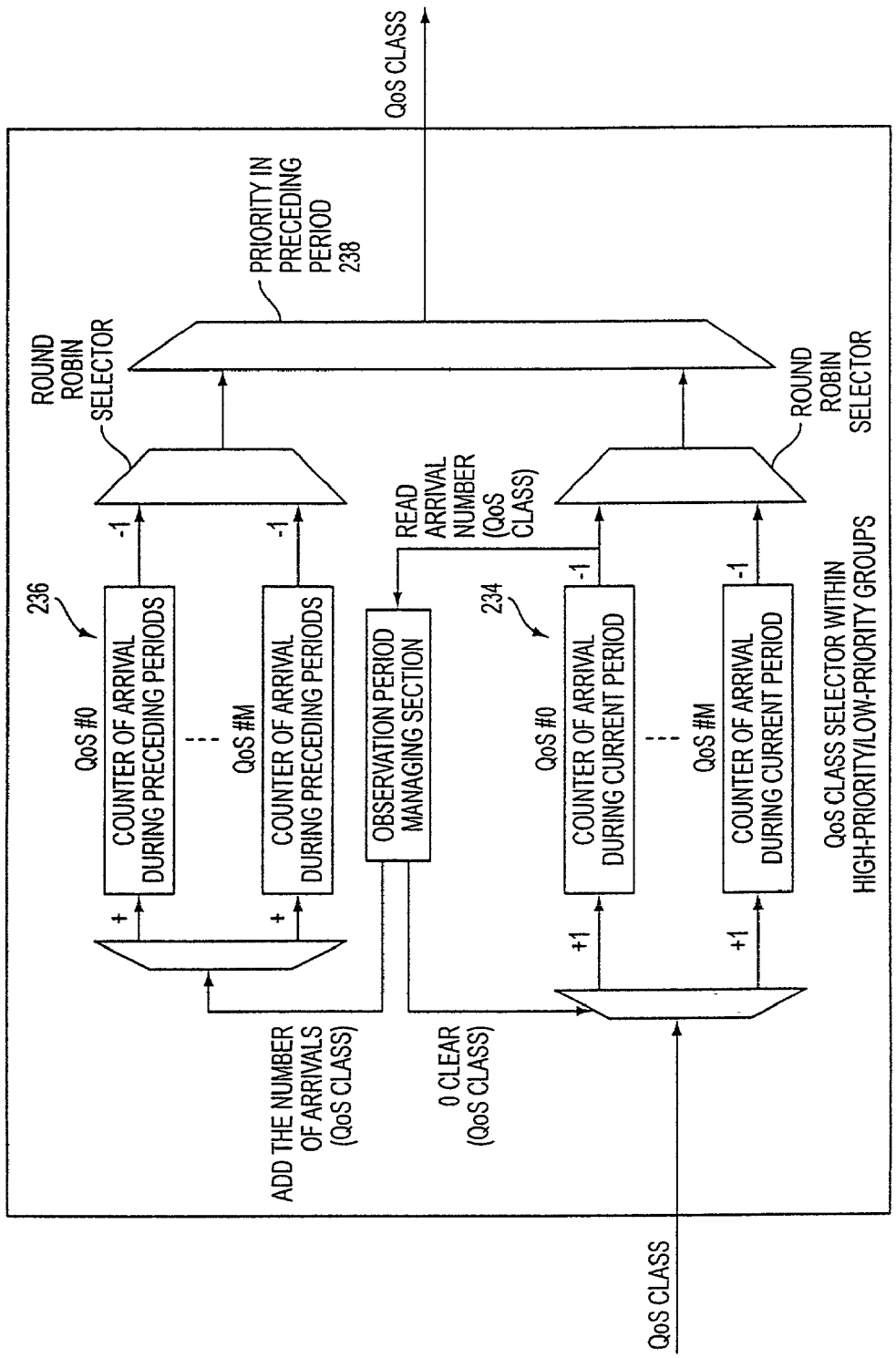
FIG. 63 is a diagram showing a case of executing a selection of a QoS class within a priority group based on the history of the number of packets during an observation period.

FIG. 63 shows another method of selecting packets within the group according to which a delay time is comparatively fair. First, a counter 234 counts the arrived packets for each QoS class. When a packet has been selected, the counter is decremented. Each time when a predetermined observation time has passed, the number of packets that remained without being selected is added to a counter 236 for each QoS class. In other words, the counter 236 counts the number of packets that have arrived during the preceding period and during further preceding periods and that have not yet been selected. When the value of the counter 236 is zero, a selector 238 selects one QoS class from QoS classes that have a value other than 0 in the counter 234 based on the round robin method. When there are QoS classes that have a value other than 0 in the counter 236, one QoS class is selected with priority based on the round robin method from among the QoS classes. In the example shown in FIG. 63, there are used two counters of the counter 234 that counts unselected packets that have arrived during the current period, and the counter 236 that counts unselected packets that have arrived during the preceding period and during further preceding periods. However, the selection of fairness further is improved when the packets not selected during the preceding periods are counted separately by further classifying the preceding periods into the preceding period, the preceding period before the preceding period, and further preceding periods.

As this method is just based on the counting of arrived packets, this method requires less hardware volume than that required for the method of storing the time stamp or QoS class number at each time of packet arrival.

Figure 64:
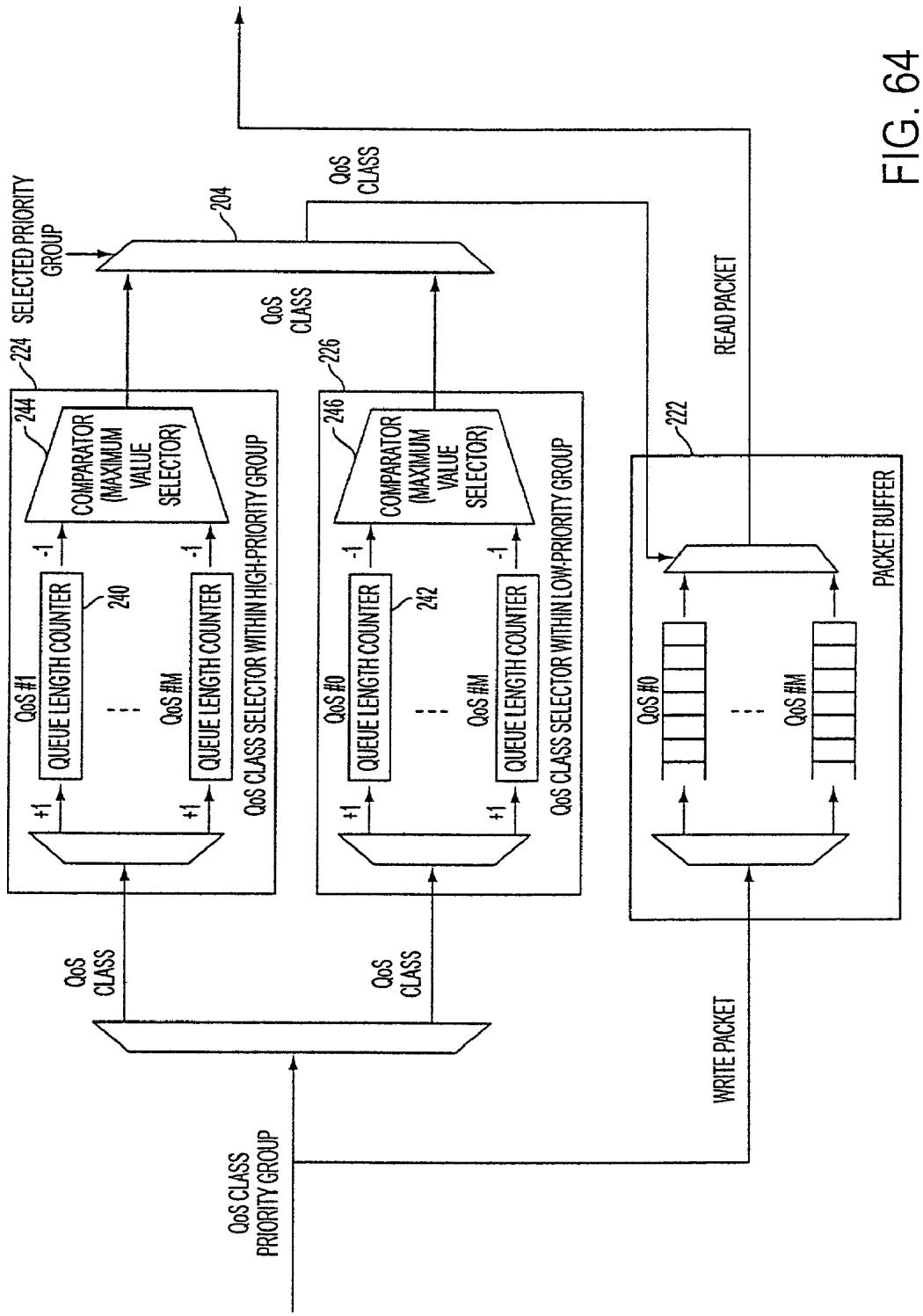
FIG. 64 is a diagram showing a case of executing a selection of a QoS class within a priority group based on a queue length.

FIG. 64 shows still another method of selecting packets within the group. In FIG. 64, each of queue length counters 240 and 242 counts the number of packets of unselected fixed-length packets for each QoS class. Each of comparators 244 and 246 selects a packet of a maximum count value in the queue length counters 240 and 242 respectively.

That a queue has a large length does not necessary mean that an arrival traffic rate is high. However, both have a similar trend. Therefore, as compared with the round robin method, the above method has a more fair delay characteristic. Further, as the queue length can be used common to the selection of packets and the packet drop control, this makes it possible to decrease the scale of hardware.

As explained above, according to the present invention, it is possible to provide a large-capacity packet switch for achieving the QoS control, drop control and multicast control of variable-length packets at high speed and with small scale hardware.

What is claimed is:

1. A packet switch comprising:
   a packet divider for dividing variable-length packets from a plurality of input lines into fixed-length packets;
   a plurality of input buffer sections provided corresponding to the plurality of input lines, each input buffer section having queues provided for each of mutually different priorities of a smaller number than that of QoS classes that can be designated, and for each of a plurality of output lines, for registering fixed-length packets from corresponding input lines to corresponding queues according to the output line and the QoS class;

a scheduler for reading the fixed-length packets registered in the queues of the input buffer sections according to the priority given to each queue so that two or more fixed-length packets of the same output line are not read out within a unit time;

a switch for routing each fixed-length packet read out by the scheduler to a designated one output line out of the plurality of output lines; and a plurality of output buffer sections provided corresponding to the plurality of output lines, for carrying out an assembling of a variable-length packet from the fixed-length packets output from the switch and for controlling the priority based on the QoS class.

2. The packet switch of claim 1, wherein
each input buffer section has a queue of a first priority and a queue of a second priority for each output line,
a packet of a bandwidth guaranteed class is registered in the queue of the first priority,
a packet of a best effort class is registered in the queue of the second priority,
a packet of a minimum bandwidth guaranteed class is registered in the queue of the second priority, and
the queue of the second priority has a first drop level for dropping a packet of the minimum bandwidth guaranteed class that has been input in excess of a designated bandwidth and a packet of the best effort class, and a second drop level higher than the first drop level for dropping a packet of the minimum bandwidth guaranteed class that has been input within a designated bandwidth.

3. The packet switch of claim 1, wherein
each output buffer section includes:
a variable-length packet assembling buffer having queues of a number equal to the number of queues for each output line in each input buffer section, for each input line, for storing fixed-length packets output from the switch into corresponding queues according to the input line, thereby to assemble variable-length packets from the fixed-length packets; and
a QoS control section having queues of a number equal to the number of QoS classes that can be designated, for registering the variable-length packets assembled by the variable-length packet assembling buffer into corresponding queues according to a QoS class, and for sequentially reading the variable-length packets according to a packet length and the QoS class and outputting the read variable-length packets to corresponding output lines.

4. The packet switch of claim 1, wherein
each output buffer section includes:
a fixed-length-based QoS control section having queues of a number equal to the number of QoS classes that can be designated, for registering fixed-length packets output from the switch into corresponding queues according to the QoS class; and
a variable-length packet assembling buffer having queues of a number equal to the number of QoS classes that can be designated for each input line, for registering the fixed-length packets output from the fixed-length-based QoS control section into corresponding queues according to the input line and the QoS class thereby to assemble variable-length packets, and for transferring the assembled variable-length packets to a corresponding output line.

5. The packet switch of claim 1, wherein
the scheduler selects fixed-length packets, one by one, that are to be output to each output line, by checking all the queues within the plurality of input buffer sections in the order of priorities given to the queues, in a predetermined order of input lines and in a predetermined order of output lines, respectively, within a unit time, and
in selecting an output line for transmitting a fixed-length packet from the queue of the same priority and the same input line, the scheduler selects with priority over other fixed-length packets, the fixed-length packet within the queue that corresponds to the output line from which a part of a plurality of fixed-length packets that constitute a variable-length packet has already been transmitted.

6. The packet switch of claim 3, wherein
the QoS control section includes:
means for adding a first value to a corresponding token when a variable-length packet has reached the front of one of the queues;
means for subtracting a second value from each of tokens of active QoS classes each time when a unit time has passed; and
means for starting the reading of a variable-length packet of which corresponding token is a minimum or 0 among the active QoS classes when a packet can be sent to the output line.

7. The packet switch of claim 6, wherein the first value is a value corresponding to a packet length of the variable-length packet that has reached the front of the queue, and the second value is a value corresponding to a ratio of a weight of each active QoS class to a total sum of the weights of the active QoS classes.

8. The packet switch of claim 6, wherein the first value is a value corresponding to a product of a packet length of the variable-length packet that has reached the front of the queue and a total sum of the weights of the active QoS classes, and the second value is a value corresponding to a weight of each active QoS class.

9. The packet switch of claim 8, wherein the first-value adding means adds the total sum of the weights of the active QoS classes to the token each time when a unit time has passed, and repeats this addition by the number corresponding to the packet length, thereby adding the first value.

10. The packet switch of claim 3, wherein
the QoS control section includes:
a counter for counting for each QoS class a number of fixed-length packets composing variable-length packets;
a priority control section for determining and posting a QoS class of a packet to be output with priority based on a constant packet length, from out of QoS classes that have count values other than 0; and
a variable-length packet managing section for counting the posts from the priority control section for each QoS class, reading out a variable-length packet of the QoS class of which count value has reached a value corresponding to the packet length of the variable-length packet at the front of a corresponding queue, and sending the read variable-length packet to the output line.

11. The packet switch of claim 3, wherein
the QoS control section includes:
a first counter for counting for each QoS class a number of fixed-length packets composing variable-length packets of the bandwidth guaranteed class and variable-length packets of the minimum bandwidth guaranteed class that have been input within a designated bandwidth;

a second counter for counting for each QoS class a number of fixed-length packets composing variable-length packets of the best effort class and variable-length packets of the minimum bandwidth guaranteed class that have been input in excess of the designated bandwidth;

a priority control section for determining and posting a QoS class of a packet to be output with priority based on a constant packet length, from out of QoS classes that have count values other than 0 for the first counter and QoS classes that have count values other than 0 for the second counter; and a variable-length packet managing section for counting the posts from the priority control section for each QoS class, reading out a variable-length packet of the QoS class of which the count value has reached a value corresponding to the packet length of the variable-length packet at the front of a corresponding queue, and sending the read variable-length packet to the output line.

12. The packet switch of claim 6, wherein the second value includes a second value for bandwidth guaranteed fraction and a second value for best effort fraction, and the second-value subtracting means subtracts only the second value for the bandwidth guaranteed fraction from the token when there has been a packet reading from a bandwidth guaranteed class, and subtracts the second value for the bandwidth guaranteed fraction and the second value for the best effort fraction from the token when there has been no reading from the bandwidth guaranteed class.

13. The packet switch of claim 6, wherein the token includes a token for bandwidth guaranteed fraction and a token for best effort fraction, and the second value includes a second value for the bandwidth guaranteed fraction and a second value for the best effort fraction.

the second-value subtracting means subtracts the second value for the bandwidth guaranteed fraction and the second value for the best effort fraction from the token for the bandwidth guaranteed fraction and the token for the best effort fraction respectively, and when a packet to be read out has been selected based on one of the token for the bandwidth guaranteed fraction and the token for the best effort fraction, the value subtracted from the other token is carried forward to the token of the next packet.

* * * * *